United States Patent
Hijioka et al.

(10) Patent No.: US 9,906,669 B2
(45) Date of Patent: Feb. 27, 2018

(54) SCANNING SYSTEM, SCANNED IMAGE PROCESSING DEVICE AND SCANNING METHOD

(71) Applicant: Renesas Electronics Corporation, Tokyo (JP)

(72) Inventors: Kenichiro Hijioka, Tokyo (JP); Koichi Nose, Tokyo (JP); Shunsuke Okumura, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 0 days.

(21) Appl. No.: 15/358,311

(22) Filed: Nov. 22, 2016

(65) Prior Publication Data

US 2017/0171408 A1 Jun. 15, 2017

(30) Foreign Application Priority Data

Dec. 11, 2015 (JP) ................. 2015-242277

(51) Int. Cl.
*H04N 1/04* (2006.01)
*H04N 1/00* (2006.01)
*H04N 1/387* (2006.01)

(52) U.S. Cl.
CPC ....... *H04N 1/00795* (2013.01); *H04N 1/3876* (2013.01); *H04N 2201/0081* (2013.01); *H04N 2201/0096* (2013.01); *H04N 2201/0424* (2013.01); *H04N 2201/0426* (2013.01); *H04N 2201/0434* (2013.01)

(58) Field of Classification Search
CPC ........ G06K 2209/01; G06K 9/03; G06K 9/00; G06K 9/00442; G06K 9/00463; G06K 9/00671; G06K 9/6201; G06K 9/72; G06K 9/723; G06K 9/00449; G06F 17/21; G06F 17/211; G06F 17/30047; G06F 17/30241
USPC ............ 358/1.15, 1.11, 1.16, 1.18, 2.1, 462; 382/232, 321, 176, 310, 177, 182, 195, 382/229, 309, 317
See application file for complete search history.

(56) References Cited

U.S. PATENT DOCUMENTS 6,081,261 A 6/2000 Wolff et al.
6,765,700 B1 * 7/2004 Naito ................. H04N 1/00795
358/406

(Continued)

FOREIGN PATENT DOCUMENTS

JP 2004-303254 A 10/2004

*Primary Examiner* — Negussie Worku
(74) *Attorney, Agent, or Firm* — Sughrue Mion, PLLC

(57) ABSTRACT

A scanning system according to the present invention includes an image acquisition unit that acquires a plurality of pieces of image information generated by continuously scanning a medium to be scanned, a path calculation unit that calculates a path of scanning the medium based on the plurality of pieces of image information acquired by the image acquisition unit, a processing method determination unit that determines a processing method of the plurality of pieces of image information in accordance with a path calculated by the path calculation unit, and a processing unit that processes the plurality of pieces of image information by a processing method determined by the processing method determination unit and converts the plurality of pieces of image information into information in a form corresponding to the processing method.

18 Claims, 36 Drawing Sheets

(56) References Cited

U.S. PATENT DOCUMENTS

| | | | |
|---|---|---|---|
| 2009/0231453 A1* | 9/2009 | Huang | H04N 5/144 348/220.1 |
| 2011/0153653 A1* | 6/2011 | King | G06F 17/30253 707/769 |
| 2012/0263381 A1* | 10/2012 | Yoshida | G06F 3/03545 382/189 |
| 2013/0083171 A1* | 4/2013 | Habuka | G06T 5/003 348/47 |
| 2015/0123966 A1* | 5/2015 | Newman | G06T 19/006 345/419 |
| 2017/0061818 A1* | 3/2017 | Hijioka | G09B 19/0038 |
| 2017/0068869 A1* | 3/2017 | Tomisawa | G06K 9/228 |
| 2017/0185836 A1* | 6/2017 | Okumura | G06T 7/70 |

\* cited by examiner

EFFECT OF THIS EMBODIMENT

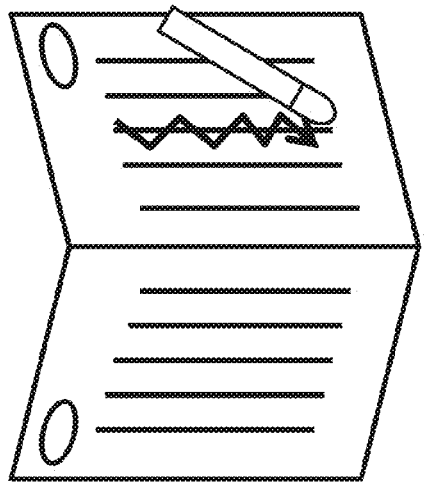

PERFORM OCR OF SCANNED IMAGE AT END OF SCANNING AND STORE IT AS "PAGE NUMBER"

※PROCESSING DETAILS (OCR/CONVERSION TO jpg) AND ATTRIBUTES ARE JUST ONE EXAMPLE

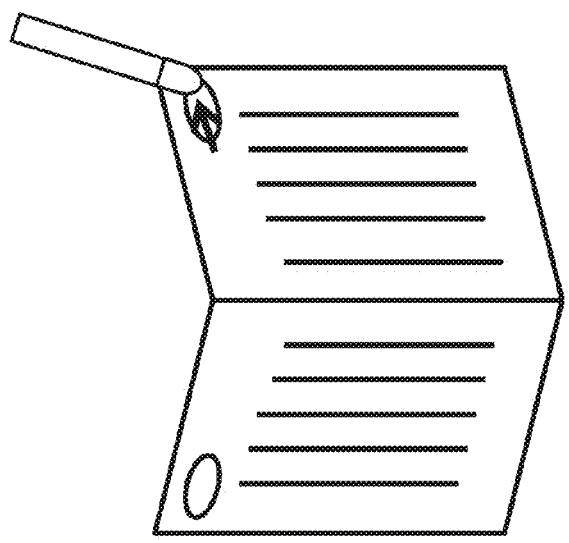

CONVERT SCANNED IMAGE TO jpg AT END OF SCANNING AND STORE IT AS "BODY"

①ACQUISITION OF INFORMATION, ②CONVERSION OF AND ATTRIBUTE ADDITION TO ACQUIRED INFORMATION AND ③STORAGE CAN BE DONE IN SINGLE ACTION (THERE IS NO NEED FOR ADDITIONAL OPERATION BEFORE AND AFTER ACQUISITION/INPUT), THEREBY ENHANCING USER CONVENIENCE

Fig. 10

| Input | Output |
|---|---|
| ISBN | COMMENTS OR Q&A ON WHOLE BOOK |
| PAGE NUMBER | COMMENTS OR Q&A ON THE PAGE |
| BODY | COMMENTS OR Q&A ON THE BODY |

(EFFECT) SOCIAL READING UTILIZING PINPOINT INFORMATION

GENERAL SOCIAL READING SERVICE AND ONLINE BOOK SHOPPING SITE :

- SEARCH KEY: BOOK (ISBN)
- INFORMATION TO BE PRESENTED: COMMENTS ON BOOK

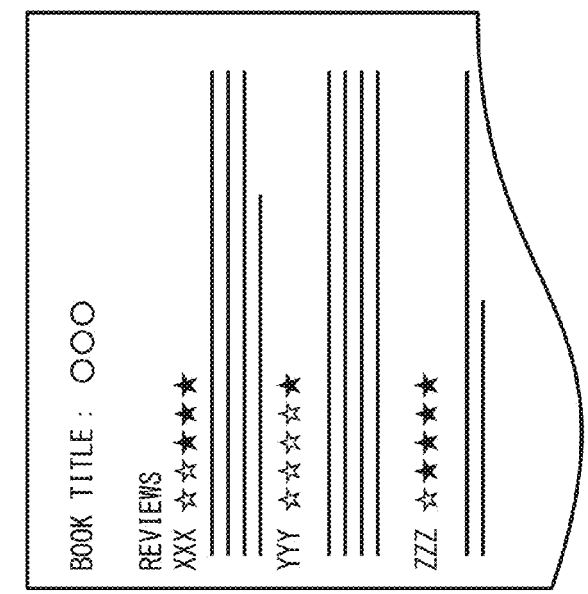

INFORMATION ON BOOK-BY-BOOK BASIS ONLY IS OBTAINED

SOCIAL READING SERVICE AND ONLINE BOOK SHOPPING SITE CAPABLE OF PRESENTING MORE PRECISE INFORMATION, ACHIEVED BY THIS EMBODIMENT :

- SEARCH KEY: BOOK (ISBN), PAGE, BODY etc.
- INFORMATION TO BE PRESENTED: COMMENTS ON PINPOINT "PLACE" LIKE PAGE AND BODY, NOT ONLY ON BOOK

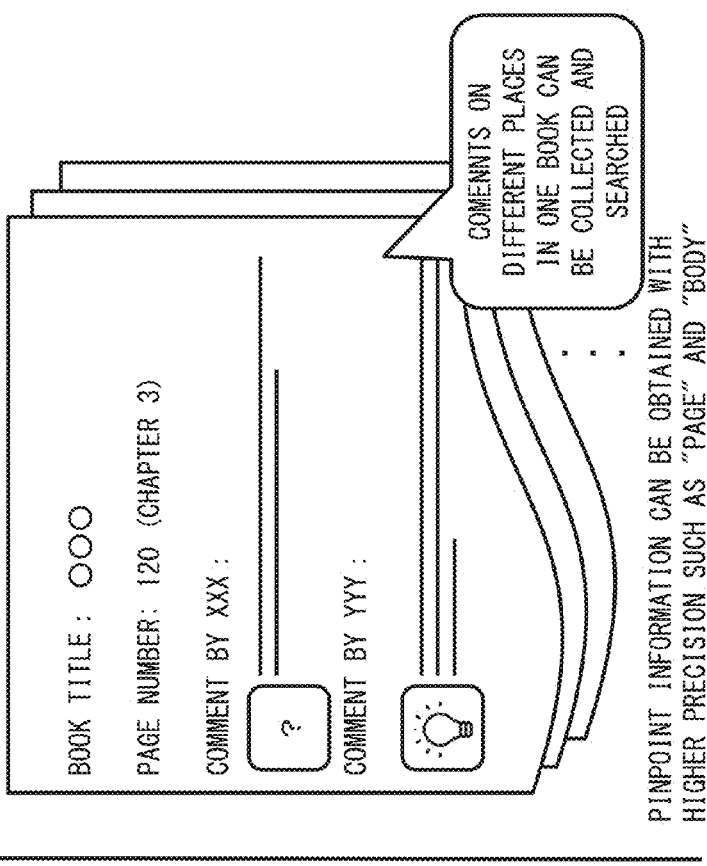

PINPOINT INFORMATION CAN BE OBTAINED WITH HIGHER PRECISION SUCH AS "PAGE" AND "BODY"

SCANNING SYSTEM, SCANNED IMAGE PROCESSING DEVICE AND SCANNING METHOD

CROSS-REFERENCE TO RELATED APPLICATIONS

This application is based upon and claims the benefit of priority from Japanese patent application No. 2015-242277, filed on Dec. 11, 2015, the disclosure of which is incorporated herein in its entirety by reference.

BACKGROUND

The present invention relates to a scanning system, a scanned image processing device and a scanned method and, for example, relates to a technique to scan a medium.

There are a considerable number of people who, during reading, add markings with a pen to information contained in a paper book, such as a part that they think is important or have a question about in a text (body), or a drawing.

On the other hand, a marking (highlight) function is provided in electronic books. In electronic books, because the content of a book has been converted into electronic data, the text extracted by a user can be easily stored and searched with use of the highlight function.

For paper books also, there is a need to easily convert a part of a paper book into electronic form and store it, like electronic books. To respond to such a need, Japanese Unexamined Patent Publication No. 2004-30325 discloses a technique that aims at enabling the conversion of data between a paper document and an electronic document with use of an uncomplicated system.

A calendar book system disclosed in Japanese Unexamined Patent Publication No. 2004-303254 is composed of a pen device and a base unit. The pen device includes three optical sensors (CCD arrays). The first optical sensor is mounted on a linear side along the length of the pen device. The second optical sensor is mounted on the pen point of the pen device or one side of the pen point. The third optical sensor is mounted on the rear end of the pen device. The first optical sensor is used to scan a large part of a page, for example. The second optical sensor is used to identify the local content of a document by recognizing a printed mark, for example.

The output of the optical sensors is sent as a sensor signal to the base unit by a transmitter of the pen device. The base unit communicates with the pen device and receives the sensor signal. The base unit can thereby capture the user's document as an electronic document.

SUMMARY

A paper book contains different types of information, such as a body, a drawing and a page number of a page on which the body or the drawing is presented. There is a need to store each of the different types of information in an appropriate form according to the type. For example, some users wish to store a body and a page number in the form of an electronic text and store a drawing in the form of an electronic image.

However, according to the technique disclosed in Japanese Unexamined Patent Publication No. 2004-30325, a scanned text can be stored only in the form of an electronic document. In other words, Japanese Unexamined Patent Publication No. 2004-30325 does not disclose a technique to store different types of information on a medium to be scanned in appropriate forms.

The other problems and novel features of the present invention will become apparent from the description of the specification and the accompanying drawings.

According to one embodiment, a scanning system processes a plurality of pieces of image information generated by continuously scanning a medium to be scanned by a processing method determined in accordance with a path of scanning the medium, and thereby converts the plurality of pieces of image information into information in a form corresponding to the processing method.

According to the above embodiment, it is possible to store different types of information on a medium to be scanned in appropriate forms with a simple operation.

BRIEF DESCRIPTION OF THE DRAWINGS

The above and other aspects, advantages and features will be more apparent from the following description of certain embodiments taken in conjunction with the accompanying drawings, in which:

FIG. 10 is a view to describe effects of the scanning system according to the first embodiment.

FIG. 30 is a view showing the relationship between information that is input by scanning and information that is output according to that information in a viewing mode according to the seventh embodiment.

FIG. 31 is a view to describe effects of the scanning system according to the seventh embodiment.

DETAILED DESCRIPTION

Preferred embodiments of the present invention will be described hereinafter with reference to the drawings. It should be noted that specific numerical values and the like in the following embodiments are given merely for illustrative purposes, and values are not limited thereto unless particularly noted. Further, in the following description and drawings, things that are obvious to those skilled in the art and the like are appropriately omitted, shortened and simplified to clarify the explanation.

First Embodiment

Figure 1:
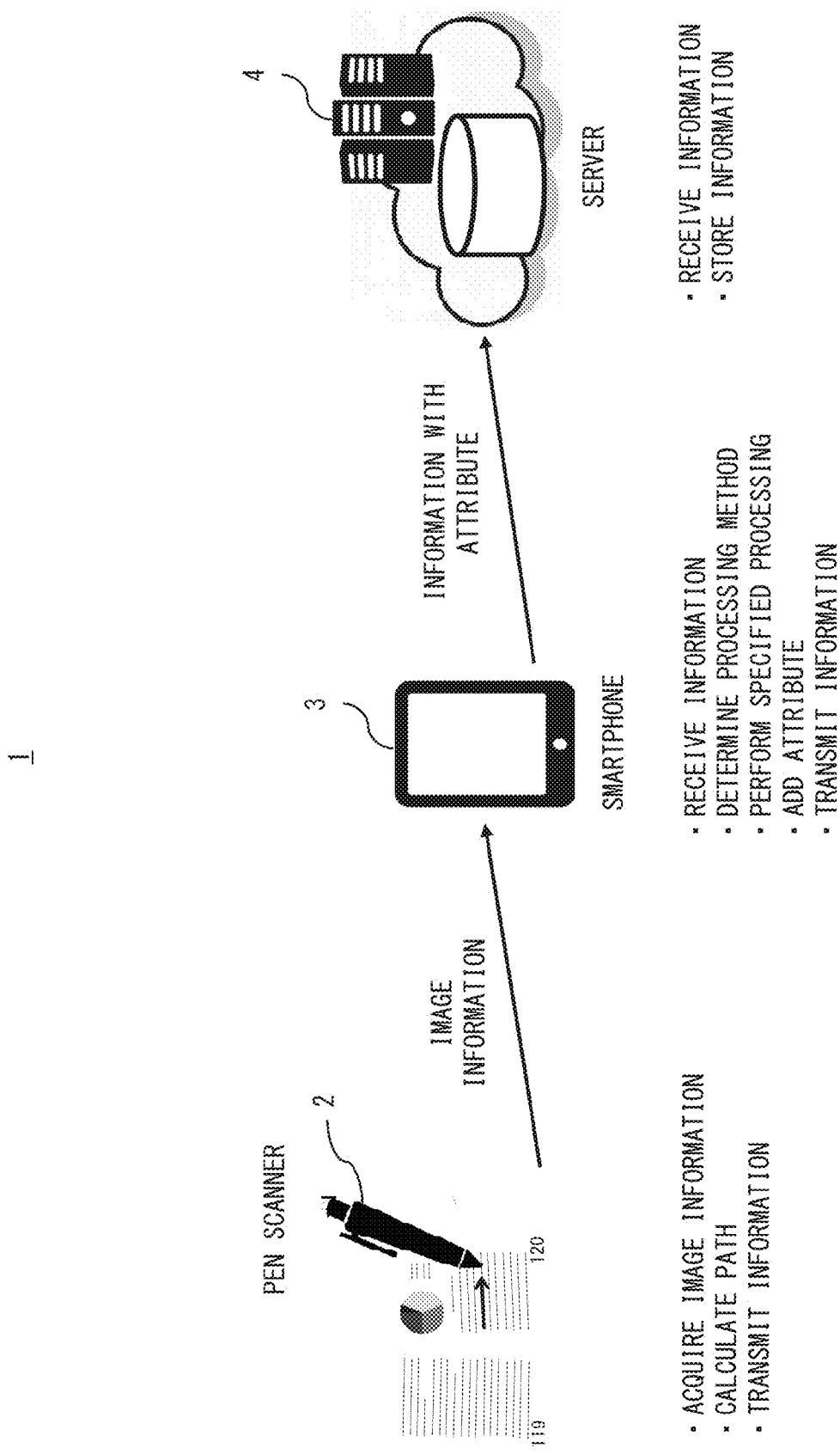
FIG. 1 is a view showing a schematic configuration of a scanning system according to a first embodiment.

The schematic configuration of a scanning system 1 according to a first embodiment is described hereinafter with reference to FIG. 1. As shown in FIG. 1, the scanning system 1 includes a pen scanner 2, a smartphone 3, and a server 4.

The pen scanner 2 and the smartphone 3 transmit and receive arbitrary information to and from each other via arbitrary wireless communication, for example. As the wireless communication, near field radio communication such as Bluetooth or LAN (Local Area Network) can be used. Further, the smartphone 3 and the server 4 transmit and receive arbitrary information to and from each other via arbitrary wireless communication and arbitrary wired communication, for example. As the wireless communication, mobile communication (long range radio communication) such as 3GPP (Third Generation Partnership Project) or LTE (Long Term Evolution), for example, can be used. As the wired communication, Internet communication, for example, can be used.

The pen scanner 2 is a device that scans a medium to be scanned (which is also referred to simply as "medium"). The pen scanner 2 scans an arbitrary part of a medium in response to a user's operation and generates image information where the scanned part is converted into an electronic image. When a user slides the pen scanner 2 over a part of a medium to be scanned, the pen scanner 2 continuously scans this part and generates a plurality of pieces of image information. The pen scanner 2 transmits the plurality of pieces of generated image information to the smartphone 3.

At this time, the pen scanner 2 calculates the moving path of the pen scanner 2 when scanning the medium based on the plurality of pieces of generated image information. The pen scanner 2 transmits information about the calculated moving path also to the smartphone 3.

The medium to be scanned is typically a paper book. When a user wishes to store information in electronic form into the server 4, the user scans an arbitrary part (a body, a page number, a drawing etc.) of a paper book with the pen scanner 2.

The smartphone 3 is an information processing device that performs specified processing on a plurality of pieces of image information received from the pen scanner 2. The smartphone 3 determines a processing method to be performed on the plurality of pieces of image information from a plurality of processing methods that are prepared in advance, based on the information about the moving path received from the pen scanner 2. Then, the smartphone 3 processes the plurality of pieces of image information by the determined processing method and thereby converts the information into a form corresponding to the processing method.

As specified processing for converting information, OCR (Optical Character Recognition), conversion into JPG (Joint Photographic experts Group) and the like are prepared. Specifically, as a result that a user scans different types of information by different moving paths, the different types of information can be converted into different forms of information. It is thereby possible to store different types of information in appropriate forms.

The smartphone 3 adds an attribute to the converted information and transmits them to the server 4. Specifically, the smartphone 3 adds, to the converted information, attribute information indicating the type (a body, a drawing, a page number etc.) of the information and transmits them to the server 4.

Although an example of using a smartphone as an information processing device that processes image information generated by the pen scanner 2 and transmits it to the server 4 is described hereinafter in this embodiment, the type of the information processing device is not limited thereto. As the information processing device, a PC (Personal Computer), an information terminal with a touch panel which is generally called "tablet" or the like may be used, for example. When the information processing device is a PC, the PC and the server 4 are configured to be able to communicate with each other via wired communication (for example, Internet communication). On the other hand, when the information processing device is a tablet, the tablet and the server 4 are configured to be able to communicate with each other via wireless communication (for example, wireless LAN) and wired communication (for example, Internet).

The server 4 is an information processing device that stores the converted information received from the smartphone 3. The server 4 can collectively store a plurality of pieces of converted information respectively obtained as a result of scanning by a plurality of users.

For example, the pen scanner 2 and the smartphone 3 described above are owned by the same user. Another user can also own the pen scanner 2 and the smartphone 3 described above. Thus, the server 4 can store a plurality of pieces of converted information respectively received from a plurality of smartphones 3 owned by different users.

Figure 2:
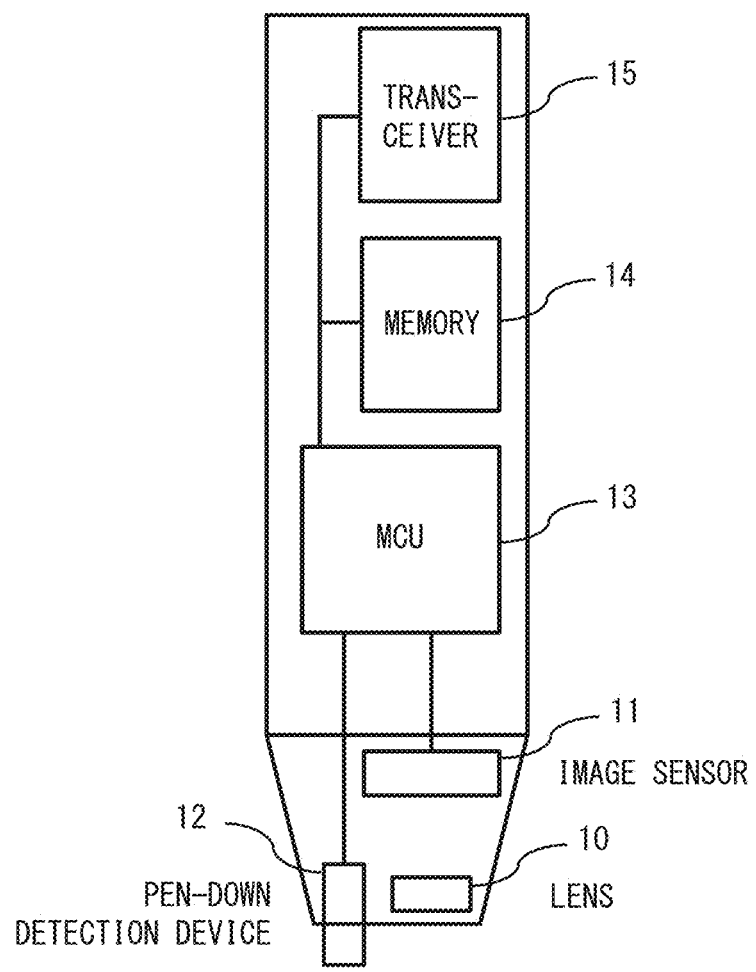
FIG. 2 is a view showing a hardware configuration of a pen scanner according to the first embodiment.

The hardware configuration of the pen scanner 2 according to the first embodiment is described hereinafter with reference to FIG. 2. As shown in FIG. 2, the pen scanner 2 includes a lens 10, an image sensor 11, a pen-down detection device 12, an MCU 13, a memory 14, and a transceiver 15.

The lens 10 forms an image of a part of a medium that is illuminated by a light source (not shown) on the image sensor 11. The image sensor 11 photoelectrically converts the image formed by the lens and thereby generates image information. Stated differently, the image sensor 11 takes an image of (scans) a part of a medium (for example, a part of a page of a paper book), generates image information presenting the part of the medium as an electronic image, and outputs it to the MCU 13. One image presented by one piece of image information is an image showing a selected character of a text (for example, one character or a part of one character) written in a paper book or a part of a drawing, for example. The image sensor 11 generates the image information by performing scanning at a specified time interval. Hereinafter, each image at a specified time interval is also referred to as "frame".

The pen-down detection device 12 is a device that detects that the pen scanner 2 is in the pen-down state. Stated differently, the pen-down detection device 12 determines whether an imaging unit (the lens 10 and the image sensor 11) mounted on the pen point of the pen scanner 2 is in close proximity to a medium at a predetermined distance or less. As the pen-down detection device 12, a switch or a pressure sensor, for example, may be used.

(1) When a Switch is Used as the Pen-Down Detection Device 12

A switch generates a notification signal indicating whether the switch is pressed or not and outputs it to the MCU 13. When a contact surface of the switch is pressed against a medium, that is, when the switch is pressed, the switch generates a notification signal indicating that the switch is pressed and outputs it to the MCU 13. On the other hand, when contact surface of the switch is not pressed against a medium, that is, when the switch is not pressed, the switch generates a notification signal indicating that the switch is not pressed and outputs it to the MCU 13.

When the notification signal indicating that the switch is pressed is input from the switch, the MCU 13 determines that the pen scanner 2 is in the pen-down state. On the other hand, when the notification signal indicating that the switch is not pressed is input from the switch, the MCU 13 determines that the pen scanner 2 is in the pen-up state.

(2) When a Pressure Sensor is Used as the Pen-Down Detection Device 12

A pressure sensor detects a pressure that is applied from a medium, generates a notification signal indicating the detected pressure and outputs it to the MCU 13. When the pressure indicated by the notification signal input from the pressure sensor is equal to or more than a specified threshold, the MCU 13 determines that the pen scanner 2 is in the pen-down state. On the other hand, when the pressure indicated by the notification signal input from the pressure sensor is less than a specified threshold, the MCU 13 determines that the pen scanner 2 is in the pen-up state.

The MCU 13 is a device that controls the pen scanner 2. For example, the MCU 13 acquires the image information generated by the image sensor 11 and stores it into the memory 14. The memory 14 is a storage device in which various types of data are stored.

The transceiver 15 is a device that wirelessly transmits and receives various types of data to and from the smartphone 3. For example, the transceiver 15 converts the image information stored in the memory 14 from an electrical signal to a radio signal and transmits it to the smartphone 3.

Figure 3:
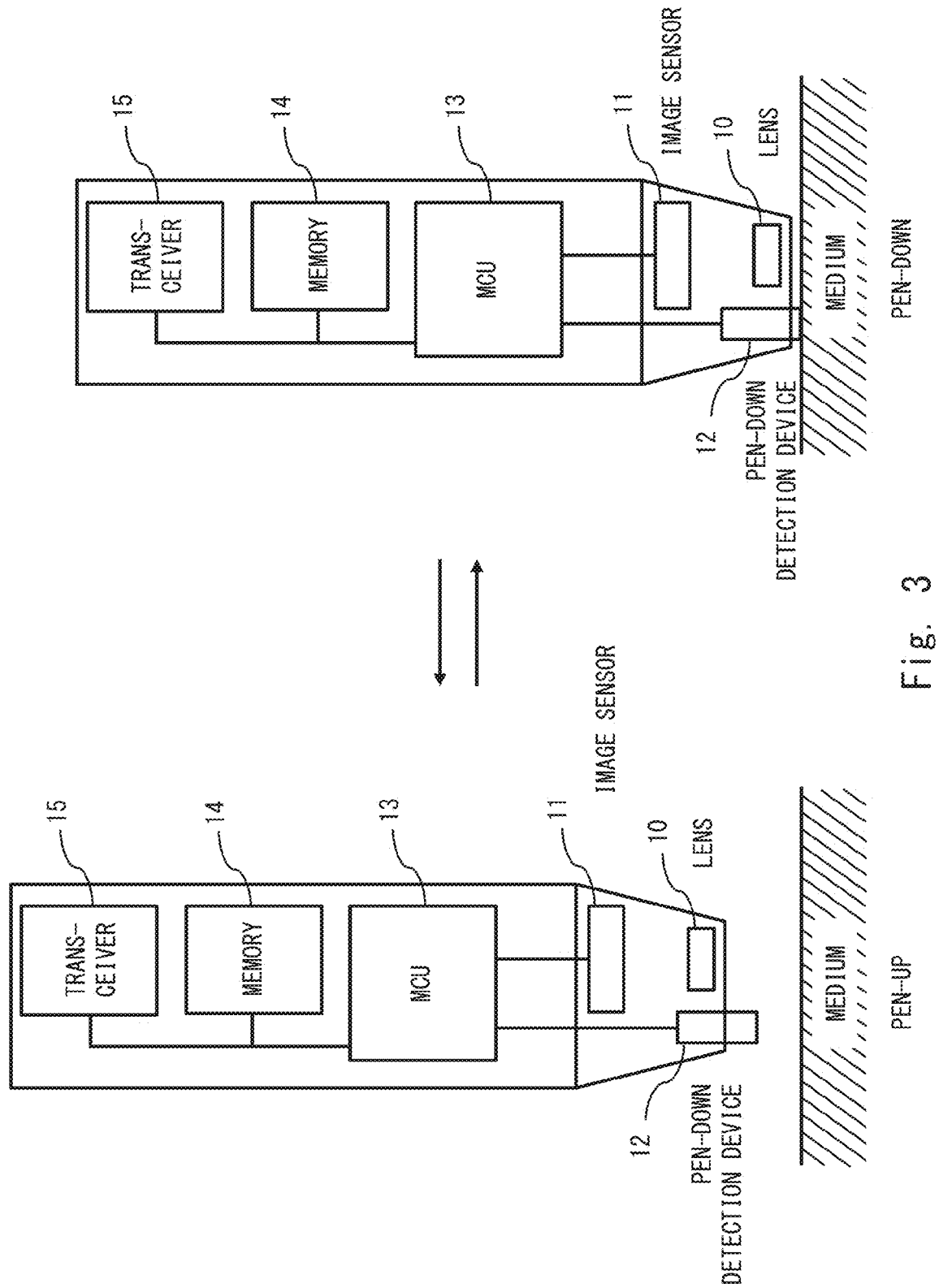
FIG. 3 is a view showing the pen-up state and the pen-down state of the pen scanner according to the first embodiment.

In this configuration, when a user brings the pen point of the pen scanner 2 close to a medium in order to scan the medium as shown on the right of FIG. 3, the pen-down detection device 12 is pushed against the medium. The MCU 13 can thereby recognize the pen-down state of the pen scanner 2. On the other hand, when a user brings the pen point of the pen scanner 2 away from a medium in order to stop scanning the medium as shown on the left of FIG. 3, the pen-down detection device 12 is not pushed against the medium. The MCU 13 can thereby recognize the pen-up state of the pen scanner 2.

Figure 4:
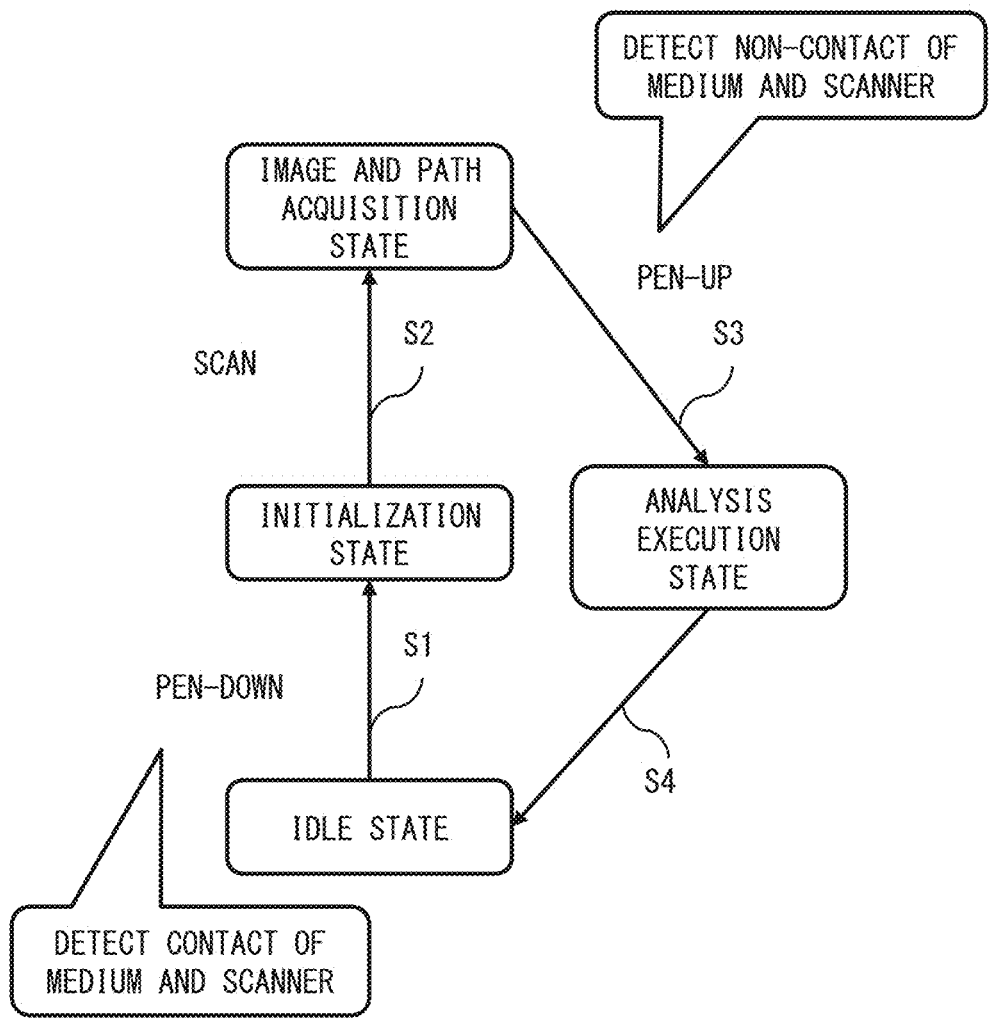
FIG. 4 is a state transition diagram of the pen scanner according to the first embodiment.

The state transition of the pen scanner 2 according to the first embodiment is described hereinafter with reference to FIG. 4. The pen scanner 2 transitions between four states: "idle state", "initialization state", "image and path acquisition state" and "analysis execution state". The following description is based on the assumption that the initial state of the pen scanner 2 is "idle state".

In "idle state", the MCU 13 of the pen scanner 2 does not store the image information generated by the image sensor 11 into the memory 14. When the MCU 13 determines that the pen scanner 2 is put into the pen-down state based on the notification signal from the pen-down detection device 12, the MCU 13 transitions to "initialization state" (S1).

In "initialization state", the MCU 13 initializes the memory 14. To be specific, the MCU 13 deletes, from the memory 14, image information, path information and vector information that have been stored in the memory 14 in the previous scanning. Note that the path information and the vector information are described later. After initializing the memory 14, the MCU 13 transitions to "image and path acquisition state" (S2).

In "image and path acquisition state", the MCU 13 stores the image information generated by the image sensor 11 into the memory 14. Specifically, as described above, the image sensor 11 generates the image information at a specified time interval. Each time the image information is generated, the MCU 13 stores the image information one by one into the memory 14. When the MCU 13 determines that the pen scanner 2 is put into the pen-up state based on the notification signal from the pen-down detection device 12, the MCU 13 transitions to "analysis execution state" (S3).

When the MCU 13 transitions to "analysis execution state", the MCU 13 stops storing the image information generated by the image sensor 11 into the memory 14. Thus, a plurality of pieces of image information that have been generated by the image sensor 11 during the period from pen-down to pen-up of the pen scanner 2 are stored in the memory 14.

In "analysis execution state", the MCU 13 analyzes the plurality of pieces of image information stored in the memory 14 during "image and path acquisition state", and calculates the moving path of the pen scanner 2 and its vector. To be specific, the analysis is executed in the procedure shown in FIG. 5.

(1) First, the MCU 13 extracts a feature point in each of a plurality of images (a plurality of frames) presented by a plurality of pieces of image information. (2) Next, the MCU 13 calculates the moving path of the pen scanner 2 by checking the same feature point among a plurality of frames. For example, the MCU 13 calculates, as the moving path of the pen scanner 2, a line that connects the points at the same coordinate position in the respective frames (which are the black points at the upper left of the respective frames in the example of FIG. 5) when a plurality of frames are superimposed on one another with the positions of the feature point that is the same among the plurality of frames being aligned. The MCU 13 generates path information indicating the calculated moving path and stores the path information into the memory 14 in association with the plurality of pieces of image information used for the calculation of the path information. (3) Then, the MCU 13 applies linear approximation to the moving path of the pen scanner 2 and thereby calculates a vector (so-called motion vector) indicating the motion of the pen scanner 2. The MCU 13 generates vector information indicating the calculated vector and stores the vector information into the memory 14 in association with the plurality of pieces of image information used for the calculation of the vector information.

Figure 5:
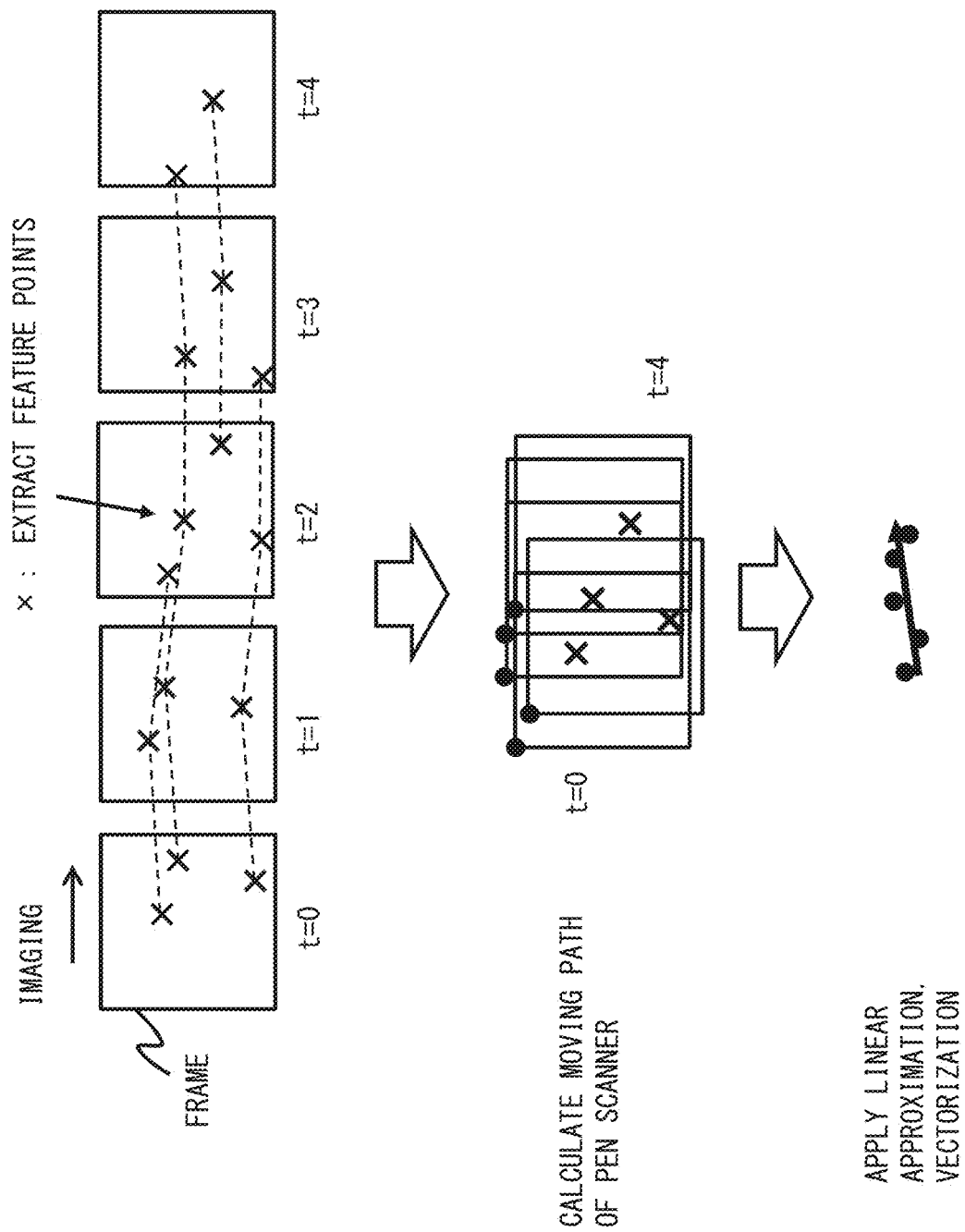
FIG. 5 is a view showing a calculation method of a moving path of the pen scanner and a vector according to the first embodiment.

The calculation of the vector is performed for every specified number of frames. Stated differently, for a plurality of pieces of image information stored in the memory 14, the MCU 13 calculates a vector from the points calculated as the moving path for every specified number of pieces of image information. A plurality of pieces of image information stored in the memory 14 may be sorted into groups of a specified number on the time series, and the moving path and the vector may be calculated for each group. Further, a specified number of pieces of image information that form a group for the calculation of the moving path and the vector may partly overlap with a specified number of pieces of image information that form another group for the calculation of the moving path and the vector. Note that, although FIG. 5 illustrates an example where the specified number is 5 (for example, time t=0 to time t=4 in FIG. 5), it is not limited thereto.

A calculation method of the moving path of the pen scanner 2 is specifically described hereinafter with reference to FIG. 6. As a method of calculating the moving path of the pen scanner 2, a method that is used in an optical mouse may be employed.

Figure 6:
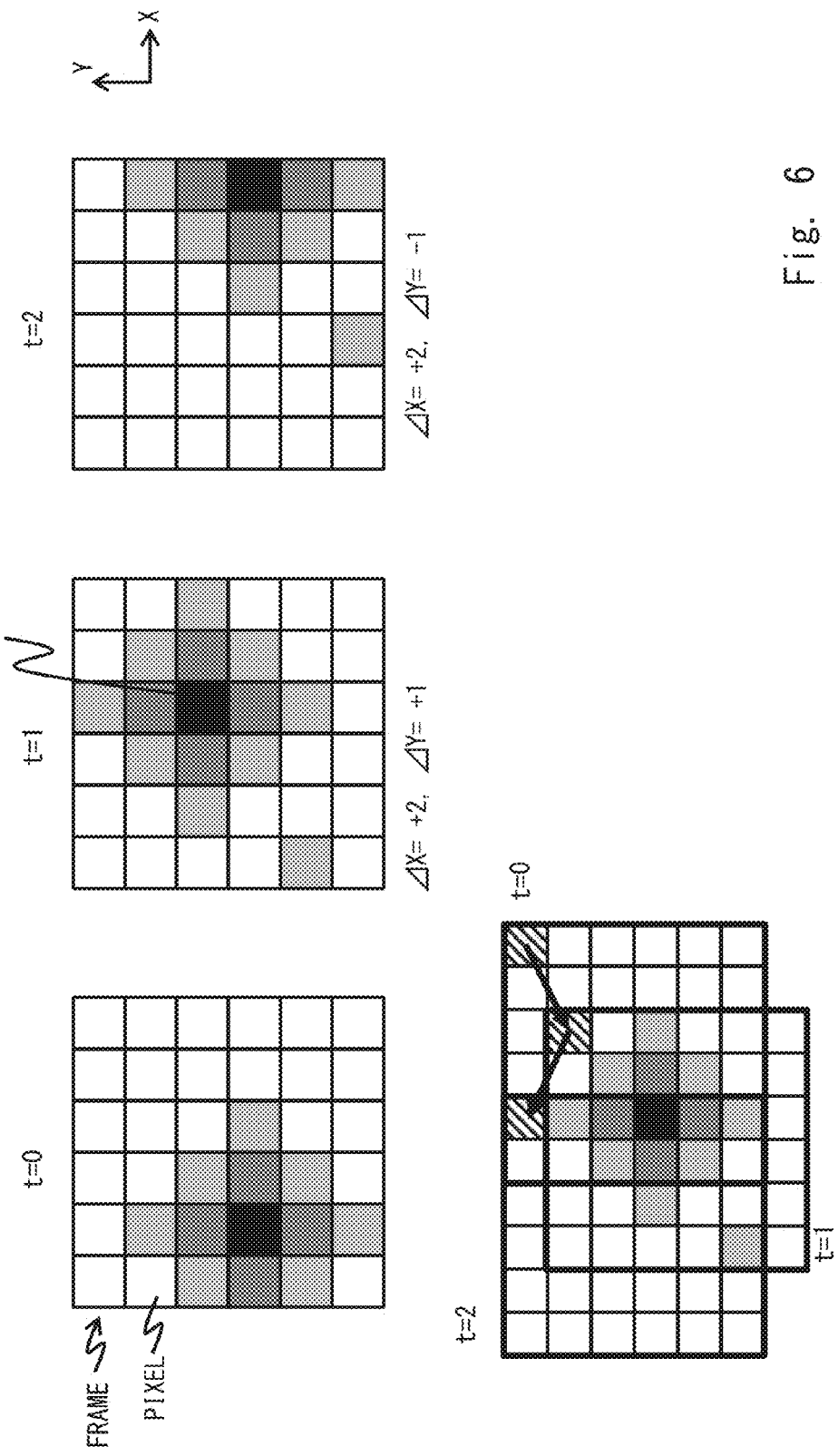
FIG. 6 is a view schematically showing a calculation method of a moving path of the pen scanner according to the first embodiment.

As shown in FIG. 6, a frame contains a plurality of pixels. Although FIG. 6 shows a frame of 6×6 pixels for simplification of the description, an actual frame size is larger than this size as a matter of course. Further, it is assumed in FIG. 6 that the axis that is parallel to the vertical direction is the Y axis, and the axis that is parallel to the horizontal direction is the X axis. As shown in FIG. 6, the MCU 13 extracts, as a feature point, a point that is distinguishable from the other part of a medium by a difference in density. The difference in density is caused by the unevenness on a medium, the presence or absence of a character and the like, for example.

In FIG. 6, from time t=0 to time t=1, the feature point moves by +2 in the X direction and +1 in the Y direction within the frame. From time t=1 to time t=2, the feature point moves by +2 in the X direction and −1 in the Y direction within the frame. In this case, the moving path of the same coordinate position in the respective frames (which is the uppermost and rightmost pixel in the example of FIG. 6) when a plurality of frames are superimposed on one another with the positions of the feature point that is the same among the plurality of frames being aligned is obtained as the moving path of the pen scanner 2. Specifically, the moving path that moves by −2 in the X direction and −1 in the Y direction from time t=0 to time t=1 and moves by −2 in the X direction and +1 in the Y direction from time t=1 to time t=2 is obtained as the moving path of the pen scanner 2.

When the calculation of the vector ends, the MCU 13 transmits a plurality of pieces of image information and a plurality of pieces of vector information stored in the memory 14 to the smartphone 3 through the transceiver 15. The smartphone 3 thereby determines a processing method to be performed on the plurality of pieces of image information based on the plurality of pieces of vector information received from the pen scanner 2.

Note that, although an example where the path information is generated by the MCU 13 is described above, it is not limited thereto. For example, an image sensor of an optical mouse may be used as the image sensor 11, and the path information that is generated by a DSP (Digital Signal Processor) included in the image sensor may be acquired.

The detailed configuration of the scanning system 1 according to the first embodiment is described hereinafter with reference to FIG. 7.

Figure 7:
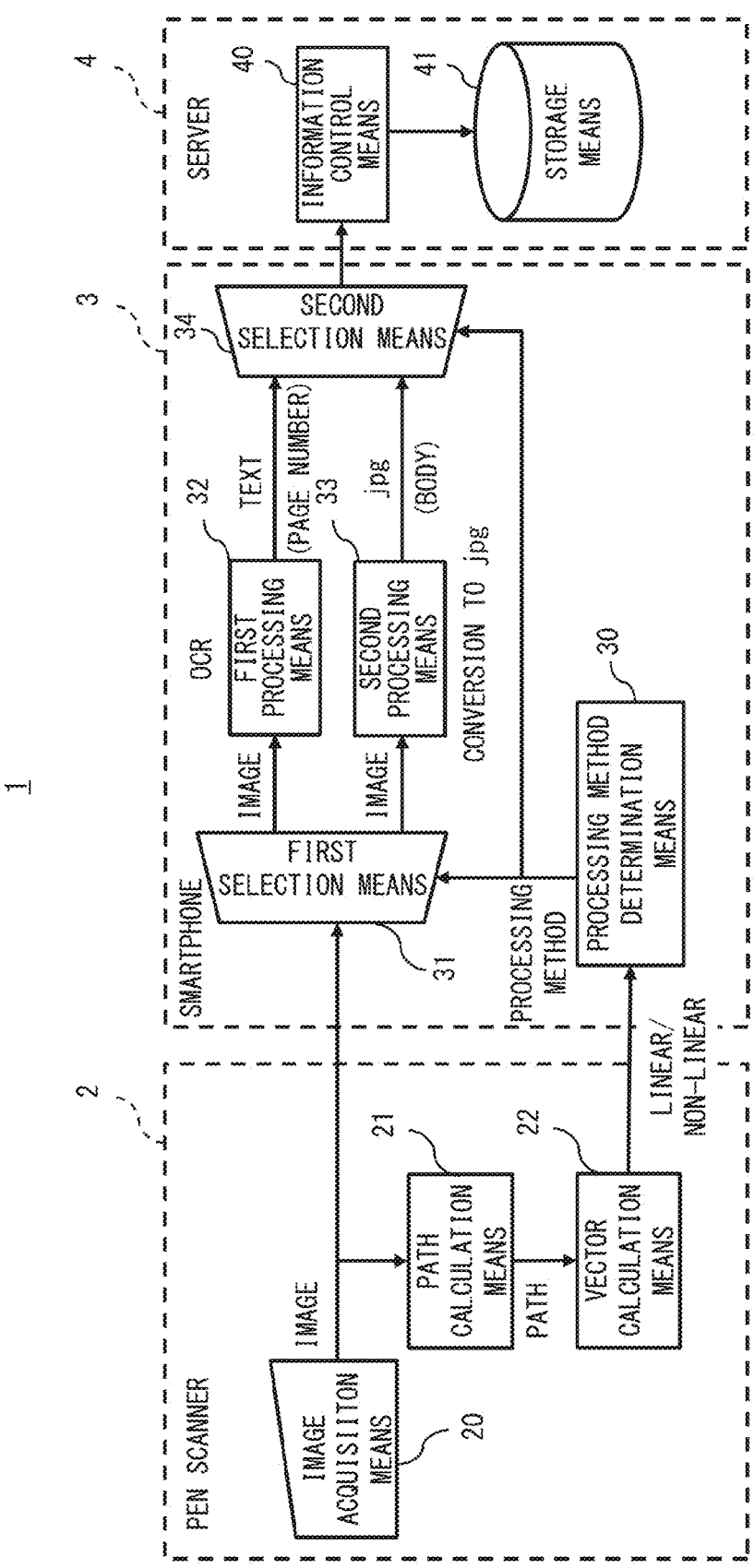
FIG. 7 is a view showing a detailed configuration of the scanning system according to the first embodiment.

As shown in FIG. 7, the pen scanner 2 includes an image acquisition means 20, a path calculation means 21, and a vector calculation means 22.

The image acquisition means 20 scans a medium during the period when the pen scanner 2 is in the pen-down state, and thereby sequentially generates image information representing the medium as an image and holds them. Specifically, the image acquisition means 20 generates a plurality of pieces of image information presenting a part of a medium that has been scanned when the pen scanner 2 is in the pen-down state as a plurality of images and holds them. When the pen scanner 2 is put into the pen-up state, the image acquisition means 20 transmits the plurality of pieces of held image information to the smartphone 3. Specifically, the lens 10, the image sensor 11, the pen-down detection device 12, the MCU 13, the memory 14 and the transceiver 15 operate as the image acquisition means 20.

The path calculation means 21 calculates the moving path of the pen scanner 2 based on the plurality of pieces of image information held by the image acquisition means 20 when the pen scanner 2 is put into the pen-up state. Specifically, the pen-down detection device 12, the MCU 13 and the memory 14 operate as the path calculation means 21.

The vector calculation means 22 calculates a plurality of vectors in the moving path of the pen scanner 2 based on the moving path of the pen scanner 2 calculated by the path calculation means 21, and generates a plurality of pieces of vector information indicating the plurality of calculated vectors. The vector calculation means 22 transmits the plurality of pieces of generated vector information to the smartphone 3. Specifically, the MCU 13, the memory 14 and the transceiver 15 operate as the vector calculation means 22.

Further, as shown in FIG. 7, the smartphone 3 includes a processing method determination means 30, a first selection means 31, a first processing means 32, a second processing means 33, and a second selection means 34.

The processing method determination means 30 receives the plurality of pieces of vector information transmitted from the vector calculation means 22 of the pen scanner 2.

The processing method determination means 30 determines whether the moving path of the pen scanner 2 is linear or non-linear based on the plurality of vectors indicated by the plurality of pieces of received vector information.

When the processing method determination means 30 determines that the moving path of the pen scanner 2 is linear, it determines to process the plurality of pieces of image information received from the pen scanner 2 by a first processing method performed by the first processing means 32. On the other hand, when the processing method determination means 30 determines that the moving path of the pen scanner 2 is non-linear, it determines to process the plurality of pieces of image information received from the pen scanner 2 by a second processing method performed by the second processing means 33.

A method of calculating the vectors of the moving path of the pen scanner 2 and a method of determining whether the moving path of the pen scanner 2 is linear or non-linear are specifically described hereinafter with reference to FIG. 8.

Figure 8:
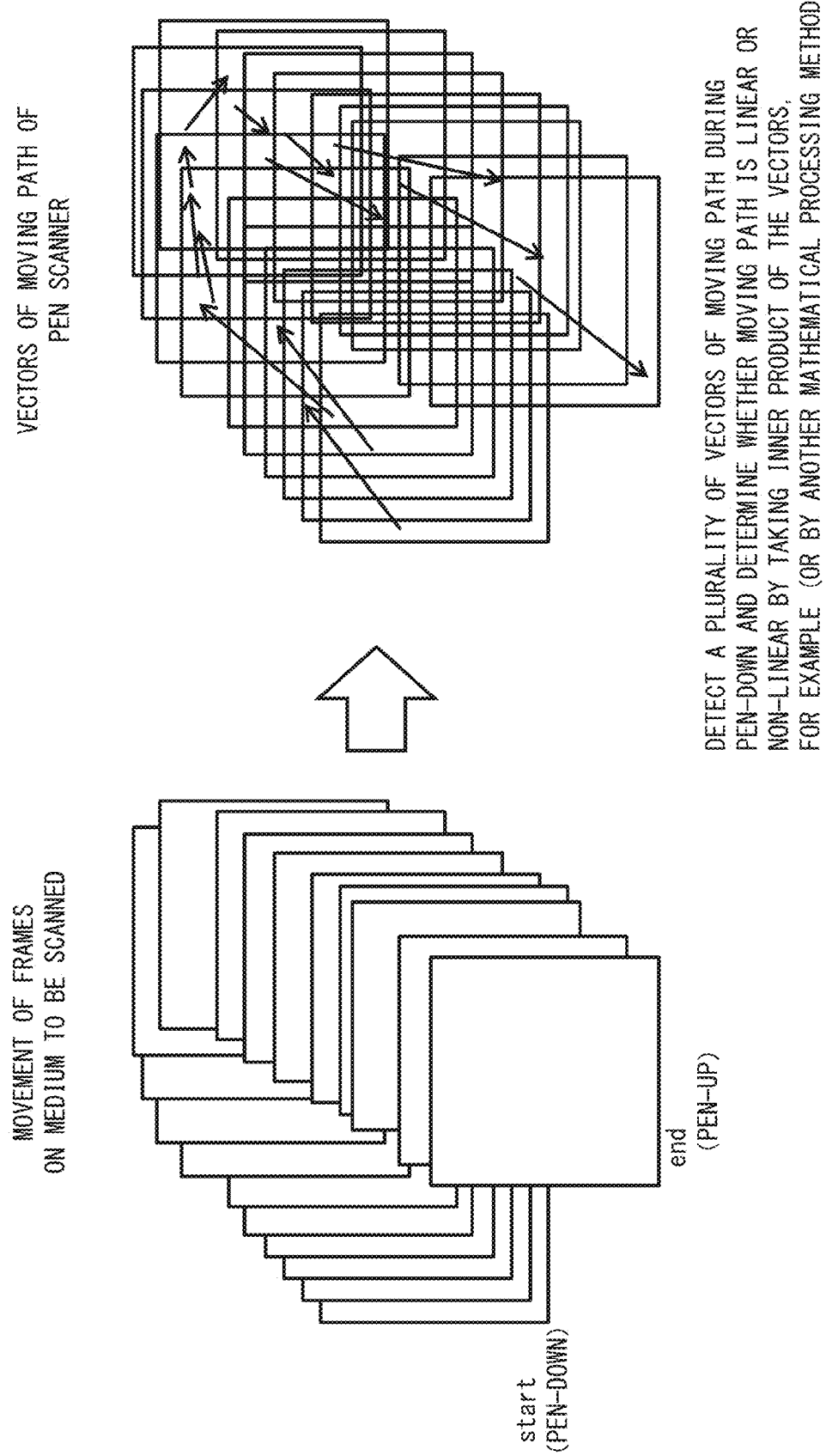
FIG. 8 is a view showing a calculation method of a vector of a moving path, and a determination method of the moving path, of the pen scanner according to the first embodiment and a determination method of the moving path.

For example, as shown in FIG. 8, it is assumed that a user continuously scans a medium during the period from pen-down to pen-up. As described earlier, a plurality of vectors of the moving path of the pen scanner 2 are calculated for every specified number of frames. The processing method determination means 30 calculates the inner product of the vectors calculated in this manner, for example, and thereby determines whether the moving path of the pen scanner 2 is linear or non-linear.

The processing method determination means 30 selects two vectors from the plurality of vectors and calculates the inner product of the two selected vectors. In a simple way, when the inner product of the two vectors is equal to the product of the size of those two vectors, it can be determined that those two vectors are linear, and otherwise it can be determined that those two vectors are non-linear. However, in the case where vectors are determined to be non-linear by such a determination method, even when a user intends to move the pen scanner 2 linearly, they are determined to be non-linear if the moving path is curved only slightly. Therefore, it is preferred to determine that two vectors are linear when the proportion of the inner product of the two vectors to the product of the size of those two vectors is equal to or more than a specified value. On the other hand, it is preferred to determine that two vectors are non-linear when the proportion of the inner product of the two vectors to the product of the size of those two vectors is less than a specified value. For example, in the case where an error with which a vector is regarded as being linear when a user scans a medium with the pen scanner 2 is 15°, the above proportion may be 0.966 (=cos 15°).

Stated differently, when an angular difference between two vectors is equal to or less than a specified angle, the processing method determination means 30 determines that those two vectors are linear. On the other hand, when an angular difference between two vectors is more than a specified angle, the processing method determination means 30 determines that those two vectors are non-linear.

As a pair of two vectors to calculate the inner product, any pair may be employed. For example, the inner product may be calculated for all possible pairs formed by selecting two vectors from a plurality of vectors, or the inner product may be calculated for pairs formed by selecting two vectors that are temporally successive.

Then, when an angular difference between two vectors is equal to or less than a specified angle for all pairs, the processing method determination means 30 determines that the moving path of the pen scanner 2 is linear. On the other hand, when an angular difference between two vectors is more than a specified angle for at least one pair, the processing method determination means 30 determines that the moving path of the pen scanner 2 is non-linear.

The first selection means 31 receives the plurality of pieces of image information transmitted from the image acquisition means 20 of the pen scanner 2. The first selection means 31 outputs the plurality of pieces of received image information to one of the first processing means 32 and the second processing means 33 in accordance with a determination result of the processing method determination means 30. To be specific, when the processing method determination means 30 determines to process the plurality of pieces of image information by a first processing method, the first selection means 31 outputs the plurality of pieces of received image information to the first processing means 32. On the other hand, when the processing method determination means 30 determines to process the plurality of pieces of image information by a second processing method, the first selection means 31 outputs the plurality of pieces of received image information to the second processing means 33.

As the first processing method, the first processing means 32 combines a plurality of images presented by the plurality of pieces of image information, performs OCR on a character sequence contained in the image generated by the combining, generates text information where the character sequence is presented in the form of an electronic text, and adds an attribute to the generated text information. For example, the text information is a text file (with the extension "txt", for example), a file that can be used with an arbitrary text editor (with the extension "doc" or "docx", for example) or the like.

As the second processing method, the second processing means 33 combines a plurality of images presented by the plurality of pieces of image information, compresses the image generated by the combining, generates compressed image information presenting the compressed image, and adds an attribute to the generated compressed image information. For example, the generated compressed image information is a JPG file, a GIF (Graphics Interchange Format) file, a PNG (Portable Network Graphics) file or the like. Hereinafter, an example that generates a JPG file as the compressed image information is described in this embodiment.

Each of the first processing means 32 and the second processing means 33 combines a plurality of images in the state where those images are superimposed on one another with the positions of the feature point that is the same among the plurality of images being aligned. In this manner, it is possible to combine a plurality of images by superimposing a part that is the same among the plurality of images on one another.

The second selection means 34 acquires the text information or the compressed image information that is generated by one of the first processing method performed by the first processing means 32 and the second processing method performed by the second processing means 33 in accordance with a determination result of the processing method determination means 30. The second selection means 34 transmits the acquired text information or compressed image information to the server 4.

A CPU (Central Processing Unit) included in the smartphone 3, for example, executes a program stored in a storage means (not shown) included in the smartphone 3 and thereby operates as the above-described means 30 to 34. In other words, this program contains a plurality of instructions to cause the CPU to perform the processing as the above-described means 30 to 34. Further, the storage means includes at least one of storage devices such as a volatile memory, a hard disk, and a flash memory (nonvolatile memory), for example.

As shown in FIG. 7, the server 4 includes an information control means 40 and a storage means 41.

The information control means 40 receives the text information or the compressed image information transmitted from the second selection means 34 of the smartphone 3. The information control means 40 stores the received text information or compressed image information into the storage means 41.

The storage means 41 stores the text information or the compressed image information as described above. The storage means 41 includes at least one of storage devices such as a volatile memory, a hard disk, and a flash memory (nonvolatile memory), for example.

A CPU (Central Processing Unit) included in the server 4, for example, executes a program stored in the storage means 41 included in the server 4 and thereby operates as the above-described information control means 40. In other words, this program contains a plurality of instructions to cause the CPU to perform the processing as the above-described information control means 40.

Figure 9:
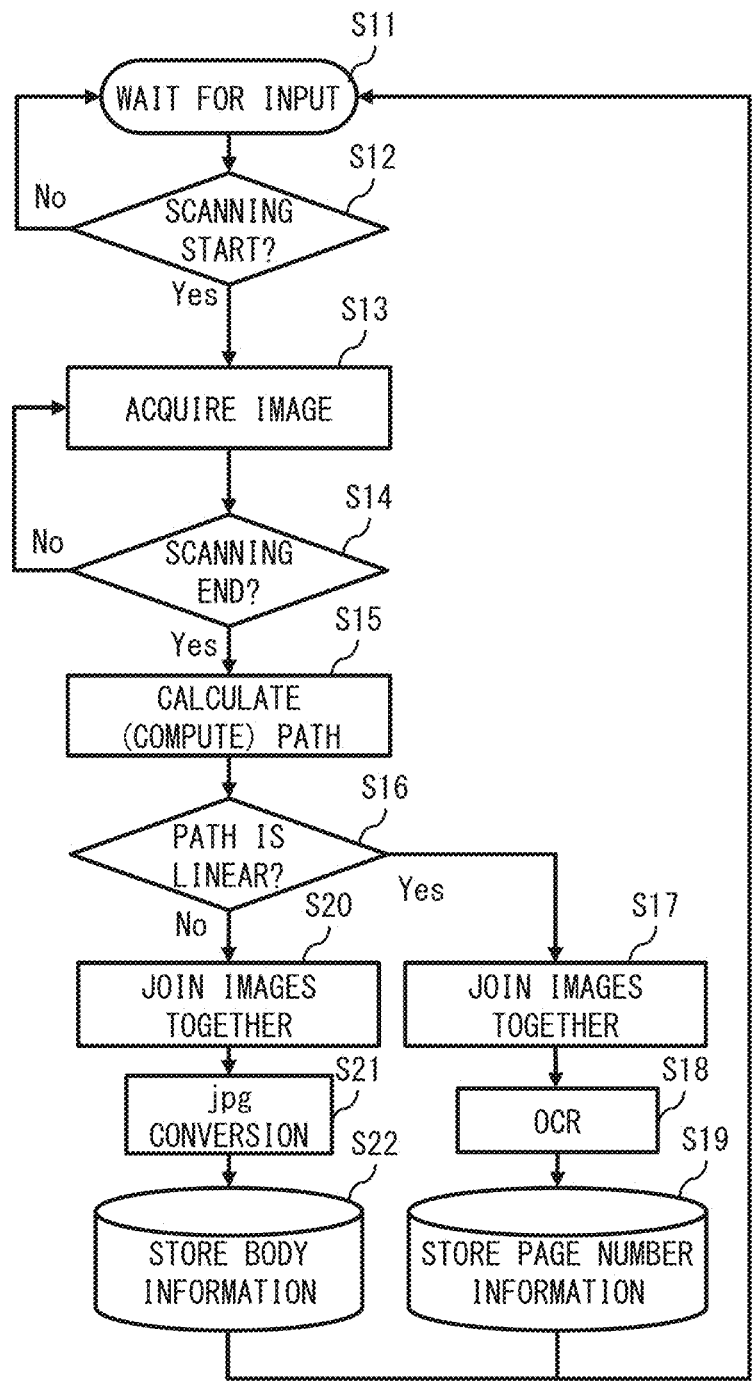
FIG. 9 is a flowchart showing a scanning process of the scanning system according to the first embodiment.

A scanning process of the scanning system 1 according to the first embodiment is described hereinafter with reference to FIG. 9. In the following description, it is assumed that, when a user scans a page number of a paper book, the user scans the page number by moving the pen scanner 2 in a linear moving path. It is also assumed that, when a user scans a body of a paper book, the user scans the body by moving the pen scanner 2 in a non-linear moving path.

The image acquisition means 20 of the pen scanner 2 waits for a user to perform an operation of scanning a medium with the pen scanner 2 (S11 and No in S12). Specifically, the image acquisition means 20 waits for the pen scanner 2 to enter the pen-down state.

When the user performs an operation to scan a medium with the pen scanner 2 (Yes in S12), the image acquisition means 20 starts the scanning of the medium (S13). The image acquisition means 20 repeats the generation and holding of the image information presenting the scanned images of the medium until the user performs an operation to end the scanning of the medium with the pen scanner 2 (S13, No in S14).

When the user performs an operation to end the scanning of the medium with the pen scanner 2 (Yes in S14), the image acquisition means 20 ends the scanning of the medium. Specifically, when the pen scanner 2 is put into the pen-up state, the image acquisition means 20 stops the generation and holding of the image information.

The path calculation means 21 calculates the moving path of the pen scanner 2 based on the plurality of pieces of image information held by the image acquisition means 20 (S15). The vector calculation means 22 calculates a plurality of vectors in the moving path of the pen scanner 2 based on the moving path of the pen scanner 2 calculated by the path calculation means 21, and generates a plurality of pieces of vector information presenting the plurality of calculated vectors. The processing method determination means 30 of the smartphone 3 determines whether the moving path of the pen scanner 2 is linear or not based on the plurality of vectors presented by the plurality of pieces of vector information generated by the vector calculation means 22 (S16).

When the processing method determination means 30 determines whether the moving path of the pen scanner 2 is linear (Yes in S16), the first selection means 31 selects the first processing means 32 as a processing means that processes the plurality of pieces of image information generated by the image acquisition means 20. The first processing means 32 combines the images presented by the plurality of pieces of image information (S17) and performs OCR on a character sequence of a page number contained in the image obtained by the combining (S18). The first processing means 32 thereby generates text information that presents, in the form of an electronic text, the character sequence of the page number contained in the image obtained by the combining. The first processing means 32 adds attribute information indicating the attribute "page number" to the generated text information. The text information is thereby generated as page number information indicating a page number by the first processing means 32.

The second selection means 34 acquires the page number information generated by the first processing means 32. The information control means 40 stores the page number information acquired by the second selection means 34 into the storage means 41 (S19). After that, the scanning system 1 restarts the operation from Step S11.

When the processing method determination means 30 determines whether the moving path of the pen scanner 2 is non-linear (No in S16), the first selection means 31 selects the second processing means 33 as a processing means that processes the plurality of pieces of image information generated by the image acquisition means 20. The second processing means 33 combines the images presented by the plurality of pieces of image information (S20) and generates image information presenting the image obtained by the combining. The second processing means 33 compresses the generated image information and thereby generates compressed image information presenting the compressed image (S21). For example, the second processing means 33 converts an uncompressed file presenting the image obtained by the combining into a JPG file. The second processing means 33 adds attribute information indicating the attribute "body" to the generated compressed image information. The compressed image information is thereby generated as body information presenting a body by the second processing means 33.

The second selection means 34 acquires the body information generated by the second processing means 33. The information control means 40 stores the body information acquired by the second selection means 34 into the storage means 41 (S22). After that, the scanning system 1 restarts the operation from Step S11.

The effects of the first embodiment are described hereinafter with reference to FIG. 10. In the scanning system 1 according to the first embodiment, when a user scans a medium by linearly moving the pen scanner 2, it is possible to convert a character string shown on the scanned part of the medium into an electronic text and store it into the server 4.

Further, in the scanning system 1 according to the first embodiment, when a user scans a medium by non-linearly moving the pen scanner 2, it is possible to convert a character string or a drawing shown on the scanned part of the medium into an electronic image, compress this image, and store it into the server 4.

In this configuration, when a user wishes to scan a page number of a paper book, the user scans it by linearly moving the pen scanner 2, and when a user wishes to scan a body of a paper book, the user scans it by non-linearly moving the pen scanner 2 as shown in FIG. 10, for example, and it is thereby possible to store the page number and the body in different forms from each other. Specifically, when a user wishes to store a page number in the form of an electronic text and store a body in the form of an electronic image, it is possible to store the page number and the body respectively in appropriate forms.

As described above, according to the first embodiment, (1) acquisition of information, (2) conversion of and attribute addition to acquired information and (3) storage can be done in a single action that scans a medium with the pen scanner 2. This eliminates the need for an operation that specifies the type (attribute) of information before scanning the information in a medium, for example. In other words, there is no need for operations other than scanning, thereby enhancing the convenience. Thus, in the scanning system 1 according to the first embodiment, it is possible to store different types of information on a medium to be scanned in appropriate forms with a simple operation.

Although an example where the calculation of the moving path of the pen scanner 2 and the vectors is performed in the pen scanner 2 is described above, it is not limited thereto. For example, the smartphone 3 may perform the calculation of the moving path of the pen scanner 2 and the vectors. Specifically, the smartphone 3 may include the path calculation means 21 and the vector calculation means 22.

Further, although an example where the determination of a processing method of image information and the processing of the image information by the determined processing method are performed in the smartphone 3 is described above, it is not limited thereto. For example, the pen scanner 2 may perform the determination of a processing method of image information and the processing of the image information by the determined processing method. Specifically, the pen scanner 2 may include the means 30 to 34, which the smartphone 3 includes in the above description. In this case, the smartphone 3 operates as a device that relays the text information and the compressed image information generated by the pen scanner 2 to the server 4. Further, in this case, the text information and the compressed image information may be stored in the pen scanner 2, rather than being transmitted to the server 4.

Further, all of the calculation of the moving path of the pen scanner 2 and the vectors, the determination of a processing method of image information, and the processing of the image information by the determined processing method may be performed in the server 4. Specifically, the server 4 may include the means 21, 22, 30 to 34 described above. In this case, the smartphone 3 operates as a device that relays the image information generated by the pen scanner 2 to the server 4.

Furthermore, although an example where the text information and the compressed image information are stored in the server 4 is described above, it is not limited thereto. For example, the text information and the compressed image information may be stored in the smartphone 3, rather than being transmitted to the server 4.

Figure 36:
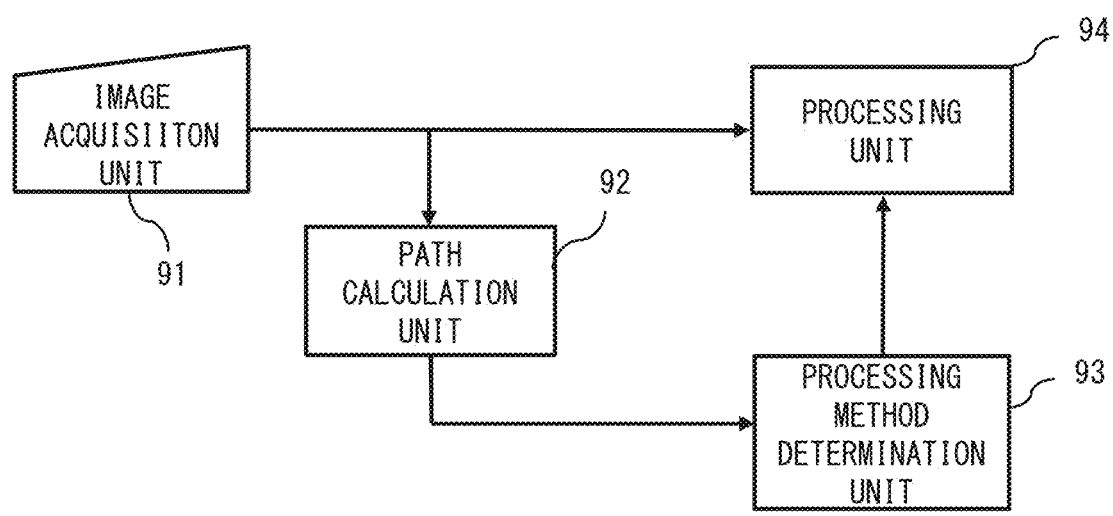
FIG. 36 is a view showing a configuration of a scanning system, which is a schematic configuration according to an embodiment.

As described above, according to the first embodiment, as shown in the schematic configuration of FIG. 36, an image acquisition unit 91 (which corresponds to the image acquisition means 20) acquires a plurality of pieces of image information generated by continuously scanning a medium to be scanned. A path calculation unit 92 (which corresponds to the path calculation means 21) calculates a path of scanning the medium based on the plurality of pieces of image information acquired by the image acquisition unit 91. A processing method determination unit 93 (which corresponds to the processing method determination means 30) determines a processing method of the plurality of pieces of image information in accordance with the path calculated by the path calculation unit 92. Then, a processing unit 94 (which corresponds to the first processing means 32 and the second processing means 33) processes the plurality of pieces of image information by the processing method determined by the processing method determination unit 93 and thereby converts the plurality of pieces of image information into information in the forms corresponding to the processing method.

In this configuration, by an operation of scanning a medium, a conversion method of image information obtained by the scanning can be specified. Therefore, according to the first embodiment, it is possible to store different types of information on a medium to be scanned in appropriate forms with a simple operation.

Second Embodiment

A second embodiment is described hereinafter. In the following description, the same matter as in the first embodiment described above is denoted by the same reference symbol or the like, and the description thereof is omitted as appropriate. The schematic configuration of the scanning system 1 according to the second embodiment is the same as the schematic configuration of the scanning system 1 according to the first embodiment and thus not redundantly described.

Figure 11:
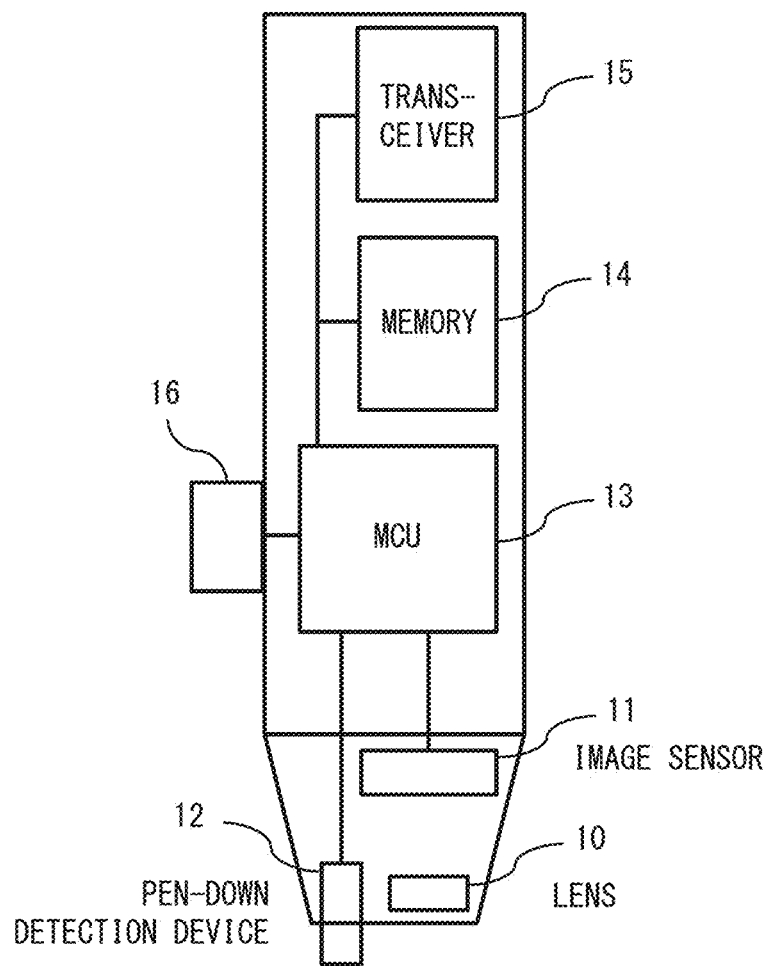
FIG. 11 is a view showing a hardware configuration of a pen scanner according to a second embodiment.

The hardware configuration of the pen scanner 2 according to the second embodiment is described hereinafter with reference to FIG. 11. The pen scanner 2 according to the second embodiment is different from the pen scanner 2 according to the first embodiment in that it further includes an operating state switch button 16.

The operating state switch button 16 is an input device on which a user performs an operation to switch the operating state of the pen scanner 2. The operating state switch button 16 generates a notification signal indicating whether it is pressed by a user or not, and outputs it to the MCU 13. When pressed, the operating state switch button 16 generates a notification signal indicating that it is pressed, and outputs it to the MCU 13. When not pressed, the operating state switch button 16 generates a notification signal indicating that it is not pressed, and outputs it to the MCU 13.

When the notification signal indicating that the operating state switch button 16 is pressed is input from the operating state switch button 16 at the time of scanning a medium, the MCU 13 transmits, to the smartphone 3, notification information indicating that the operating state of the pen scanner 2 at the time of scanning a medium is a first state, together with a plurality of pieces of image information and a plurality of pieces of vector information. On the other hand, when the notification signal indicating that the operating state switch button 16 is not pressed is input from the operating state switch button 16 at the time of scanning a medium, the MCU 13 transmits, to the smartphone 3, notification information indicating that the operating state of the pen scanner 2 at the time of scanning a medium is a second state, together with a plurality of pieces of image information and a plurality of pieces of vector information.

Figure 12:
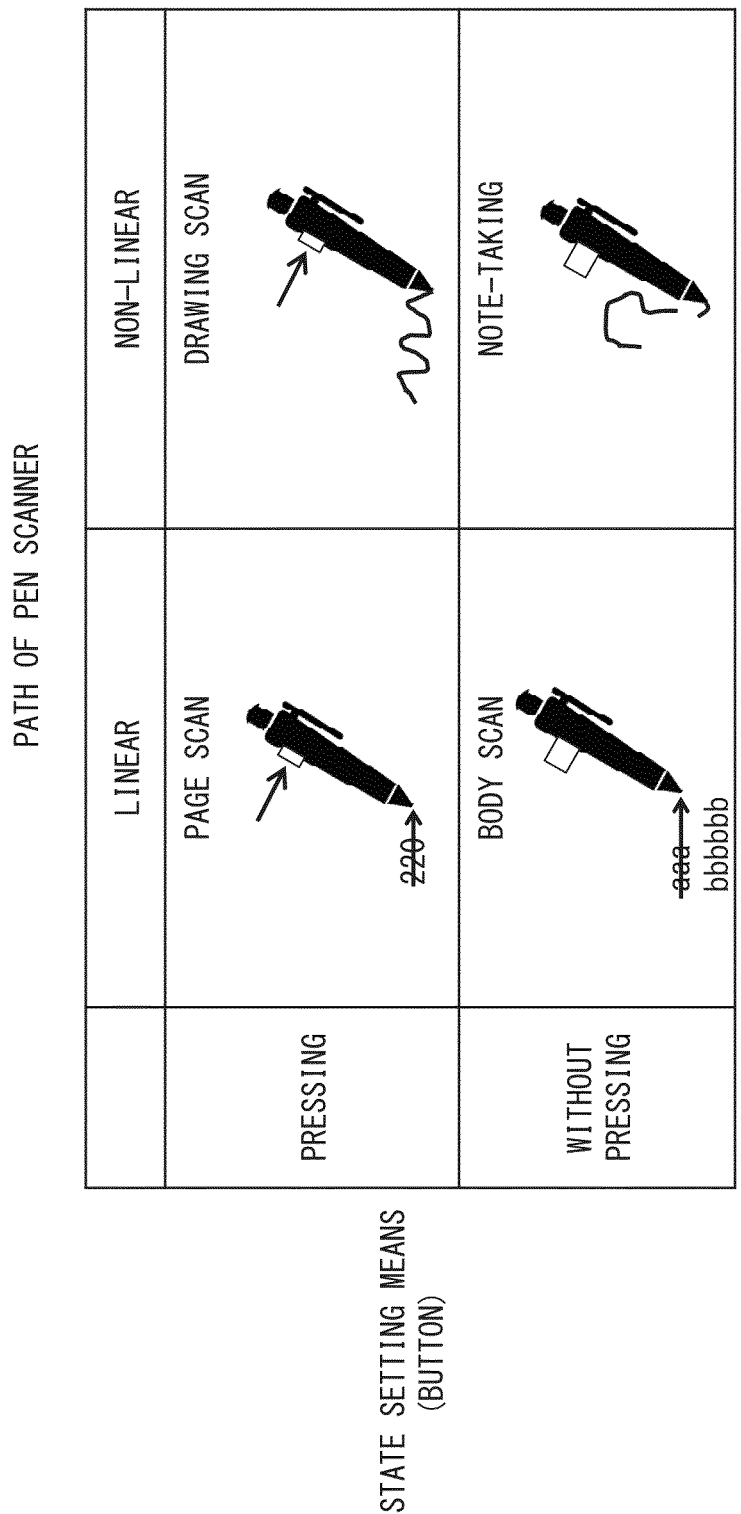
FIG. 12 is a view showing the relationship between an operating state and a moving path and a processing method according to the second embodiment.

A method of determining a processing method according to the second embodiment is described hereinafter with reference to FIG. 12.

In the first embodiment, the type of information that is input by scanning is specified based on whether the moving path of the pen scanner 2 is linear or not when scanning a medium. On the other hand, in the second embodiment, the type of information that is input by scanning can be specified also based on whether the operating state switch button 16 is pressed or not (whether the pen scanner 2 is the first state or the second state) when scanning a medium. In other words, in the second embodiment, four types of information can be specified as the type of information that is input by scanning by the combination of whether the moving path of the pen scanner 2 is linear or not and whether the operating state switch button 16 is pressed or not as shown in FIG. 12.

Specifically, the scanning system 1 according to the second embodiment determines the type of information that is input by scanning as described in the following (1) to (4).

(1) When the moving path of the pen scanner 2 is linear and the operating state switch button 16 is pressed (i.e. the operating state of the pen scanner 2 is the first operating state), the smartphone 3 determines that the information that is input by scanning is a page number.

(2) When the moving path of the pen scanner 2 is non-linear and the operating state switch button 16 is pressed (i.e. the operating state of the pen scanner 2 is the first operating state), the smartphone 3 determines that the information that is input by scanning is a drawing (3) When the moving path of the pen scanner 2 is linear and the operating state switch button 16 is not pressed (i.e. the operating state of the pen scanner 2 is the second operating state), the smartphone 3 determines that the information that is input by scanning is a body.

(4) When the moving path of the pen scanner 2 is non-linear and the operating state switch button 16 is not pressed (i.e. the operating state of the pen scanner 2 is the second operating state), the smartphone 3 determines that the information that is input by scanning is notes.

Note that the correspondence between the combination of whether the moving path of the pen scanner 2 is linear or not and whether the operating state switch button 16 is pressed or not and the type of information that is input by scanning is not limited to the above-described example. For example, when the moving path of the pen scanner 2 is linear and the operating state switch button 16 is pressed, information that is input by scanning may be a body, and when the moving path of the pen scanner 2 is linear and the operating state switch button 16 is not pressed, information that is input by scanning may be a page number. For example, when the moving path of the pen scanner 2 is non-linear and the operating state switch button 16 is pressed, information that is input by scanning may be notes, and when the moving path of the pen scanner is non-linear and the operating state switch button 16 is not pressed, the information that is input by scanning may be a drawing.

Further, in the second embodiment, when the calculation of vectors ends, the MCU 13 transmits path information stored in the memory 14, together with a plurality of pieces of image information and a plurality of pieces of vector information stored in the memory 14, to the smartphone 3.

The detailed configuration of the scanning system 1 according to the second embodiment is described hereinafter with reference to FIG. 13.

Figure 13:
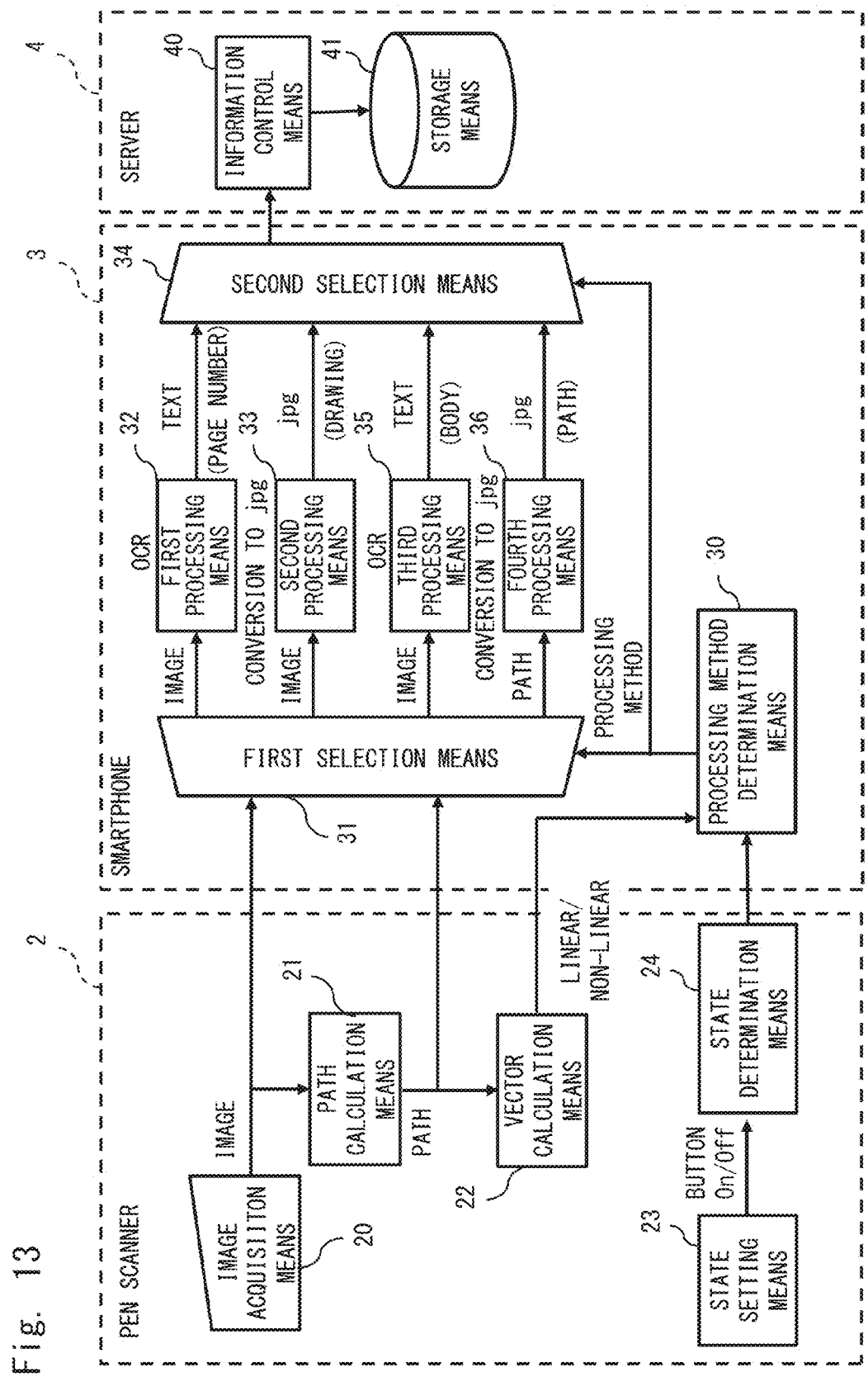
FIG. 13 is a view showing a detailed configuration of the scanning system according to the second embodiment.

As shown in FIG. 13, the pen scanner 2 according to the second embodiment is different from the pen scanner 2 according to the first embodiment in that it further includes a state setting means 23 and a state determination means 24.

The path calculation means 21 according to the second embodiment transmits the generated path information to the smartphone 3.

With the state setting means 23, a user performs an operation to set the state of the pen scanner 2. Stated differently, a user sets the state of the pen scanner 2 to the first state or the second state by the state setting means 23. Specifically, the operating state switch button 16 operates as the state setting means 23.

The state determination means 24 determines whether the operating state of the pen scanner 2 is the first state or the second state based on the user's operation on the state setting means 23. The state determination means 24 generates notification information indicating whether the operating state of the pen scanner 2 is the first state or the second state and transmits it to the smartphone 3. Specifically, the MCU 13 operates as the state determination means 24.

Although the notification information is transmitted in association with a plurality of pieces of image information that have been generated from pen-down to pen-up in one scan as described above, the state determination means 24 may determine whether the operating state switch button 16 is pressed or not for the scan based on arbitrary criteria. For example, from pen-down to pen-up, the state determination means 24 may generate the notification information indicating the first state when the operating state switch button 16 is pressed during pen-down, may generate the notification information indicating the first state when the operating state switch button 16 is pressed during pen-up, or may generate the notification information indicating the first state when the operating state switch button 16 is continuously pressed from pen-down to pen-up. The state determination means 24 may generate the notification information indicating the second state in the other cases.

As shown in FIG. 13, the smartphone 3 according to the second embodiment is different from the smartphone 3 according to the first embodiment in that it further includes a third processing means 35 and a fourth processing means 36.

The processing method determination means 30 according to the second embodiment is different from the processing method determination means 30 according to the first embodiment in that it determines a processing method of a plurality of pieces of image information received from the image acquisition means 20 of the pen scanner 2 or path information based on the notification information received from the state determination means 24 of the pen scanner 2 in addition to a plurality of pieces of vector information received from the vector calculation means 22 of the pen scanner 2.

When the moving path of the pen scanner 2 is linear and the operating state of the pen scanner 2 is the first state, the processing method determination means 30 determines to process a plurality of pieces of image information received from the pen scanner 2 by a first processing method performed by the first processing means 32. When the moving path of the pen scanner 2 is non-linear and the operating state of the pen scanner 2 is the first state, the processing method determination means 30 determines to process a plurality of pieces of image information received from the pen scanner 2 by a second processing method performed by the second processing means 33. When the moving path of the pen scanner 2 is linear and the operating state of the pen scanner 2 is the second state, the processing method determination means 30 determines to process a plurality of pieces of image information received from the pen scanner 2 by a third processing method performed by the third processing means 35. When the moving path of the pen scanner 2 is non-linear and the operating state of the pen scanner 2 is the second state, the processing method determination means 30 determines to process path information received from the pen scanner 2 by a fourth processing method performed by the fourth processing means 36.

The first selection means 31 receives a plurality of pieces of image information transmitted from the image acquisition means 20 of the pen scanner 2 and path information. The first selection means 31 outputs the received plurality of image information or path information to one of the first processing means 32, the second processing means 33, the third processing means 35 and the fourth processing means 36 in accordance with a determination result of the processing method determination means 30. To be specific, when the processing method determination means 30 determines to process the plurality of pieces of image information or the path information by the third processing method, the first selection means 31 outputs the plurality of pieces of image information to the third processing means 35. On the other hand, when the processing method determination means 30 determines to process the plurality of pieces of image information or the path information by the fourth processing method, the first selection means 31 outputs the path information to the fourth processing means 36. The cases when the processing method determination means 30 determines to process the plurality of pieces of image information by the first processing method and when the processing method determination means 30 determines to process the plurality of pieces of image information by the second processing method are the same as those described in the first embodiment.

As the third processing method, the third processing means 35 combines a plurality of images presented by the plurality of pieces of image information, performs OCR on a character sequence contained in the image generated by the combining, generates text information where the character sequence is presented in the form of an electronic text, and adds an attribute to the generated text information.

As the fourth processing method, the fourth processing means 36 generates an image presenting the moving path of the pen scanner 2 indicated by the path information as notes, compresses the generated image, generates compressed image information presenting the compressed image, and adds an attribute to the generated compressed image information.

Note that the third processing means 35 also combines a plurality of images in the state where those images are superimposed on one another with the positions of the feature point that is the same among the plurality of images being aligned. The reason is as described earlier.

The second selection means 34 acquires the text information or the compressed image information generated by one of the first processing means 32, the second processing means 33, the third processing means 35 and the fourth processing means 36 in accordance with a determination result of the processing method determination means 30. The second selection means 34 transmits the acquired text information or compressed image information to the server 4.

A CPU included in the smartphone 3, for example, executes a program stored in a storage means included in the smartphone 3, and thereby operates as the third processing means 35 and the fourth processing means 36 in the same manner as the above-described means 30 to 34.

Figure 14:
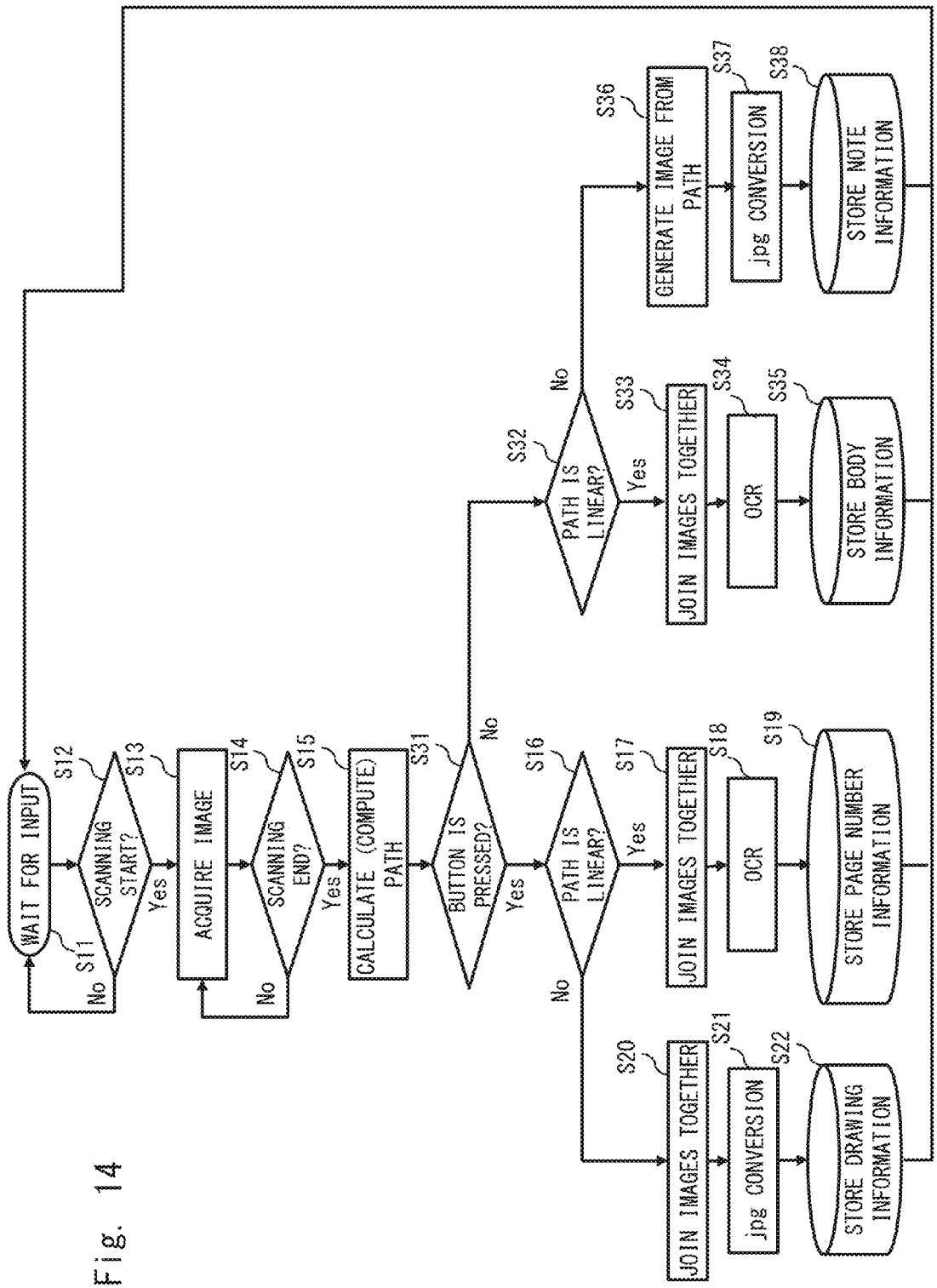
FIG. 14 is a flowchart showing a scanning process of the scanning system according to the second embodiment.

A scanning process of the scanning system 1 according to the second embodiment is described hereinafter with reference to FIG. 14. In the following description, an example where the scanning system 1 operates as follows is described.

It is assumed that, when a user scans a page number of a paper book, the user scans the page number by moving the pen scanner 2 in a linear moving path while pressing the operating state switch button 16. It is also assumed that, when a user scans a drawing of a paper book, the user scans the drawing by moving the pen scanner 2 in a non-linear moving path while pressing the operating state switch button 16. It is also assumed that, when a user scans a body, the user scans the body by moving the pen scanner 2 in a linear moving path without pressing the operating state switch button 16. It is also assumed that, when a user enters notes, the user enters notes by moving the pen scanner 2 in a non-linear moving path without pressing the operating state switch button 16.

The processing steps S11 to S15 are the same as those described in the first embodiment. After the processing step S15, the processing method determination means 30 determines whether the operating state of the pen scanner 2 indicated by the notification information generated by the state determination means 24 is the first state or the second state (S31). As described above, this notification information is information indicating whether the state of the pen scanner 2 during scanning is the first state where the operating state switch button 16 is pressed or the second state where the operating state switch button 16 is not pressed. Stated differently, in Step S31, the processing method determination means 30 determines whether the operating state of the pen scanner 2 during scanning has been the first state or the second state.

When it is determined that the operating state of the pen scanner 2 is the first state where the operating state switch button 16 is pressed (Yes in S31), the processing step S16 to S22 are the same as those described above in the first embodiment. In the second embodiment, however, the second processing means 33 adds attribute information indicating the attribute "drawing" to the generated compressed image information. The compressed image information is thereby generated as drawing information presenting a drawing by the second processing means 33.

When it is determined that the operating state of the pen scanner 2 is the second state where the operating state switch button 16 is not pressed (No in S31), the processing method determination means 30 determines whether the moving path of the pen scanner 2 is linear or not based on a plurality of vectors presented by the plurality of pieces of vector information generated by the vector calculation means 22 (S32).

When the processing method determination means 30 determines that the moving path of the pen scanner 2 is linear (Yes in S32), the first selection means 31 selects the third processing means 35 as a processing means that processes the plurality of pieces of image information generated by the image acquisition means 20. The third processing means 35 combines images presented by the plurality of pieces of image information (S33) and performs OCR on a character sequence of a body contained in the image obtained by the combining (S34). The third processing means 35 thereby generates text information that presents, in the form of an electronic text, the character sequence of the body contained in the image obtained by the combining. The third processing means 35 adds attribute information indicating the attribute "body" to the generated text information. The text information is thereby generated as body information presenting a body by the third processing means 35.

The second selection means 34 acquires the body information generated by the third processing means 35. The information control means 40 stores the body information acquired by the second selection means 34 into the storage means 41 (S35). After that, the scanning system 1 restarts the operation from Step S11.

When the processing method determination means 30 determines whether the moving path of the pen scanner 2 is non-linear (No in S32), the first selection means 31 selects the fourth processing means 36 as a processing means that processes the path information generated by the path calculation means 21. The fourth processing means 36 generates image information presenting an image where the moving path indicated by the path information is handwriting in note-taking (S36). The fourth processing means 36 compresses the generated image information and thereby generates compressed image information presenting the compressed image (S37). For example, the fourth processing means 36 converts an uncompressed file presenting the image obtained by the combining into a JPG file. The fourth processing means 36 adds attribute information indicating the attribute "notes" to the generated compressed image information. The compressed image information is thereby generated as note information presenting notes by the fourth processing means 36.

The second selection means 34 acquires the note information generated by the fourth processing means 36. The information control means 40 stores the note information acquired by the second selection means 34 into the storage means 41 (S38). After that, the scanning system 1 restarts the operation from Step S11.

Although an example where the note information is image information is described above, it is not limited thereto. For example, the note information may be vector data (coordinate information) indicating the positions of the starting and ending points of each line in the moving path (notes). In other words, the note information may be information in any form as long as it is information that presents the path of scanning a medium as notes.

Further, although an example where the setting of the operating state is performed in the pen scanner 2 is described above, it is not limited thereto. For example, the smartphone 3 may perform the setting of the operating state. Specifically, the smartphone 3 may include the state setting means 23 and the state determination means 24. In this case, an input means (for example, a touch panel) of the smartphone 3 operates as the state setting means 23.

As described above, the scanning system 1 according to the second embodiment is different from the scanning system 1 according to the first embodiment in that it includes the operating state switch button 16 that is pressed by a user. Further, the processing method determination means 30 according to the second embodiment is different from the processing method determination means 30 according to the first embodiment in that it determines to perform different processing methods depending further on whether the button is pressed or not when scanning a medium.

In this configuration, it is possible to scan a medium by specifying a larger number of types of information and perform conversion with a simple operation that a user performs scanning while pressing a button. In other words, in the scanning system 1 according to the second embodiment, it is possible to store a larger number of different types of information in appropriate forms with a simple operation.

Further, a plurality of processing methods prepared in the second embodiment include the first processing method to the fourth processing method. The first processing method generates information after conversion of a plurality of pieces of image information as page number information presenting a page number of a paper book scanned as a medium. The second processing method generates information after conversion of a plurality of pieces of image information as drawing information presenting a drawing of a paper book scanned as a medium. The third processing method generates information after conversion of a plurality of pieces of image information as body information presenting a body of a paper book scanned as a medium. The fourth processing method generates information after conversion of a plurality of pieces of image information as note information presenting a path of scanning a medium calculated based on the plurality of pieces of image information as notes.

In this configuration, it is possible to store different types of information contained in a paper book and notes concerning them in a distinguishable manner.

Modified Example of Second Embodiment

In the above-described second embodiment, in the case where the operating state switch button 16 is pressed when the pen scanner 2 is in the pen-up state between two scans of a body, the input may be processed as the insertion of a line break, and in the case where the operating state switch button 16 is not pressed instantaneously between two scans of a body, the two bodies may be joined without a line break.

For example, in the case where an operation is performed on the state setting means 23 (when the operating state switch button 16 is pressed) during the period from pen-up to pen-down of the pen scanner 2, the state determination means 24 generates notification information indicating the insertion of a line break and transmits it to the smartphone 3.

In the case where notification information indicating the insertion of a line break is received from the pen scanner 2 when body information is acquired from the third processing means 35, the second selection means 34 of the smartphone 3 adds the notification information indicating the insertion of a line break to the body information and transmits them to the server 4. On the other hand, in the case where notification information indicating the insertion of a line break is not received from the pen scanner 2 when body information is acquired from the third processing means 35, the second selection means 34 of the smartphone 3 transmits the body information to the server 4 without adding the notification information indicating the insertion of a line break.

When the notification information indicating the insertion of a line break is given to the body information received from the smartphone 3, the information control means 40 of the server 4 updates the body information stored in the storage means 41 to information that presents a body in which a body presented by the stored body information, a newline character, and a body presented by the received body information are joined. On the other hand, when the notification information indicating the insertion of a line break is not given to the body information received from the smartphone 3, the information control means 40 of the server 4 updates the body information stored in the storage means 41 to information that presents a body joining the body presented by that stored body information and the body presented by the received body information without inserting a newline character between them.

Third Embodiment

A third embodiment is described hereinafter. In the following description, the same matter as in the second embodiment described above is denoted by the same reference symbol or the like, and the description thereof is omitted as appropriate. The schematic configuration of the scanning system 1 and the hardware configuration of the pen scanner 2 according to the third embodiment are the same as the schematic configuration of the scanning system 1 and the hardware configuration of the pen scanner 2 according to the second embodiment and thus not redundantly described.

In the third embodiment, drawing information and body information are stored in association with page number information generated most recently. Further, note information is stored in association with a pair of page number information generated most recently and body information generated most recently. Thus, if a user scans a page number and then scans a drawing and a body on a page with that page number, it is possible to easily find, from the page number information, on which page in a paper book the drawing presented by the drawing information and the body presented by the body information stored in the server 4 are shown. Further, if a user scans a page number and a body and then enters notes about the body, it is possible to easily find, from the page number information and the body information, which body on which page in a paper book the notes presented by the note information are taken about.

The detailed configuration of the scanning system 1 according to the third embodiment is described hereinafter with reference to FIG. 15. Note that, in FIG. 15, a storage means included in the smartphone 3 is explicitly shown as "storage means 39".

Figure 15:
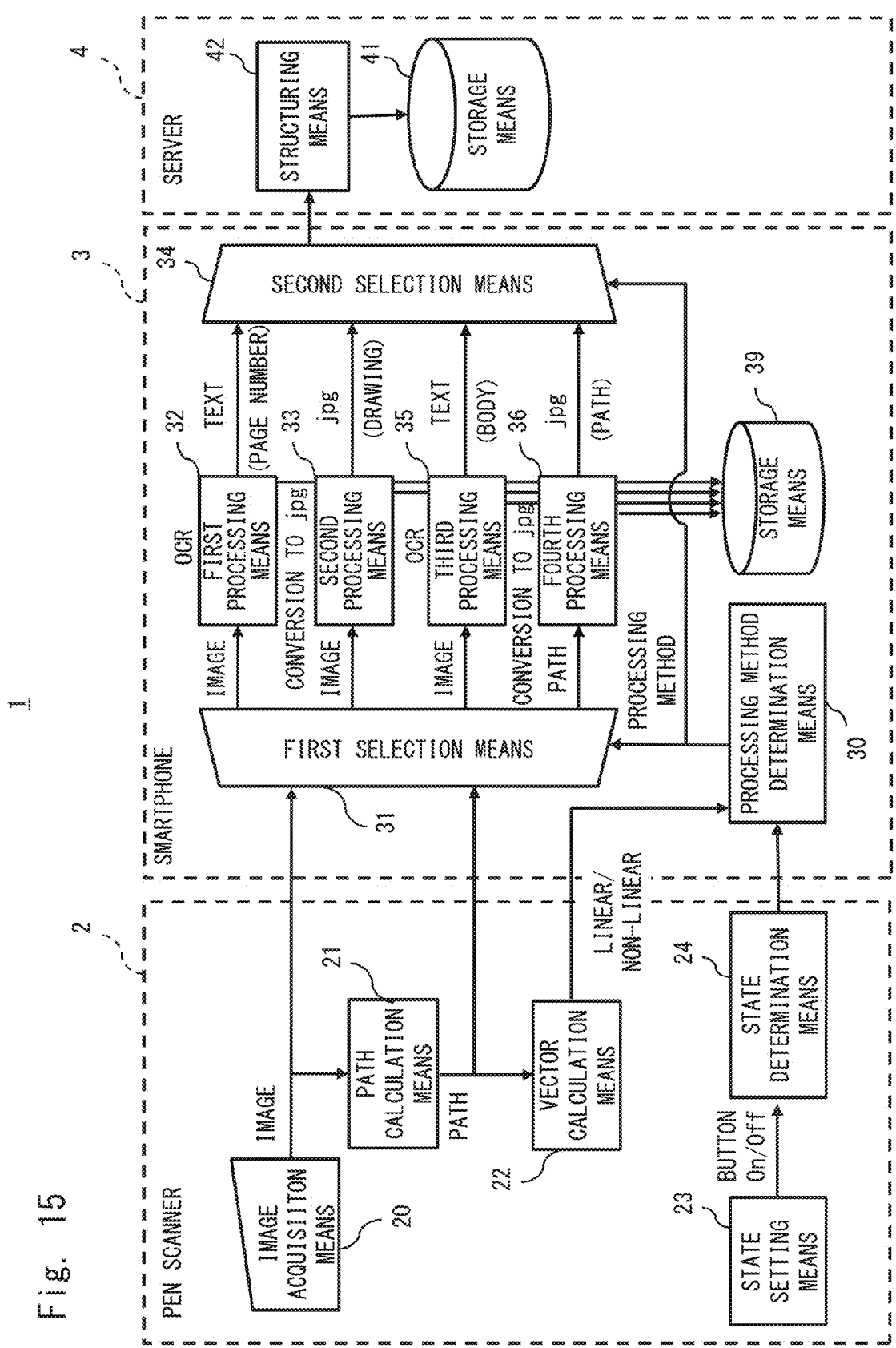
FIG. 15 is a view showing a detailed configuration of a scanning system according to a third embodiment.

As shown in FIG. 15, the server 4 according to the third embodiment is different from the server 4 according to the second embodiment in that it includes a structuring means 42 in place of the information control means 40.

In the third embodiment, when the second selection means 34 transmits page number information to the server 4, it temporarily stores the page number information into the storage means 39. Further, when the second selection means 34 transmits body information to the server 4 also, it temporarily stores the body information into the storage means 39. Thus, the page number information and the body information generated most recently are stored in the storage means 39.

Then, when the second selection means 34 transmits drawing information to the server 4, it adds the page number information stored in the storage means 39 to the drawing information and then transmits them to the server 4. Likewise, when the second selection means 34 transmits body information to the server 4, it adds the page number information stored in the storage means 39 to the body information and then transmits them to the server 4. Further, when the second selection means 34 transmits note information to the server 4, it adds the page number information and the body information stored in the storage means 39 to the note information and then transmits them to the server 4.

The structuring means 42 receives the page number information, the body information, the drawing information and the note information transmitted from the second selection means 34 of the smartphone 3 and stores them into the storage means 41. When the structuring means 42 stores the body information into the storage means 41, it stores the body information in association with the page number information indicating the same page number as the page number information added to the body information, out of the page number information stored in the storage means 41. This is the same for the drawing information. Further, when the structuring means 42 stores the note information into the storage means 41, it stores the note information into the storage means 41 in association with the page number information and the body information indicating the same page number and the body as the page number information and the body information added to the note information, out of the page number information and the body information stored in the storage means 41.

Figure 16:
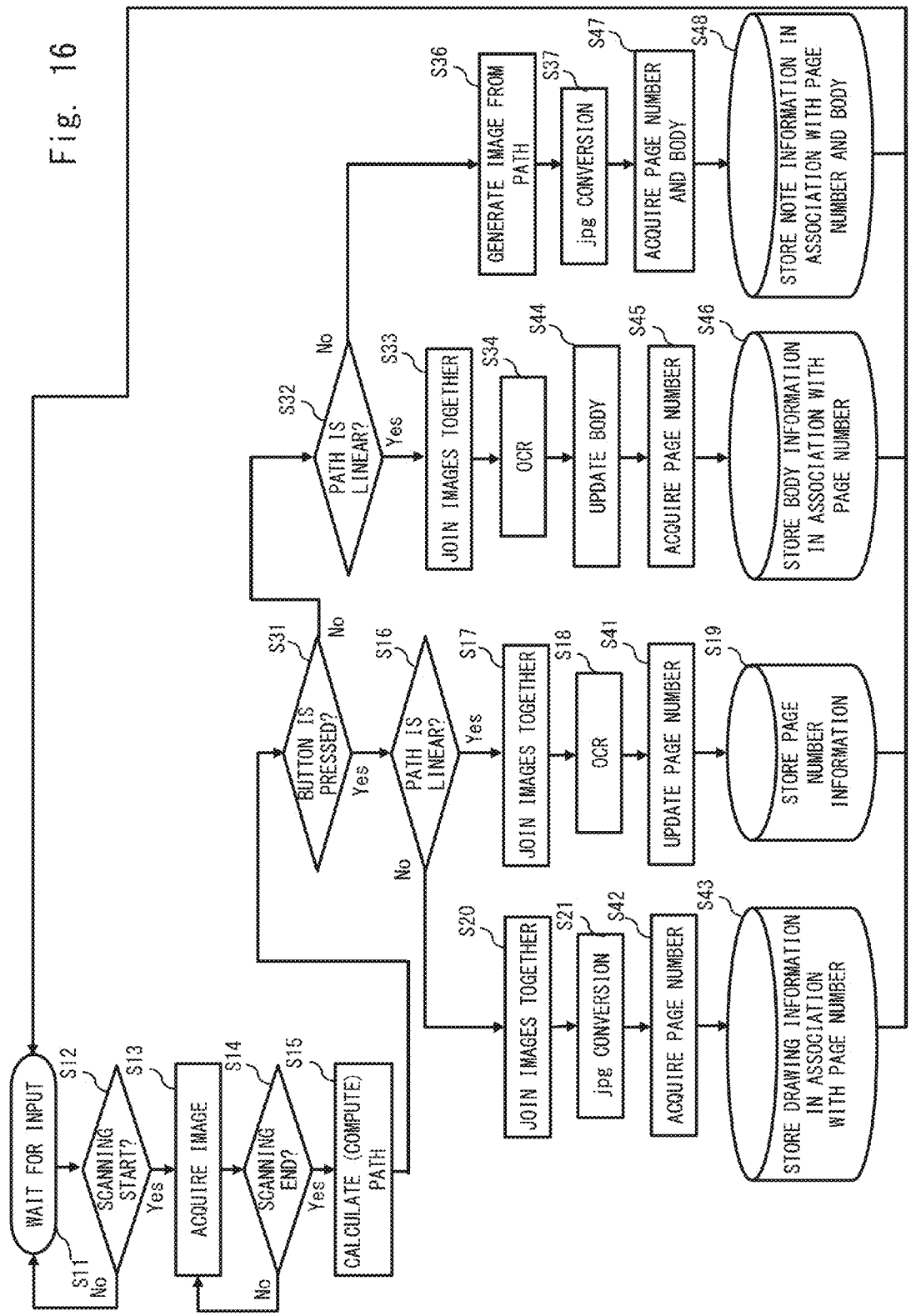
FIG. 16 is a flowchart showing a scanning process of the scanning system according to the third embodiment.

A scanning process of the scanning system 1 according to the third embodiment is described hereinafter with reference to FIG. 16.

The processing steps S11 to S21 are the same as those in the second embodiments. Note that, however, in the third embodiment, the second selection means 34 stores the page number information generated by the first processing means 32 into the storage means 39 between the processing step S18 and the processing step S19. Specifically, the page number scanned most recently is updated to the page number of the currently scanned page (the currently read page) (S41).

On the other hand, after the processing step S21, the second selection means 34 acquires the drawing information generated by the second processing means 33 and the page number information stored in the storage means 39 (S42). The structuring means 42 associates the page number information that matches the page number information acquired by the second selection means 34, out of the page number information stored in the storage means 41, with the drawing information acquired by the second selection means 34 and stores them into the storage means 41 (S43).

The processing steps S32 to S34, S36 and S37 are the same as those described in the second embodiment. After the processing step S34, the second selection means 34 stores the body information generated by the third processing means 35 into the storage means 39. Specifically, the body scanned most recently is updated to the body scanned in the currently scanned page (the body read in the currently read page) (S44).

The second selection means 34 acquires the body information generated by the second processing means 33 and the page number information stored in the storage means 39 (S45). The structuring means 42 associates the page number information that matches the page number information acquired by the second selection means 34, out of the page number information stored in the storage means 41, with the body information acquired by the second selection means 34 and stores them into the storage means 41 (S46).

On the other hand, after the processing step S37, the second selection means 34 acquires the note information generated by the fourth processing means 36, and the page number information and the body information stored in the storage means 39 (S47). The structuring means 42 associates a pair of page number information and body information that match a pair of the page number information and the body information acquired by the second selection means 34, out of pairs of the page number information and the body information stored in the storage means 41, with the note information acquired by the second selection means 34, and stores them into the storage means 41 (S48).

Figure 17:
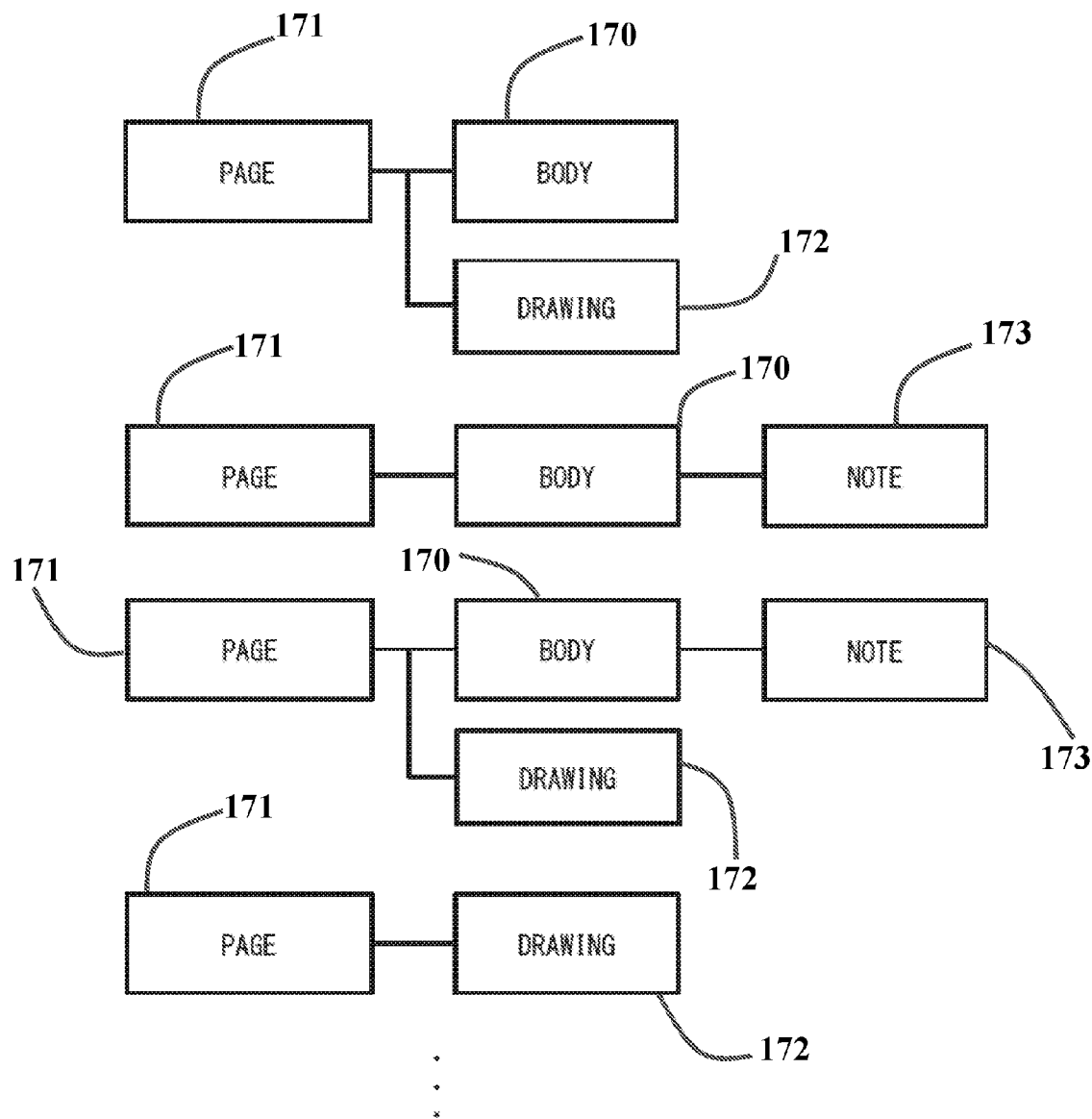
FIG. 17 is a view showing one example of information to be stored in a storage means of a server according to the third embodiment.

According to the above process, by scanning a body (170) after scanning a page number (171), it is possible to store page number information indicating that page number (171) in association with body information presenting that body (170) as shown in FIG. 17. Further, as shown in FIG. 17, by scanning a drawing (172) after scanning a page number (171), it is possible to store page number information indicating that page number (171) in association with drawing information presenting that drawing (172). It is thus possible to record on which page the scanned body and drawing are shown.

Further, as shown in FIG. 17, by entering notes (173) after scanning a page number (171) and a body (170), it is possible to store page number information and body information presenting those page number (171) and body (170) in association with note information presenting the notes (173). It is thus possible to record for which body on which page the entered notes are taken.

Although an example of storing note information in association with a pair of page number information generated most recently and body information generated most recently is described above, it is not limited thereto. For example, note information may be stored in association with a pair of page number information generated most recently and drawing information generated most recently. In this case, after the processing step S21, the second selection means 34 may store the drawing information generated by the second processing means 33 into the storage means 39. As the processing step S47, the second selection means 34 may acquire the page number information and the drawing information stored in the storage means 39 together with the note information generated by the fourth processing means 36. Then, as the processing step S48, the structuring means 42 may associate a pair of the page number information and the drawing information that match a pair of the page number information and the drawing information acquired by the second selection means 34, out of pairs of the page number information and the drawing information stored in the storage means 41, with the note information acquired by the second selection means 34, and store them into the storage means 41. In this case, the processing step S44 is not needed.

Further, both of the storing of note information in association with a pair of page number information and body information and the storing of note information in association with a pair of page number information and drawing information may be performed. In this case, both of the processing of the step S44 and the storing of drawing information into the storage means 39 after the step S21 are performed. As the processing step S47, the second selection means 34 may acquire information (body information or drawing information) generated most recently out of body information generated most recently and drawing information generated most recently. Then, as the processing step S48, the structuring means 42 may associate a pair of page number information and body information or drawing information that match a pair of the page number information and the body information or the drawing information acquired by the second selection means 34 with the note information acquired by the second selection means 34, and store them into the storage means 41.

As described above, the scanning system 1 according to the third embodiment includes the structuring means 42 that stores, into the storage means 41, the page number information generated most recently in association with the drawing information, the body information or the note information generated after the generation of the page number information. Further, the structuring means 42 stores, into the storage means 41, a pair of the page number information generated most recently and the body information or the drawing information generated most recently in association with the note information generated after the generation of the page number information and the body information.

In this configuration, because data scanned by a user are stored in association with each other, it is possible to facilitate the use of information when the user searches for or refers to the information stored in the server 4.

Fourth Embodiment

A fourth embodiment is described hereinafter. In the following description, the same matter as in the third embodiment described above is denoted by the same reference symbol or the like, and the description thereof is omitted as appropriate. The schematic configuration of the scanning system 1 and the hardware configuration of the pen scanner 2 according to the fourth embodiment are the same as the schematic configuration of the scanning system 1 and the hardware configuration of the pen scanner 2 according to the third embodiment and thus not redundantly described.

In the fourth embodiment, when a non-linear path is detected as the moving path of the pen scanner 2, it is determined whether the moving path corresponds to a predefined gesture. When the moving path of the pen scanner 2 corresponds to a gesture, a processing corresponding to that gesture is performed. As the gesture, an arbitrary symbol (circle, square, triangle etc.), an alphabet or the like may be defined, for example.

The detailed configuration of the scanning system 1 according to the fourth embodiment is described hereinafter with reference to FIG. 18.

Figure 18:
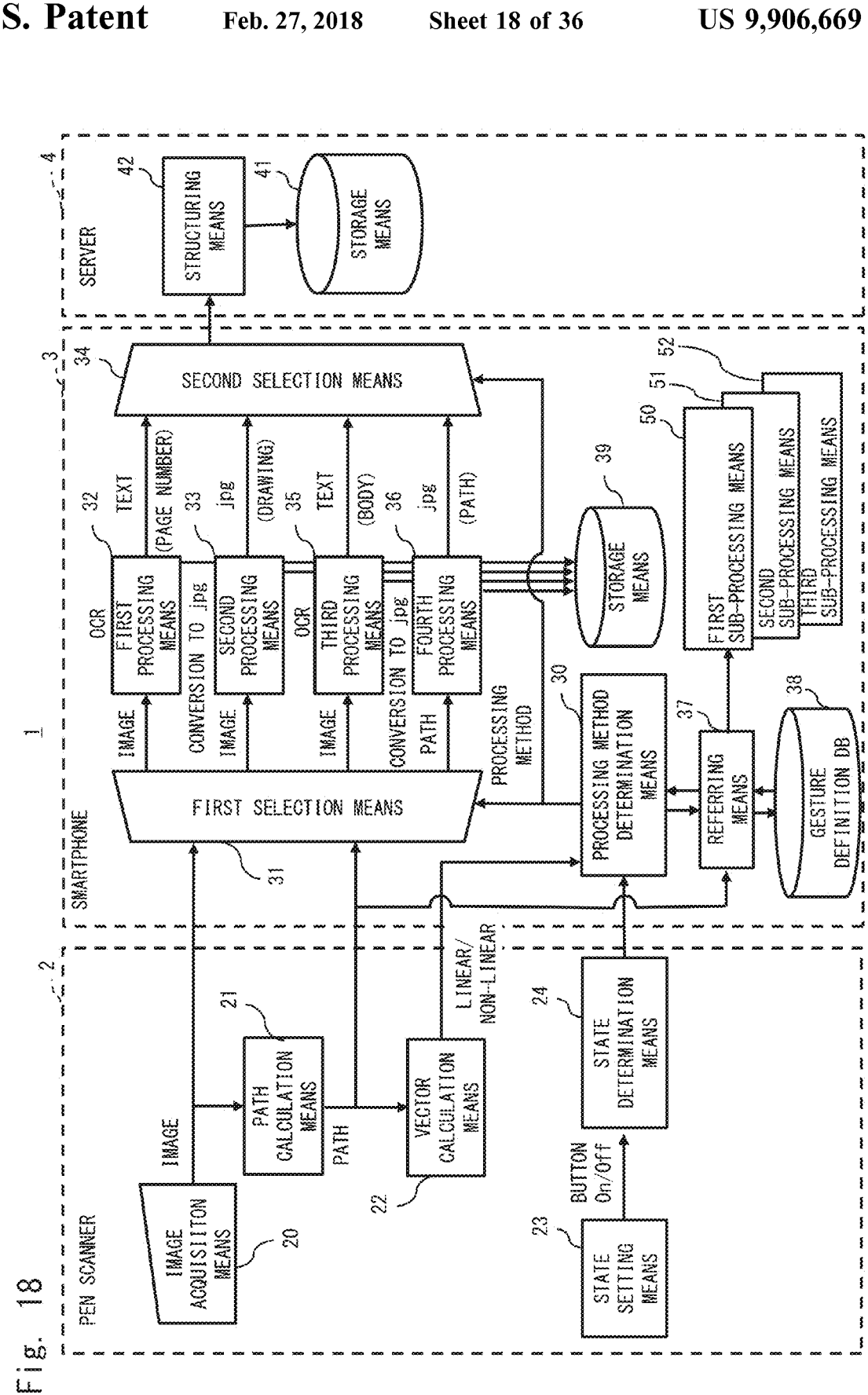
FIG. 18 is a view showing a detailed configuration of a scanning system according to a fourth embodiment.

As shown in FIG. 18, the smartphone 3 according to the fourth embodiment is different from the smartphone 3 according to the third embodiment in that it further includes a referring means 37, a gesture definition DB 38, a first sub-processing means 50, a second sub-processing means 51, and a third sub-processing means 52.

When the moving path of the pen scanner 2 is non-linear and the operating state of the pen scanner 2 is the second state, the processing method determination means 30 according to the fourth embodiment causes the referring means 37 to determine whether the moving path corresponds to a specified gesture.

When the moving path of the pen scanner 2 is non-linear and the operating state of the pen scanner 2 is the second state, the referring means 37 determines whether the moving path of the pen scanner 2 indicated by the path information received from the pen scanner 2 corresponds to any of gestures indicated by a plurality of pieces of gesture information contained in the gesture definition DB 38.

When the referring means 37 determines that the moving path of the pen scanner 2 corresponds to any of gestures indicated by the plurality of pieces of gesture information, it causes one of the first sub-processing means 50, the second sub-processing means 51 and the third sub-processing means 52 which corresponds to the gesture to perform processing.

Specifically, in the third embodiment, as the plurality of pieces of gesture information, three pieces of gesture information respectively corresponding to the first sub-processing means 50 to the third sub-processing means 52 are contained in the gesture definition DB 38. Note that, although an example where the number of the gesture information and the sub-processing means is three is described in the third embodiment, it is not limited thereto.

The gesture definition DB 38 contains a plurality of pieces of gesture information as described above. The gesture definition DB 38 is stored in the storage means 39 of the smartphone 3. The gesture information is information indicating the template of the moving path which is defined as a gesture.

For example, when the similarity between the moving path of the pen scanner 2 indicated by the path information received from the pen scanner 2 and the template of the moving path indicated by the gesture information is equal to or more than a specified threshold, the referring means 37 determines that the moving path of the pen scanner 2 corresponds to the gesture indicated by the gesture information. On the other hand, when the similarity between the moving path of the pen scanner 2 indicated by the path information received from the pen scanner 2 and the template of the moving path indicated by the gesture information is less than a specified threshold, the referring means 37 determines that the moving path of the pen scanner 2 does not correspond to the gesture indicated by the gesture information. Note that, because another method may be used as a method of determining the similarity between the moving path and the gesture, the detailed description thereof is omitted.

Each of the first sub-processing means 50, the second sub-processing means 51 and the third sub-processing means 52 performs specified processing. Arbitrary processing may be predetermined as the processing to be performed by each of the first sub-processing means 50 to the third sub-processing means 52. For example, as the processing to be performed by each of the first sub-processing means 50 to the third sub-processing means 52, processing to change the operation mode of the scanning system 1 may be defined.

For example, as the processing of the first sub-processing means 50, processing to switch the operation mode of the scanning system 1 between "reading mode" and "dictionary mode" may be performed. Note that, in "reading mode", the scanning system 1 performs an operation to convert and store information scanned by a user who is reading a paper book as described above. In this case, when a gesture corresponding to the first sub-processing means 50 is input by a user as the moving path of the pen scanner 2, the first sub-processing means 50 changes the operation mode of the scanning system 1 from "reading mode" to "dictionary mode". Next, when the user scans a word which he/she does not understand in the operation of scanning a body, a word indicated by the text information obtained by the third processing means 35 is searched for from a dictionary DB (not shown) included in the smartphone 3. For example, the dictionary DB is prestored in the storage means 39 of the smartphone 3. The dictionary DB is information where a plurality of words and the meanings of the plurality of words are respectively associated with each other. The smartphone 3 displays the meaning corresponding to the searched word in the dictionary DB on a display means (not shown) included in the smartphone 3. The display means is a touch panel, for example. After that, when a gesture corresponding to the first sub-processing means 50 is input again by the user as the moving path of the pen scanner 2, the first sub-processing means 50 changes the operation mode of the scanning system 1 from "dictionary mode" to "normal mode".

Note that the dictionary DB is not limited to be included in the smartphone 3 as described above. For example, it may be stored in the storage means 41 of the server 4. In this case, the smartphone 3 transmits the text information obtained by the third processing means 35 and directs the server 4 to make a search. The server 4 search the dictionary DB for the word indicated by the text information received from the smartphone 3, and transmits information indicating the meaning corresponding to the searched word to the smartphone 3. Then, the smartphone 3 may display the meaning indicated by the information received from the server 4 on a display means.

A CPU included in the smartphone 3, for example, executes a program stored in the storage means 39 included in the smartphone 3, and thereby operates as the referring means 37 and the sub-processing means 50 to 52 in the same manner as the above-described means 30 to 36.

Figure 19:
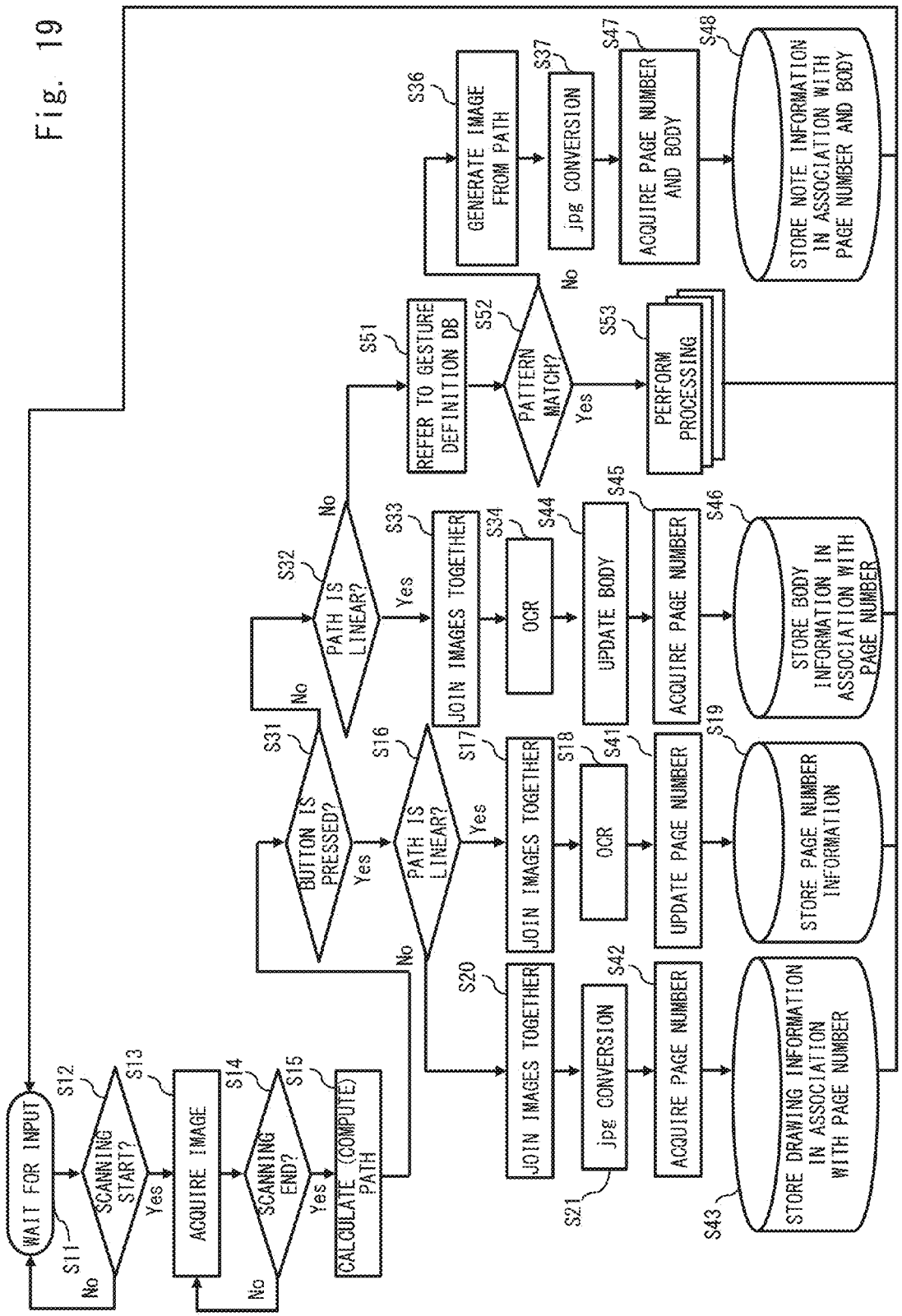
FIG. 19 is a flowchart showing a scanning process of the scanning system according to the fourth embodiment.

A scanning process of the scanning system 1 according to the fourth embodiment is described hereinafter with reference to FIG. 19. In the following description, an example where the scanning system 1 operates as follows is described.

The processing steps S11 to S21, S31 to S34, S36, S37 and S41 to S48 are the same as those of the third embodiment. When the processing method determination means 30 determines that the moving path of the pen scanner 2 is non-linear (Non in S32), the referring means 37 refers to the gesture definition DB 38 (S51), and determines whether the moving path of the pen scanner 2 indicated by the path information matches any of gestures indicated by a plurality of pieces of gesture information contained in the gesture definition DB 38 (S52).

When it is determined that the moving path of the pen scanner 2 indicated by the path information matches any of gestures indicated by a plurality of pieces of gesture information (Yes in S52), one sub-processing means, out of the first sub-processing means 50, the second sub-processing means 51 and the third sub-processing means 52, which corresponds to the gesture that is determined to correspond to the moving path of the pen scanner 2 performs processing (S53). On the other hand, when it is determined that the moving path of the pen scanner 2 indicated by the path information does not match any of gestures indicated by a plurality of pieces of gesture information (No in S52), the processing after the step S36 is performed.

Note that, as described above, the determination of a processing method of image information and the processing of the image information by the determined processing method may be performed in the pen scanner 2 or the server 4 and, in this case, the above-described processing concerning a gesture may be performed also in the pen scanner 2 or the server 4 that performs the determination of a processing method of image information and the processing of the image information by the determined processing method. Specifically, the means 37, 38, 50 to 52 concerning a gesture may be included in the pen scanner 2 or the server 4.

Further, although an example where whether the moving path corresponds to a specified gesture or not is determined when the moving path of the pen scanner 2 is non-linear and the operating state of the pen scanner 2 is the second state is described above, it is not limited thereto. For example, the processing method determination means 30 may cause the referring means 37 to determine whether the moving path corresponds to a specified gesture or not when the moving path of the pen scanner 2 is non-linear and the operating state of the pen scanner 2 is the first state.

As described above, in the fourth embodiment, gesture information indicating a gesture, which is the template of the path of scanning a medium, is stored in the storage means 39 of the smartphone 3. Then, when the referring means 37 determines that the path of scanning the medium corresponds to a gesture indicated by the gesture information, it performs specified sub-processing (which corresponds to the processing performed by each of the first sub-processing means 50, the second sub-processing means 51 and the third sub-processing means 52).

In this configuration, a larger variety of processing (five or more types of processing in the fourth embodiment) can be performed by the scanning with the pen scanner 2. Further, in the fourth embodiment, processing that is performed frequently (processing corresponding to scanning of a page number, a body and a drawing, and entering of notes) in the application of the scanning system 1 is assigned as processing that can be performed with a simple operation. On the other hand, processing that is performed less frequently (change of an operation mode) may be assigned as sub-processing that corresponds to a gesture, where the operation of the pen scanner 2 is slightly complicated. It is thereby possible to increase the variety of processing to be performed without degrading user convenience.

Fifth Embodiment

A fifth embodiment is described hereinafter. In the following description, the same matter as in the fourth embodiment described above is denoted by the same reference symbol or the like, and the description thereof is omitted as appropriate. The schematic configuration of the scanning system 1 and the hardware configuration of the pen scanner 2 according to the fifth embodiment are the same as the schematic configuration of the scanning system 1 and the hardware configuration of the pen scanner 2 according to the fourth embodiment and thus not redundantly described.

In the fifth embodiment, page number information, drawing information, body information and note information are stored in association with ISBN information indicating ISBN (International Standard Book Number) specified by a user most recently. Thus, if a user specifies ISBN and then scans a page number, a drawing and a body of a paper book specified by the ISBN, it is possible to easily find, from the ISBN information, in which paper book the page number, the drawing and the body presented by the page number information, the drawing information and the body information stored in the server 4 are shown. Further, if a user specifies ISBN and then enters notes, it is possible to easily find, from the ISBN information, for which paper book the notes are taken.

The detailed configuration of the scanning system 1 according to the fifth embodiment is described hereinafter with reference to FIG. 20.

Figure 20:
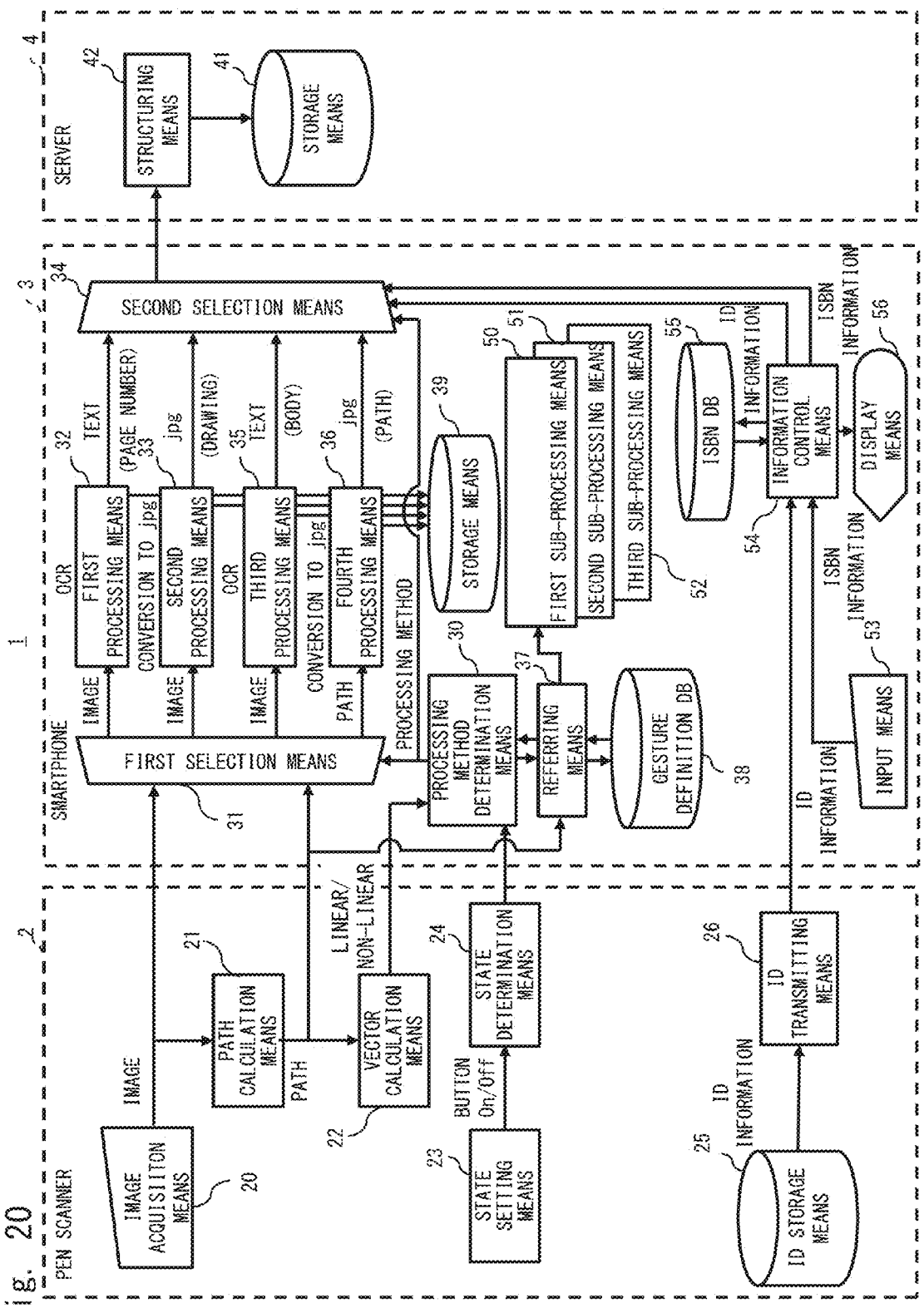
FIG. 20 is a view showing a detailed configuration of a scanning system according to a fifth embodiment.

As shown in FIG. 20, the pen scanner 2 according to the fifth embodiment is different from the pen scanner 2 according to the fourth embodiment in that it further includes an ID storage means 25 and an ID transmitting means 26.

The ID storage means 25 stores ID information that uniquely identifies the pen scanner 2. The ID storage means 25 is prestored in a nonvolatile memory (for example, flash memory) included in the MCU 13, for example.

The ID transmitting means 26 acquires the ID information stored in the ID storage means 25 and transmits it to the smartphone 3.

As shown in FIG. 20, the smartphone 3 according to the fifth embodiment is different from the smartphone 3 according to the fourth embodiment in that it further includes an input means 53, an information control means 54, an ISBM DB 55, and a display means 56.

The input means 53 receives an input of arbitrary content from a user. In response to an input from a user, the input means 53 generates an input signal indicating the input content and outputs it to the information control means 54.

The information control means 54 acquires and holds the ID information transmitted from the pen scanner 2. Further, when a user inputs ISBN to the input means 53, the information control means 54 generates and holds ISBN information indicating the ISBN input by the user based on the input signal that is input from the input means 53 in response to the input. For example, the information control means 54 holds the ID information and the ISBN information by storing them into the memory 14.

In the ISBM DB 55, a pair of ISBN information indicating ISBN and title information indicating the title of a paper book identified by the ISBN indicated by the ISBN information is prestored for a plurality of different paper books. Note that the title information may further contain the edition of a paper book.

The display means 56 displays an image presenting arbitrary content. The display means 56 displays an image according to an instruction from the information control means 54, for example. A touch panel (not shown) included in the smartphone 3 operates as the input means 53 and the display means 56.

A CPU included in the smartphone 3, for example, executes a program stored in the storage means 39 included in the smartphone 3, and thereby operates as the information control means 54 in the same manner as the above-described means 30 to 37 and 50 to 52.

Figure 21:
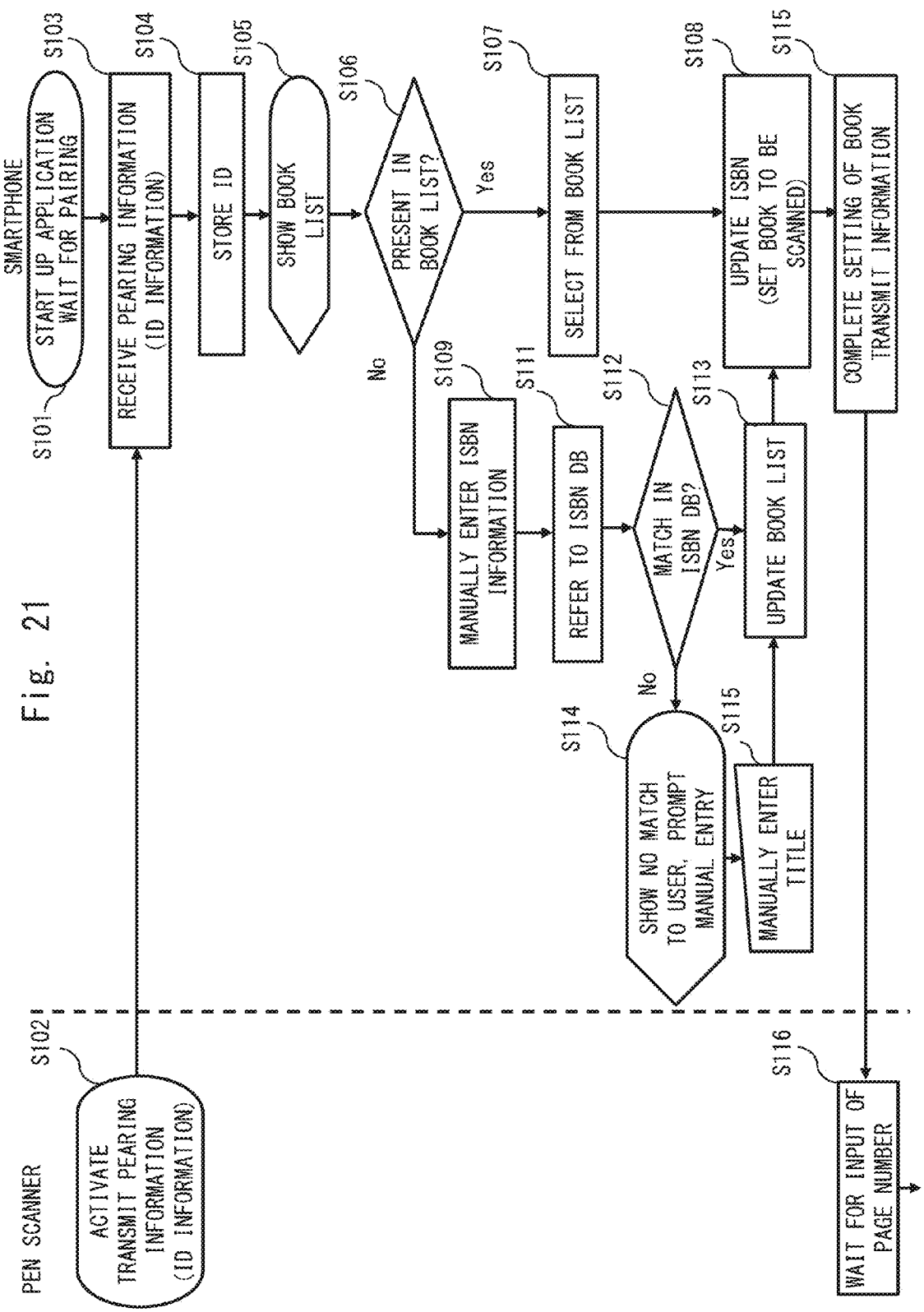
FIG. 21 is a flowchart showing preprocessing of the scanning system according to the fifth embodiment.

Preprocessing of the scanning system 1 according to the fifth embodiment is described hereinafter with reference to FIG. 21.

When a CPU of the smartphone 3 starts running an application program, it starts the operation as the means 30 to 37 and 50 to 54 of the smartphone 3. The information control means 54 of the smartphone 3 waits for pairing information from the pen scanner 2 (S101).

When the ID transmitting means 26 of the pen scanner 2 is powered on and activated, it transmits pairing information for pairing the pen scanner 2 and the smartphone 3 to the smartphone 3 (S102). The pairing information contains ID information that is stored in the ID storage means 25.

The information control means 54 of the smartphone 3 receives the pairing information transmitted from the pen scanner (S103). The information control means 54 forms a pair of the smartphone 3 and the pen scanner 2 based on the received pairing information. Further, the information control means 54 stores ID information contained in the pair information into the storage means 39. Specifically, ID indicated by the received ID information is stored as the ID of the pen scanner that is currently used for scanning (S104).

The information control means 54 gives the display means 56 an instruction to display an image showing a book list. In response to the instruction from the information control means 54, the display means 56 displays the book list (S105). The book list is a list of pairs of ISBN and title of paper books that have been scanned by a user. Book list information presenting the book list is stored in the storage means 39 of the smartphone 3. The information control means 54 generates an image showing the book list based on the book list information stored in the storage means 39. The book list information is updated by the information control means 54.

When a paper book to be scanned is included in the book list displayed on the display means 56 (Yes in S106), a user inputs a selection of the paper book from the book list to the input means 53 (S107). The information control means 54 identifies the paper book selected by the user from the book list based on the input signal that is input from the input means 53 in response to the selection. The information control means 54 acquires the ISBN of the identified paper book from the book list and stores ISBN information indicating the acquired ISBN into the storage means 39. Specifically, the ISBN that is input most recently is updated to the ISBN of the paper book that is currently scanned (read) by the user (S108).

On the other hand, when a paper book to be scanned is not included in the book list displayed on the display means 56 (No in S106), a user enters the ISBN of the paper book to be scanned (S109). The information control means 54 acquires the ISBN entered by the user based on the input signal that is input from the input means 53 in response to the entering. The information control means 54 searches the ISBM DB 55 for the acquired ISBN (S111, S112).

When the acquired ISBN is detected in the ISBM DB 55 (Yes in S112), the book list is updated to add a pair of the acquired ISBN and the title corresponding to the ISBN in the ISBM DB 55 (S113).

On the other hand, when the acquired ISBN is not detected in the ISBM DB 55 (No in S112), the information control means 54 gives the display means 56 an instruction to display an image that prompts to enter a title. In response to the instruction from the information control means 54, the display means 56 displays an image that prompts to enter a title (S114).

A user enters a title of a paper book to be scanned to the input means 53 (S115). The information control means 54 acquires the title entered by the user based on the input signal that is input from the input means 53 in response to the entering. The information control means 54 updates the book list to add a pair of the acquired ISBN and the acquired title (S113).

After the step S113, the information control means 54 stores ISBN information indicating the acquired ISBN into the storage means 39. Specifically, the ISBN that is input most recently is updated to the ISBN of the paper book that is currently scanned (read) by the user (S108).

The information control means 54 transmits, to the pen scanner 2, notification information that notifies the completion of setting of a paper book to be scanned (S115). In response to receiving the notification information from the smartphone 3, the image acquisition means 20 of the pen scanner 2 waits for scanning of a page number (S116). This corresponds to the step S11 in the scanning process described below by reference to FIG. 22.

Figure 22:
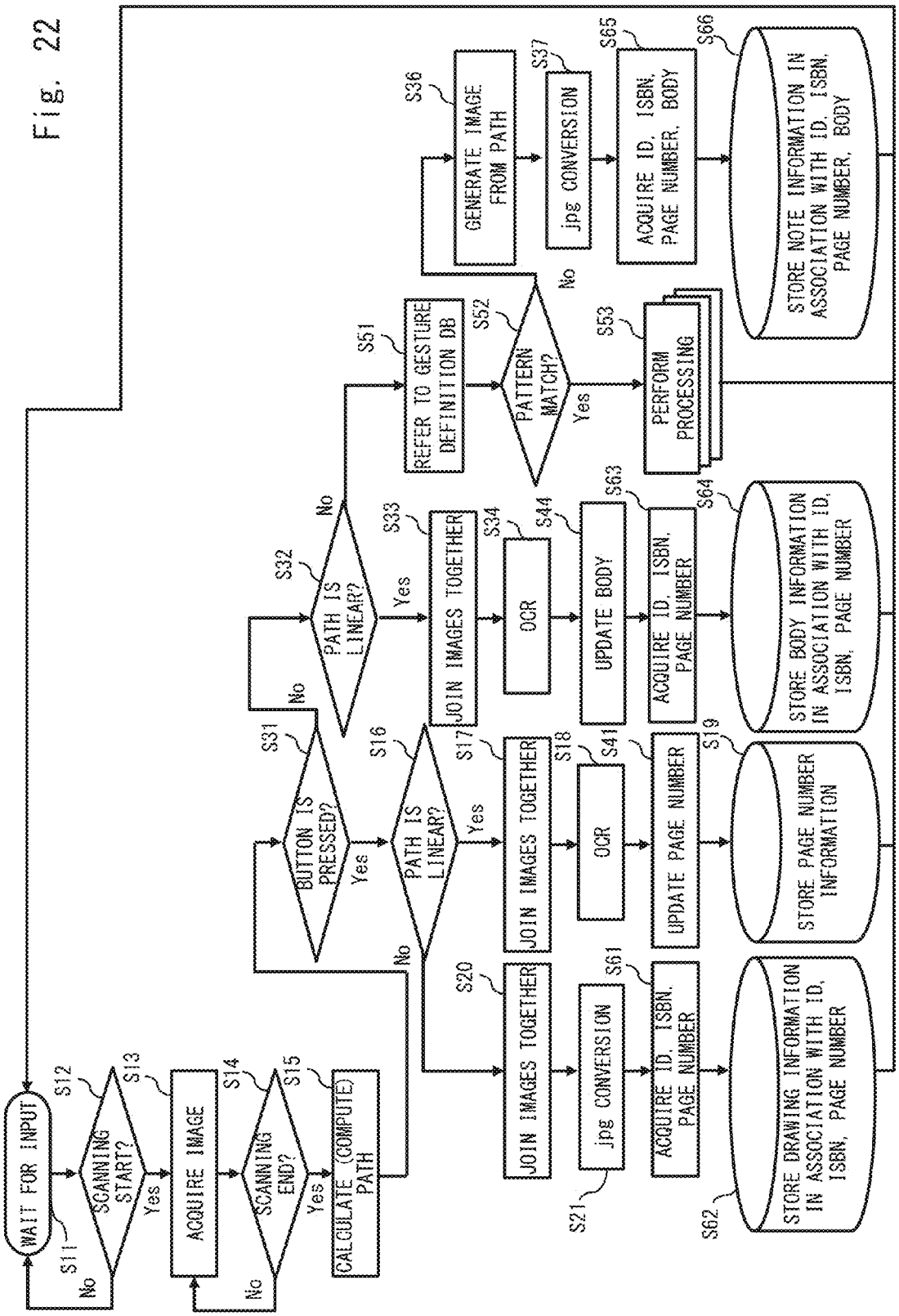
FIG. 22 is a flowchart showing a scanning process of the scanning system according to the fifth embodiment.

A scanning process of the scanning system 1 according to the fifth embodiment is described hereinafter with reference to FIG. 22.

The scanning process of the scanning system 1 according to the fifth embodiment is different from the scanning process of the scanning system 1 according to the fourth embodiment in that it has the steps S61, S62, S63, S64, S65 and S66 instead of the steps S42, S43, S45, S46, S47 and S48, respectively.

After the processing step S21, the second selection means 34 acquires the drawing information generated by the second processing means 33 and the ID information, the ISBN information and the page number information stored in the storage means 39 (S61). The structuring means 42 associates a set of ID information, ISBN information and page number information that matches a set of the ID information, the ISBN information and the page number information acquired by the second selection means 34, out of sets of ID information, ISBN information and page number information stored in the storage means 41, with the drawing information acquired by the second selection means 34, and stores them into the storage means 41 (S62).

After the processing step S44, the second selection means 34 acquires the body information generated by the third processing means 35 and the ID information, the ISBN information and the page number information stored in the storage means 39 (S63). The structuring means 42 associates a set of ID information, ISBN information and page number information that matches a set of the ID information, the ISBN information and the page number information acquired by the second selection means 34, out of sets of the ID information, the ISBN information and the page number information stored in the storage means 41, with the body information acquired by the second selection means 34, and stores them into the storage means 41 (S64).

After the processing step S37, the second selection means 34 acquires the note information generated by the fourth processing means 36 and the ID information, the ISBN information, the page number information and the body information stored in the storage means 39 (S65). The structuring means 42 associates a set of ID information, ISBN information, page number information and body information that matches a set of the ID information, the ISBN information, the page number information and the body information acquired by the second selection means 34, out of sets of the ID information, the ISBN information, the page number information and the body information stored in the storage means 41, with the note information acquired by the second selection means 34, and stores them into the storage means 41 (S66).

Note that, although the ISBN is input through the smartphone 3 in the above description, it is not limited thereto. For example, the ISBN may be input through the pen scanner 2. Specifically, the pen scanner 2 may include the input means 53 and a part of the information control means 54. In this case, the pen scanner 2 has, as the input means 53, an operation button for inputting ISBN. Then, the information control means 54 of the pen scanner 2 may generate ISBN information and transmit it to the smartphone 3, and the information control means 54 of the smartphone 3 may perform the same processing as above based on the ISBN information received from the pen scanner 2.

Figure 23:
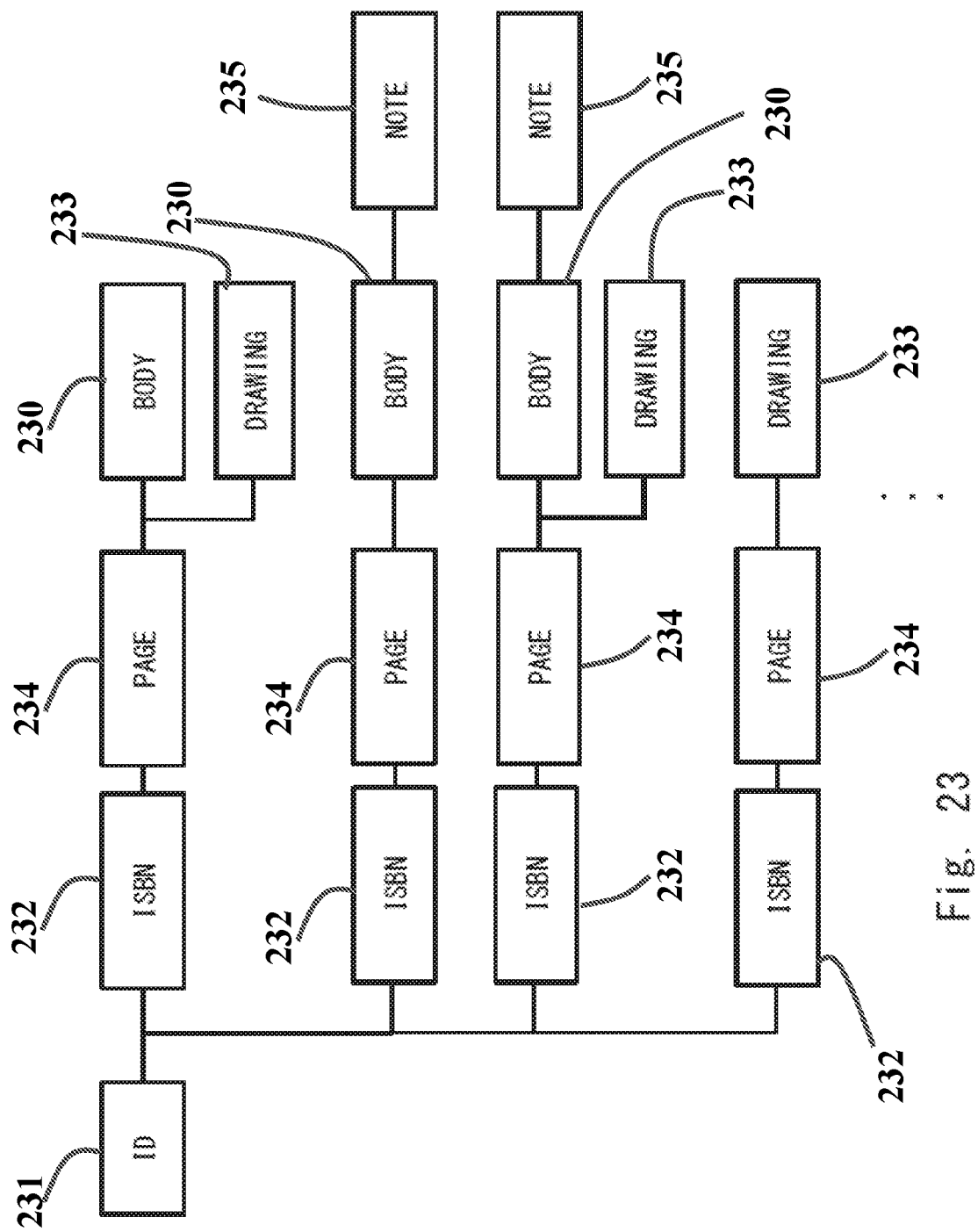
FIG. 23 is a view showing one example of information to be stored in a storage means of a server according to the fifth embodiment.

According to the above process, by scanning a body (230) after transmitting ID (231) of the pen scanner 2 by pairing, entering ISBN (232) and scanning a page number (234), it is possible to store ID information, ISBN information and page number information presenting the ID (231), the ISBN (232) and the page number (234) in association with body information presenting the body (230) as shown in FIG. 23. Further, by scanning a drawing (233) after transmitting ID (231) of the pen scanner 2 by pairing, entering ISBN (232) and scanning a page number (234), it is possible to store ID information, ISBN information and page number information presenting the ID (231), the ISBN (232) and the page number (234) in association with drawing information presenting the drawing (233) as shown in FIG. 23. It is thus possible to record on which page in which paper book the scanned body and drawing are shown.

Further, as shown in FIG. 23, by entering notes (235) after transmitting ID (231) of the pen scanner 2 by pairing, entering ISBN (232) and scanning a page number (234 and a body (230), it is possible to store ID information, ISBN information, page number information and body information presenting the ID (231), the ISBN (232), the page number (234) and the body (233) in association with note information presenting the notes (235). It is thus possible to record for which body on which page in which paper book the entered notes are taken.

Although an example of storing note information in association with a set of ID information, ISBN information generated most recently, page number information generated most recently, and body information generated most recently is described above, it is not limited thereto. For example, note information may be stored in association with a set of ID information, ISBN information generated most recently, page number information generated most recently, and drawing information generated most recently. In this case, after the processing step S21, the second selection means 34 may store the drawing information generated by the second processing means 33 into the storage means 39. As the processing step S65, the second selection means 34 may acquire the ID information, the ISBN information, the page number information and the drawing information stored in the storage means 39 together with the note information generated by the fourth processing means 36. Then, as the processing step S66, the structuring means 42 may associate a set of ID information, ISBN information, page number information and drawing information that match a set of the ID information, the ISBN information, the page number information and the drawing information acquired by the second selection means 34, out of sets of the ID information, the ISBN information, the page number information and the drawing information stored in the storage means 41, with the note information acquired by the second selection means 34, and store them into the storage means 41. In this case, the processing step S44 is not needed.

Further, both of the storing of note information in association with a pair of page number information and body information and the storing of note information in association with a pair of page number information and drawing information may be performed. In this case, both of the processing of the step S44 and the storing of drawing information into the storage means 39 after the step S21 are performed. As the processing step S65, information (body information or drawing information) generated most recently out of body information generated most recently and drawing information generated most recently may be acquired. Then, as the processing step S66, the structuring means 42 may associate a set of ID information, ISBN information, page number information and body information or drawing information that match a set of the ID information, the ISBN information, the page number information and the body information or the drawing information acquired by the second selection means 34 with the note information acquired by the second selection means 34, and store them into the storage means 41.

As described above, in the fifth embodiment, an input that specifies ISBN of a paper book to be scanned as a medium is made to the input means 53. The structuring means 42 stores, into the storage means 41, ISBN information indicating ISBN specified most recently and page number information generated most recently in association with drawing information, body information or note information generated after the specifying of the ISBN and the generation of the page number information.

In this configuration, because a group of pieces of information scanned for each of different paper books can be constructed, it is possible to facilitate the use of information when searching or referring to the information stored in the server 4.

Further, in the fifth embodiment, the pen scanner 2 includes the ID storage means 25 in which ID information that uniquely identifies the pen scanner 2 is prestored and the ID transmitting means 26 which transmits the ID information stored in the ID storage means 25. The structuring means 42 stores, into the storage means 41, ID information transmitted from the ID transmitting means 26, ISBN information indicating ISBN specified most recently and page number information generated most recently in association with drawing information, body information or note information generated after the receiving of the ID information, the specifying of the ISBN and the generation of the page number information.

In this configuration, because a group of pieces of information scanned for each of different pen scanners 2 (that is, for each of different users) can be further constructed, it is possible to facilitate the use of information when searching or referring to the information stored in the server 4.

First Modified Example of Fifth Embodiment

In the above-described fifth embodiment, when changing a paper book to be scanned, a user needs to change a device he/she operates from the pen scanner 2 to the smartphone 3 and perform an operation to select a paper book from a book list or enter ISBN on the smartphone 3. To save those steps, as the operation mode of the scanning system 1, "ISBN scan mode" which the system can transition to by inputting a gesture and in which ISBN can be input by scanning may be prepared as described below.

Figure 24:
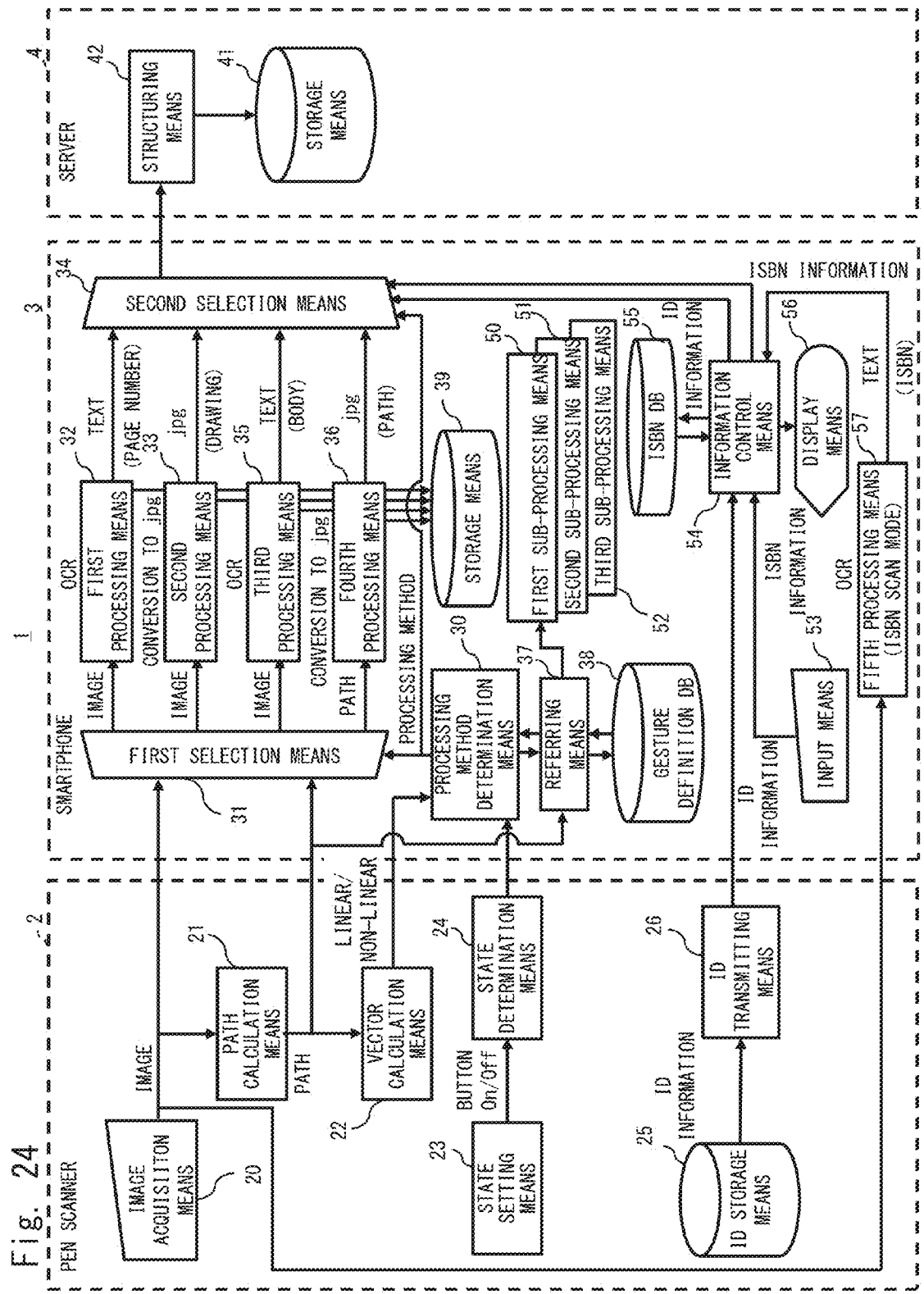
FIG. 24 is a view showing a detailed configuration of a scanning system according to a first modified example of the fifth embodiment.
Figure 25:
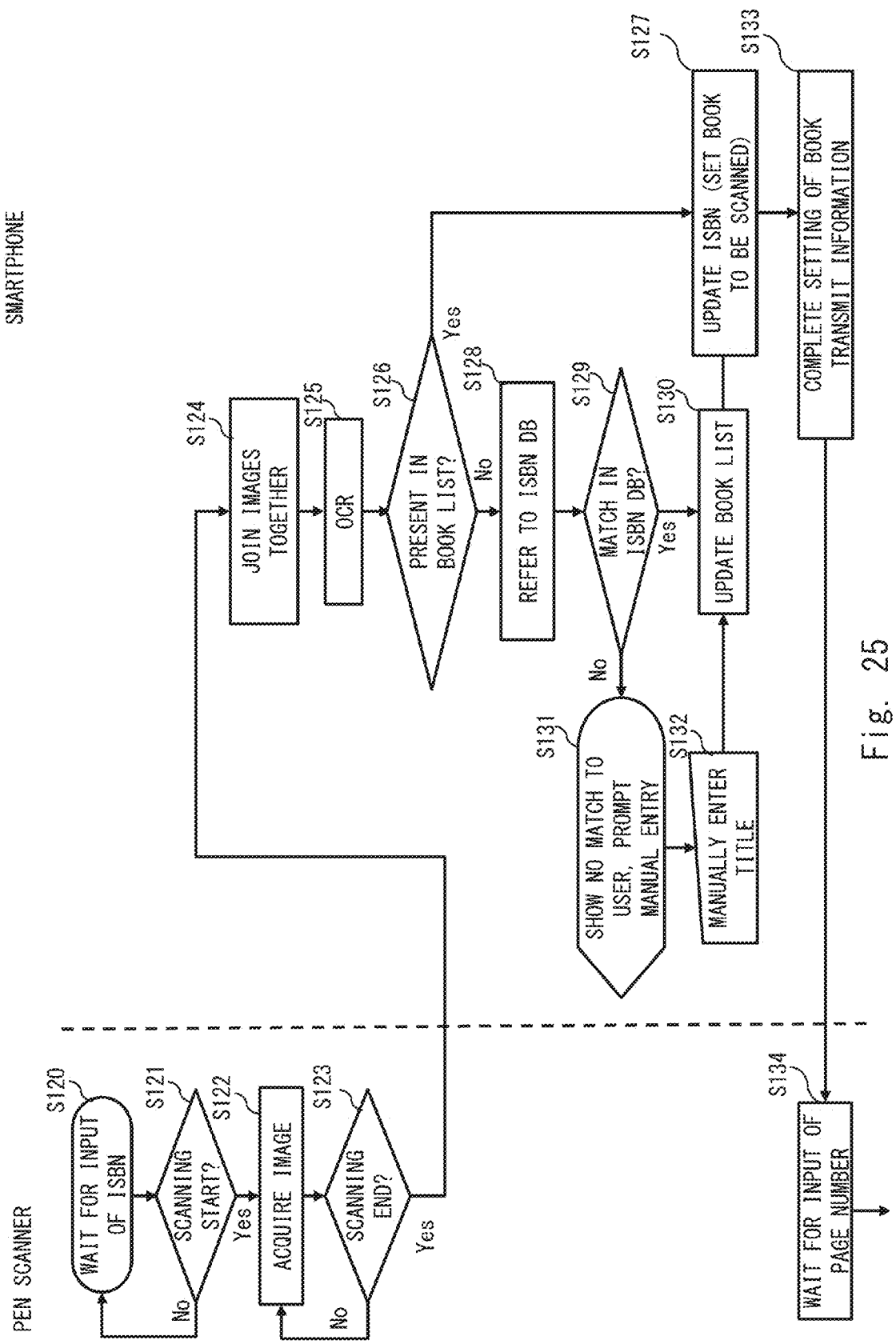
FIG. 25 is a flowchart showing a scanning process in a scan mode according to the first modified example of the fifth embodiment.

The detailed configuration of the scanning system 1 according to the first modified example of the fifth embodiment is described hereinafter with reference to FIG. 24.

The scanning system 1 according to the first modified example of the fifth embodiment is different from the scanning system 1 according to the fifth embodiment in that it further includes a fifth processing means 57.

The first sub-processing means 50 according to the fifth embodiment performs processing to switch the operation mode of the scanning system 1 between "reading mode" and "ISBN scan mode".

When the operation mode of the scanning system 1 is "reading mode", the smartphone 3 causes one of the first processing means 32, the second processing means 33, the third processing means 35 and the fourth processing means 36 which is determined by the processing method determination means 30 to operate in response to receiving a plurality of pieces of image information from the pen scanner 2 as described above. On the other hand, when the operation mode of the scanning system 1 is "ISBN scan mode", the smartphone 3 causes the fifth processing means 57 to operate in response to receiving a plurality of pieces of image information from the pen scanner 2.

The fifth processing means 57 combines a plurality of images presented by the plurality of pieces of image information, performs OCR on a character sequence contained in the image generated by the combining, and generates text information where the character sequence is presented in the form of an electronic text as ISBN information indicating ISBN.

A scanning process in "ISBN scan mode" of the scanning system 1 according to the first modified example of the fifth embodiment is described hereinafter.

The image acquisition means 20 of the pen scanner 2 waits for a user to perform an operation of scanning ISBN of a paper book as a medium with the pen scanner 2 (S120 and No in S121). Specifically, the image acquisition means 20 waits for the pen scanner 2 to enter the pen-down state.

When the user performs an operation to scan a medium with the pen scanner 2 (Yes in S121), the image acquisition means 20 starts the scanning of the medium (S122). The image acquisition means 20 repeats the generation and holding of image information presenting the scanned images of the medium until the user performs an operation to end the scanning of the medium with the pen scanner 2 (S122, No in S123).

The fifth processing means 57 combines a plurality of images presented by the plurality of pieces of image information generated by the image acquisition means 20 (S124), and performs OCR on a character sequence of ISBN contained in the image generated by the combining (S125). The fifth processing means 57 thereby generates, as ISBN information, text information where the character sequence of ISBN contained in the image generated by the combining is presented in the form of an electronic text.

The information control means 54 determines whether ISBN indicated by the ISBN information generated by the fifth processing means 57 is included in a book list presented by the book list information stored in the storage means (S126). When the ISBN indicated by the ISBN information is included in the book list (Yes in S126), the information control means 54 stores the ISBN information into the storage means 39. Specifically, the ISBN that is scanned most recently is updated to the ISBN of the paper book that is currently scanned (read) by the user (S127).

On the other hand, when the ISBN indicated by the ISBN information is not included in the book list (No in S126), the information control means 54 searches the ISBM DB 55 for the ISBN indicated by the ISBN information (S129). The processing steps S130 to S132, S127, S133 and S134 performed after that are the same as the processing steps S113 to S115, S108, S115 and S116 described in the fifth embodiment, and thus not redundantly described.

As described above, in the first modified example of the fifth embodiment, when the referring means 37 determines that the path of scanning a medium corresponds to a gesture indicated by the gesture information, it performs sub-processing that changes the operation mode of the scanning system 1 from normal mode to ISBN scan mode. When the operation mode of the scanning system 1 is ISBN scan mode, the fifth processing means 57 converts a plurality of pieces of image information into information in a specified form, and generates the converted information as ISBN information indicating ISBN of a paper book scanned as the medium. The structuring means 42 stores, into the storage means 41, ISBN information generated most recently and page number information generated most recently in association with drawing information, body information or note information generated after the generation of the ISBN information and the page number information.

In this configuration, it is possible to input ISBN and switch a paper book to be scanned (book to be read) only by operating the pen scanner 2 (input of a gesture and scan of ISBN). It is thereby possible to switch paper books to be scanned (books to be read) with a more simple operation.

Second Modified Example of Fifth Embodiment

In the above-described fifth embodiment, in order to obtain more accurate scan results of a body, when the body is scanned, the body that has been incorrectly recognized by OCR may be corrected on the basis of scan results of other people or official electronic books.

The detailed configuration of the server 4 according to the second modified example of the fifth embodiment is described hereinafter with reference to FIG. 26.

Figure 26:
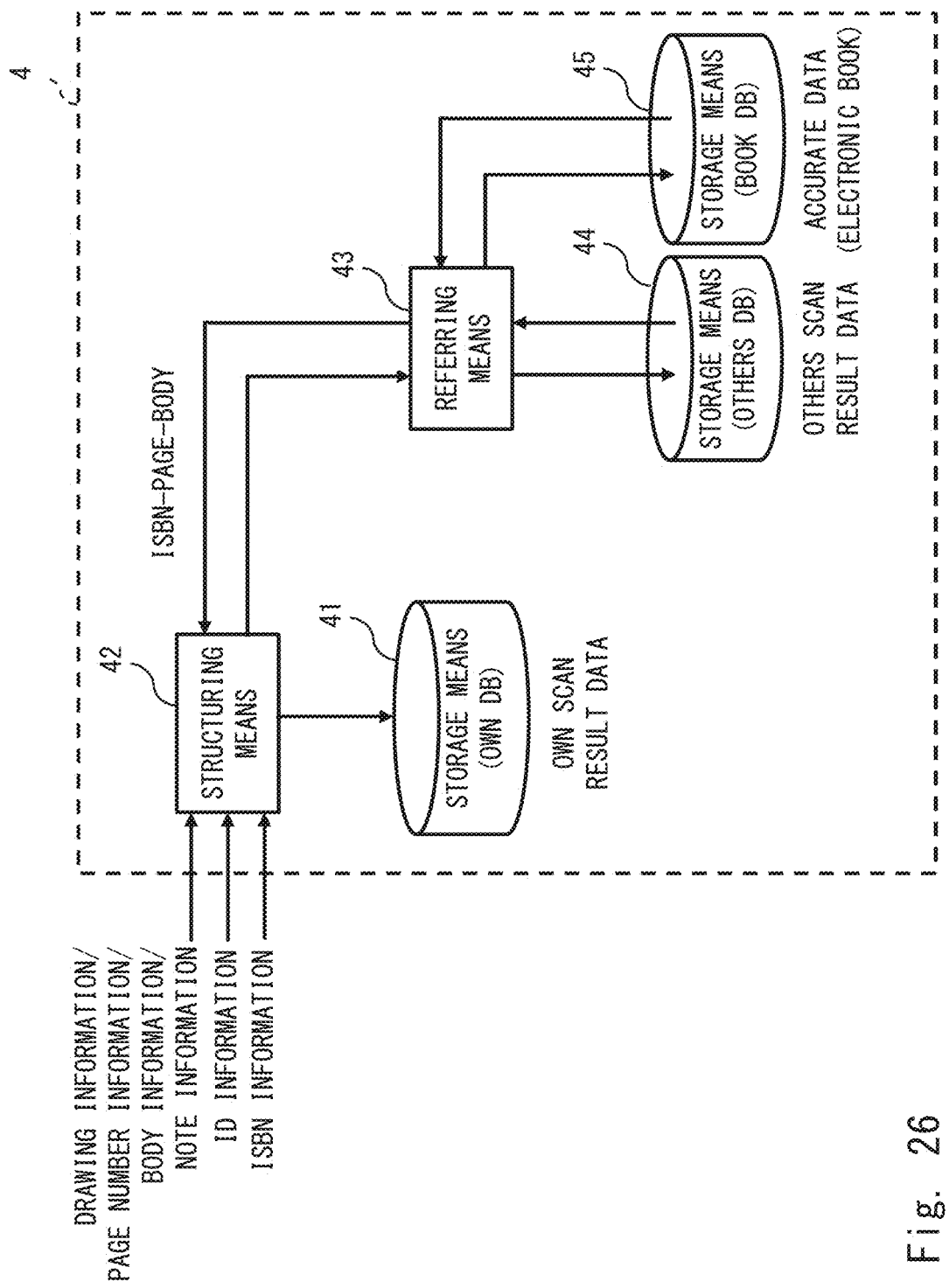
FIG. 26 is a view showing a detailed configuration of a server according to the first modified example of the fifth embodiment.

As shown in FIG. 26, the server 4 according to the second modified example of the fifth embodiment is different from the server 4 according to the fifth embodiment in that it further includes a referring means 43, a storage means 44, and a book DB 45.

When the structuring means 42 according to the second modified example of the fifth embodiment receives a set of ID information, ISBN information, page number information and body information, it outputs the ISBN information, the page number information and the body information to the referring means 43, and directs the referring means 43 to correct the body presented by the body information.

The referring means 43 corrects the body presented by the body information that is output from the structuring means 42 based on information stored in the storage means 44 and the storage means 45.

In the storage means 44, information that is the same as the information stored in the storage means 41 is stored for each of a plurality of other people. Specifically, as a result that another person uses another pen scanner 2 and another pen scanner 2, ID information, ISBN information, page number information, body information, drawing information and note information are stored in the storage means 44 in the same manner as described above.

In the storage means 45, a plurality of electronic books where a plurality of paper books are respectively presented in the form of electronic texts are stored. The electronic books are official electronic books where paper books are accurately converted into electronic texts. For example, the electronic books are provided by publishers of paper books. An electronic book is associated with ISBN information indicating its ISBN. Further, each page of an electronic book is associated with page number information indicating its page number.

Each of the storage means 44 and the storage means 45 includes at least one of storage devices such as a volatile memory, a hard disk, and a flash memory (nonvolatile memory), for example. The storage device included in each of the storage means 41, the storage means 44 and the storage means 45 may be provided entirely or partly.

The referring means 43 makes a partial match search between a body presented by the body information output from the structuring means 42 and a body on a page with a page number indicated by the page number information output from the structuring means 42 in an electronic book identified by ISBN indicated by the ISBN information output from the structuring means 42.

When those bodies match exactly, the referring means 43 does not correct the body presented by the body information output from the structuring means 42. When those bodies match partially, the referring means 43 corrects the body presented by the body information output from the structuring means 42 so as to match the body of the electronic book.

On the other hand, when an electronic book identified by ISBN indicated by the ISBN information output from the structuring means 42 is not stored in the storage means 45, the referring means 43 makes a partial match search between a body presented by the body information output from the structuring means 42 and a body presented by the body information associated with the ISBN information and the page number information that are the same as a pair of the ISBN information and the page number information output from the structuring means 42, out of the body information stored in the storage means 44. At this time, the referring means 43 makes a partial match search among bodies presented by body information of a plurality of other people.

When the body presented by the body information output from the structuring means 42 (body presented by the own body information) exactly matches the whole of the bodies presented by body information of a plurality of other people, the referring means 43 does not correct the body presented by the body information output from the structuring means 42. When the body presented by the own body information partially matches at least one of the bodies presented by the body information of a plurality of other people, the referring means 43 corrects the body presented by the body information output from the structuring means 42 so as to match the at least one of the bodies presented by the body information of other people. At this time, the body presented by the own body information is corrected so as to exactly match the body with the largest number of matches based on majority rule.

When the body information is corrected by the referring means 43, the structuring means 42 replaces the body information to be stored in the storage means 41 with the corrected body information.

As described above, in the second modified example of the fifth embodiment, a plurality of electronic books officially generated from a plurality of paper books are stored in the storage means 45. When a body presented by the generated body information partially matches a body on a page with a page number indicated by page number information generated most recently in an electronic book corresponding to ISBN specified most recently, the referring means 43 corrects the body presented by the generated body information so as to exactly match the body on the page with the page number indicated by the page number information generated most recently.

First, in the second modified example of the fifth embodiment, a plurality of sets of ISBN information, page number information and body information generated when other users scan media are stored in the storage means 44. When an electronic book corresponding to ISBN specified most recently is not stored in the storage means 45, and a body presented by the generated body information partially matches at least one of bodies presented by the body information of a plurality of other people associated with the ISBN information and the page number information that are the same as the ISBN information indicating the ISBN specified most recently and the page number information generated most recently, the referring means 43 corrects the body presented by the generated body information so as to exactly match the body with the largest number of matches among the bodies presented by the body information of the plurality of other people.

In this configuration, even when a body obtained by scanning is incorrectly converted by OCR, it is possible to correct it to the right one.

Sixth Embodiment

A sixth embodiment is described hereinafter. In the following description, the same matter as in the second embodiment described above is denoted by the same reference symbol or the like, and the description thereof is omitted as appropriate. The schematic configuration of the scanning system 1 according to the sixth embodiment is the same as the schematic configuration of the scanning system 1 according to the first embodiment and thus not redundantly described.

Figure 27:
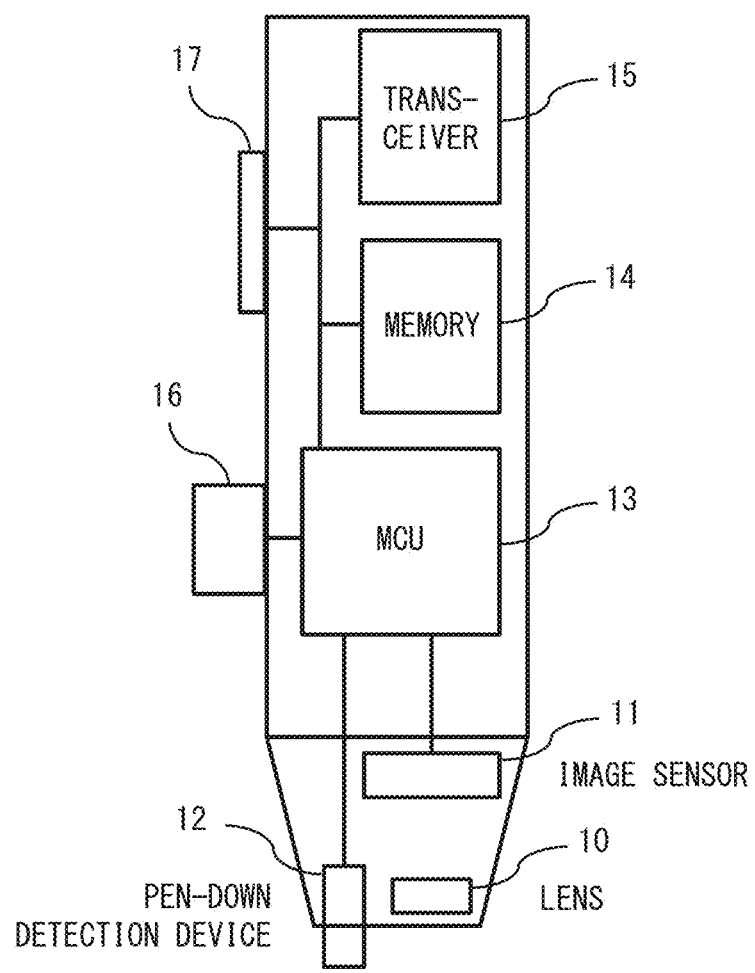
FIG. 27 is a view showing a hardware configuration of a pen scanner according to a sixth embodiment.

The hardware configuration of the pen scanner 2 according to the sixth embodiment is described hereinafter with reference to FIG. 27. The pen scanner 2 according to the sixth embodiment is different from the pen scanner 2 according to the second embodiment in that it further includes a display device 17.

The display device 17 is a device that displays a notification of a processing method determined by the processing method determination means 30 of the smartphone 3. The display device 17 includes LEDs respectively corresponding to a plurality of processing methods prepared in advance, and it may light up the LED corresponding to the processing method determined by the processing method determination means 30. In this case, the display device 17 includes four LEDs respectively corresponding to first to fourth processing methods. Further, the display device 17 may be a display panel which displays an image that notifies a processing method determined by the processing method determination means 30, such as a liquid crystal display panel or an organic EL display panel, for example.

When a processing method is determined, the smartphone 3 according to the sixth embodiment generates notification information indicating the determined processing method and transmits it to the pen scanner 2. The MCU 13 of the pen scanner 2 displays, on the display device 17, a notification of the processing method indicated by the notification information received from the smartphone 3 through the transceiver 15.

The detailed configuration of the scanning system 1 according to the sixth embodiment is described hereinafter with reference to FIG. 28.

Figure 28:
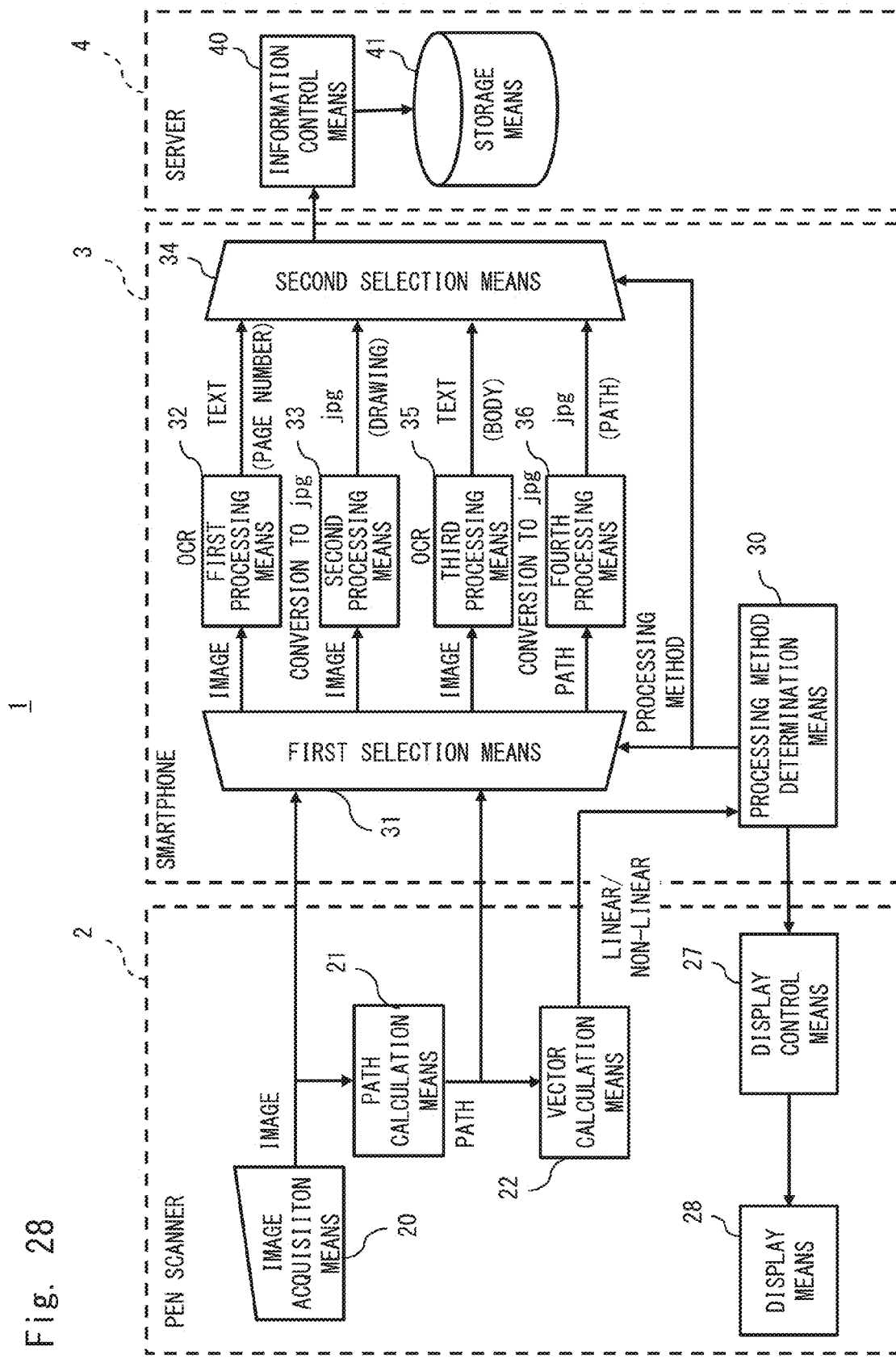
FIG. 28 is a view showing a detailed configuration of a scanning system according to the sixth embodiment.

As shown in FIG. 28, the pen scanner 2 according to the sixth embodiment is different from the pen scanner 2 according to the third embodiment in that it further includes a display control means 27 and a display means 28.

When a processing method for processing a plurality of pieces of image information or path information is determined from the first processing method to the fourth processing method, the processing method determination means 30 according to the sixth embodiment generates notification information indicating the determined processing method and transmits it to the pen scanner 2.

The display control means 27 gives the display means 28 an instruction to display a notification of the processing method indicated by the notification information received from the smartphone 3. Specifically, the MCU 13, the memory 14 and the transceiver 15 operate as the display control means 27.

In response to an instruction from the display control means 27, the display means 28 displays a notification of the determined processing method. Specifically, the display device 17 operates as the display means 28.

Note that a scanning process of the scanning system 1 according to the sixth embodiment is the same as a scanning process of the scanning system 1 according to the second embodiment except for notifying a determined processing method to a user as described above, and the redundant description thereof is omitted.

Note that, although an example where the display control means 27 (the display device 17) and the display means 28 are applied to the second embodiment is described above, it is not limited thereto. The display control means 27 (the display device 17) and the display means 28 may be applied to any of the first to fifth embodiments. Although notification information indicating one of the first processing method and the second processing method is notified in this case, that is obvious and not described in detail.

As described above, in the sixth embodiment, the display control means 27 displays, on the display means 28, a notification of a processing method determined by the processing method determination means 30.

In this configuration, it is possible to know whether scanned information is converted into information as a user intends. It is thus possible to easily detect malfunction of the scanning system 1, for example.

Seventh Embodiment

A seventh embodiment is described hereinafter. In the following description, the same matter as in the fifth embodiment described above is denoted by the same reference symbol or the like, and the description thereof is omitted as appropriate. The schematic configuration of the scanning system 1 and the hardware configuration of the pen scanner 2 according to the seventh embodiment are the same as the schematic configuration of the scanning system 1 and the hardware configuration of the pen scanner 2 according to the fifth embodiment and thus not redundantly described.

In the seventh embodiment, the operation mode of the scanning system 1 includes "reading mode" to scan information of a paper book and "viewing mode" to view information input by other people to a paper book in a social reading service (or an online book shopping site). In this configuration, a search can be easily made by simply scanning information of a paper book as a search key for searching information input by other people to a paper book in a social reading service.

The detailed configuration of the scanning system 1 according to the seventh embodiment is described hereinafter with reference to FIG. 29.

Figure 29:
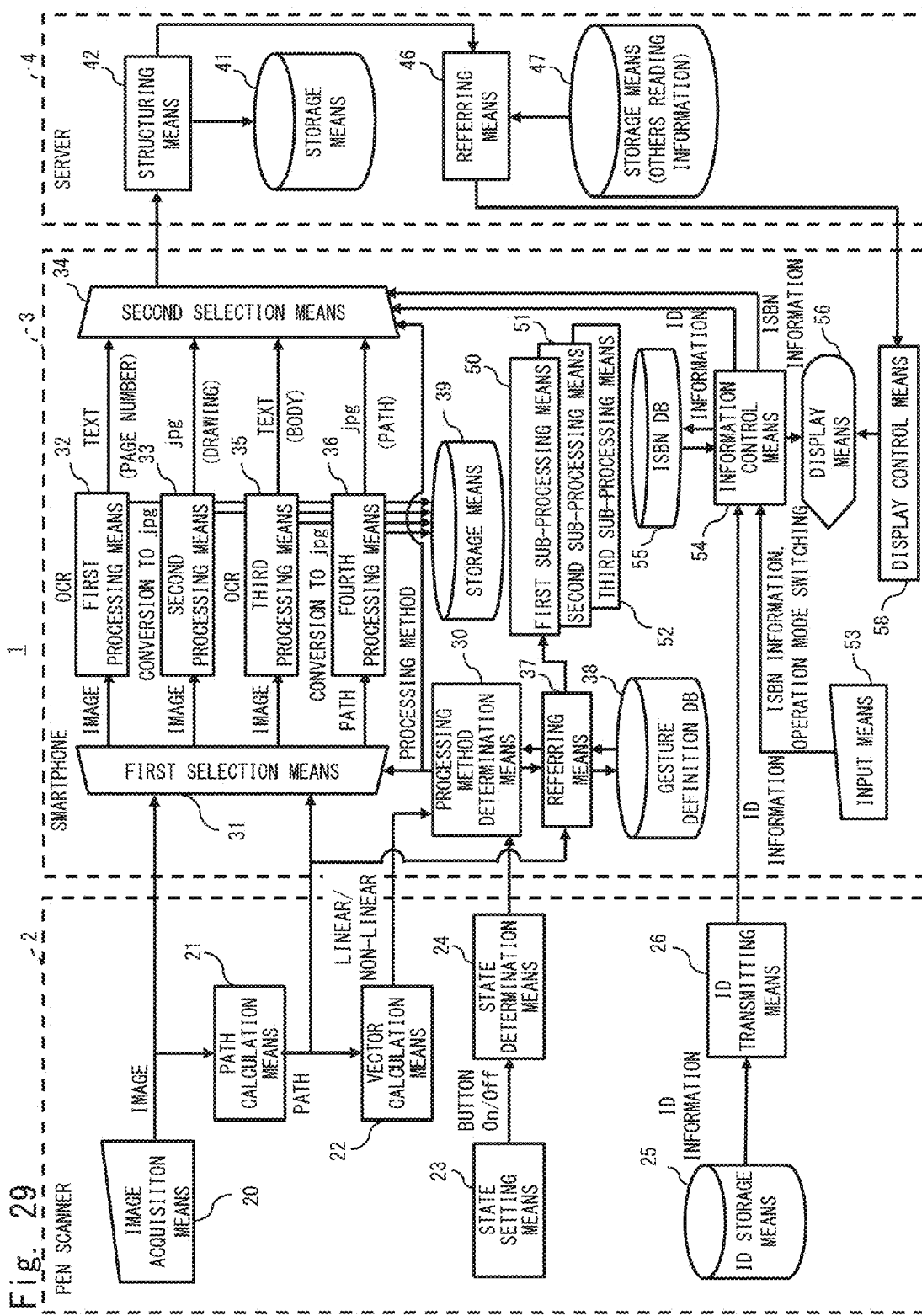
FIG. 29 is a view showing a detailed configuration of a scanning system according to a seventh embodiment.

As shown in FIG. 29, the server 4 according to the seventh embodiment is different from the server 4 according to the fifth embodiment in that it further includes a referring means 46 and a storage means 47.

In the case where the operation mode of the scanning system 1 is "viewing mode", when the structuring means 42 according to the seventh embodiment receives a set of ID information, ISBN information and page number information from the smartphone 3, it outputs the ISBN information and the page number information to the referring means 46. Further, in the case where the operation mode of the scanning system 1 is "viewing mode", when the structuring means 42 receives a set of ID information, ISBN information, page number information and body information from the smartphone 3, it outputs the ISBN information, the page number information and the body information to the referring means 46.

The referring means 46 acquires, based on the information output from the structuring means 42, information input for a paper book by other people from the storage means 47 and transmits them to the smartphone 3.

In the storage means 47, information input for a paper book by other people in a social reading service is stored for each of a plurality of other people. The information is stored into the storage means 47 of the server 4 when another person inputs the information and transmits it to the server 4 using another smartphone 3, for example. Note that an information processing device that transmits information to be stored into the storage means 47 to the server 4 is not limited to the smartphone 3, and it may be a PC or a tablet as described earlier.

A CPU included in the server 4, for example, executes a program stored in the storage means 41 included in the server 4 and thereby operates as the referring means 46 just like the above-described structuring means 42.

To be more specific, in the storage means 47, comment information presenting comments or Q&A information presenting Q&A (question & answer) on a whole paper book, comment information presenting comments or Q&A information presenting Q&A on each page of a paper book, and comment information presenting comments or Q&A information presenting Q&A on each specified chunk (for example, every specified number of paragraphs) of a body in each page are stored, for example.

The comment information or the Q&A information on a whole paper book is stored in the storage means 47 in association with ISBN information indicating the ISBN of the paper book. The comment information or the Q&A information on a certain page in a certain paper book is stored in the storage means 47 in association with a pair of an ISBN number indicating the ISBN of the paper book and page number information indicating the page number of the page. The comment information or the Q&A information on a certain chunk of a body on a certain page in a certain paper book is stored in the storage means 47 in association with a set of an ISBN number indicating the ISBN of the paper book, page number information indicating the page number of the page, and body information presenting the body.

Thus, as shown in FIG. 30, when ISBN information and page number information are output from the structuring means 42, the referring means 46 acquires the comment information or the Q&A information that is associated with a pair of ISBN information and page number information that are the same as the output ISBN information and page number information from the storage means 47 and transmits it to the smartphone 3.

Further, as shown in FIG. 30, when ISBN information, page number information and body information are output from the structuring means 42, the referring means 46 acquires the comment information or the Q&A information that is associated with a set of ISBN information and page number information that are the same as the output ISBN information and page number information and body information presenting a body containing the body presented by the body information from the storage means 47 and transmits it to the smartphone 3.

As shown in FIG. 29, the smartphone 3 according to the seventh embodiment is different from the smartphone 3 according to the fifth embodiment in that it further includes a display control means 58.

The display control means 58 displays, on the display means 56, an image showing comments or Q&A presented by comment information or Q&A information received from the server 4.

A CPU included in the smartphone 3, for example, executes a program stored in the storage means 39 included in the smartphone 3, and thereby operates as the display control means 58 in the same manner as the above-described means 30 to 37, 50 to 52 and 54.

On the input means 53 according to the seventh embodiment, a user inputs an instruction to switch the operation mode of the scanning system 1 from "reading mode" to "viewing mode". When an instruction to switch the operation mode of the scanning system 1 from "reading mode" to "viewing mode" is input to the input means 53 by a user, the information control means 54 switches the operation mode of the scanning system 1 from "reading mode" to "viewing mode".

In the case where the operation mode of the scanning system 1 is "viewing mode", when the second selection means 34 transmits ID information, ISBN information, page number information, body information and the like to the server 4, it also transmits notification information indicating that the operation mode of the scanning system 1 is "viewing mode". By this notification information, the structuring means 42 of the server 4 can recognize whether the operation mode of the scanning system 1 is "viewing mode" or not.

The effects of the seventh embodiment are described hereinafter with reference to FIG. 31. As shown on the left of FIG. 31, in general social reading services or online book shopping sites, information such as comments is presented for each book. On the other hand, in the seventh embodiment, as shown on the right of FIG. 31, information such as comments in social reading services or online book shopping sites can be presented for each page of a book or for each body where a page of a book is separated into a specified number of parts. It is thus possible to present more precise information compared with general social reading services or online book shopping sites.

Note that, although an example in which the operation mode of the scanning system 1 is switched by an input to the smartphone 3 is described above, it is not limited thereto. The operation mode of the scanning system 1 may be switched by an input of a gesture through the pen scanner 2. For example, the first sub-processing means 50 may perform processing to switch the operation mode of the scanning system 1 between "reading mode" and "viewing mode".

Further, for example, the second sub-processing means 51 may perform processing to switch the operation mode of the scanning system 1 between "reading mode" and "second viewing mode". In "second viewing mode", another processing means (not shown) of the smartphone 3 may combine a plurality of images presented by a plurality of pieces of image information, perform OCR on a character sequence contained in the image generated by the combining, and generate text information where the character sequence is presented in the form of an electronic text as ISBN information indicating ISBN. The second selection means 34 transmits the generated ISBN information to the server 4.

The structuring means 42 transmits the ISBN information received from the smartphone 3 to the referring means 46. Then, as shown in FIG. 30, when the ISBN information is output from the structuring means 42, the referring means 46 may acquire comment information or Q&A information associated with ISBN information that is the same as the received ISBN information from the storage means 47 and transmit it to the smartphone 3.

Further, the text information generated by the above-described another processing means may be generated as reviewer name information indicating a reviewer name and transmitted to the server 4. In this case, comment information or Q&A information are stored in the storage means 47 in association with reviewer name information indicating a reviewer name who has entered comments or Q&A presented by the comment information or the Q&A information. Then, the referring means 46 may acquire, from the storage means 47, the comment information or the Q&A information that is associated with reviewer name information that is the same as the reviewer name information received from the smartphone 3 and transmit it to the smartphone 3.

Furthermore, the text information generated by the above-described another processing means may be generated as chapter title information indicating a title of a chapter and transmitted to the server 4. In this case, the chapter title information is stored in the storage means 47 in association with comment information or Q&A information presenting comments or Q&A on the chapter with the title indicated by the chapter title information. Then, the referring means 46 may acquire, from the storage means 47, the comment information or the Q&A information that is associated with chapter title information that is the same as the chapter title information received from the smartphone 3 and transmit it to the smartphone 3.

As described above, in the seventh embodiment, for each of a plurality of paper books, information input by other people on the content of each page of the paper book is stored in the storage means 47. The referring means 46 acquires information input by other people on the content of a page with a page number indicated by generated page number information in a paper book corresponding to ISBN specified most recently. The display control means 58 displays the information acquired by the referring means 46 on the display means 56.

In this configuration, it is possible to refer to information input by other people on a paper book without a complicated operation. Thus, by using information in a social reading service as information to be stored in the storage means 47, for example, it is possible to make active use of the social reading service.

Eighth Embodiment

An eighth embodiment is described hereinafter. In the following description, the same matter as in the third embodiment described above is denoted by the same reference symbol or the like, and the description thereof is omitted as appropriate. The schematic configuration of the scanning system 1 and the hardware configuration of the pen scanner 2 according to the eighth embodiment are the same as the schematic configuration of the scanning system 1 and the hardware configuration of the pen scanner 2 according to the first embodiment and thus not redundantly described.

Figure 32:
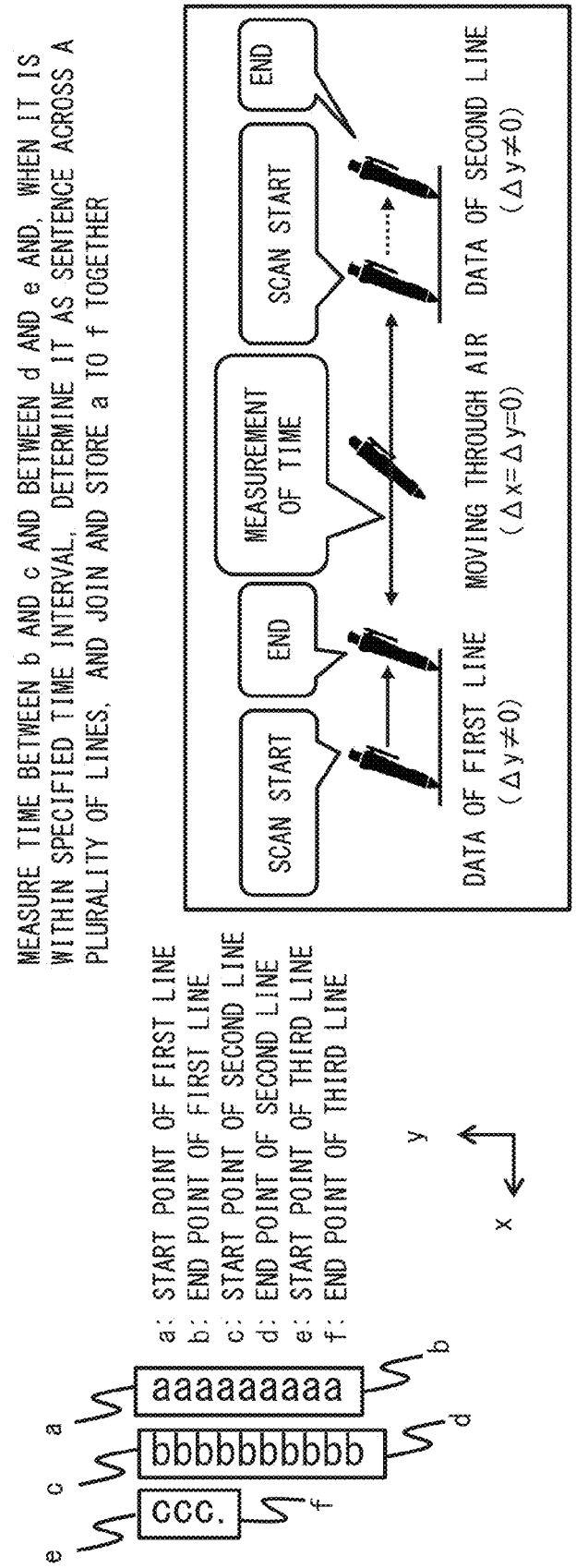
FIG. 32 is a view showing a processing method of a scanning system according to an eighth embodiment.

In the eighth embodiment, as shown in FIG. 32, a time from the end of scanning of a body to the start of scanning of the next body is measured, and when the measured time is within a specified time interval, those two bodies are joined and stored. In this configuration, even when one sentence "Aaaaaaaaabbbbbbbbbccc." is spread over a plurality of lines, it can be stored as one sentence as shown in FIG. 32, for example.

Specifically, it is assumed that, in a paper book, "Aaaaaaaaa" is written in the first line, "bbbbbbbbb" is written in the second line, and "ccc." is written in the third line as shown in FIG. 32. In this case, in the case where each of a time from when scanning ends at the end point b of the first line to when scanning starts at the start point c of the second line, and a time from when scanning ends at the end point d of the second line to when scanning starts at the start point e of the third line is within a specified time interval, the character sequences of the respective lines are joined into one sentence and stored.

The detailed configuration of the scanning system 1 according to the eighth embodiment is described hereinafter with reference to FIG. 33.

Figure 33:
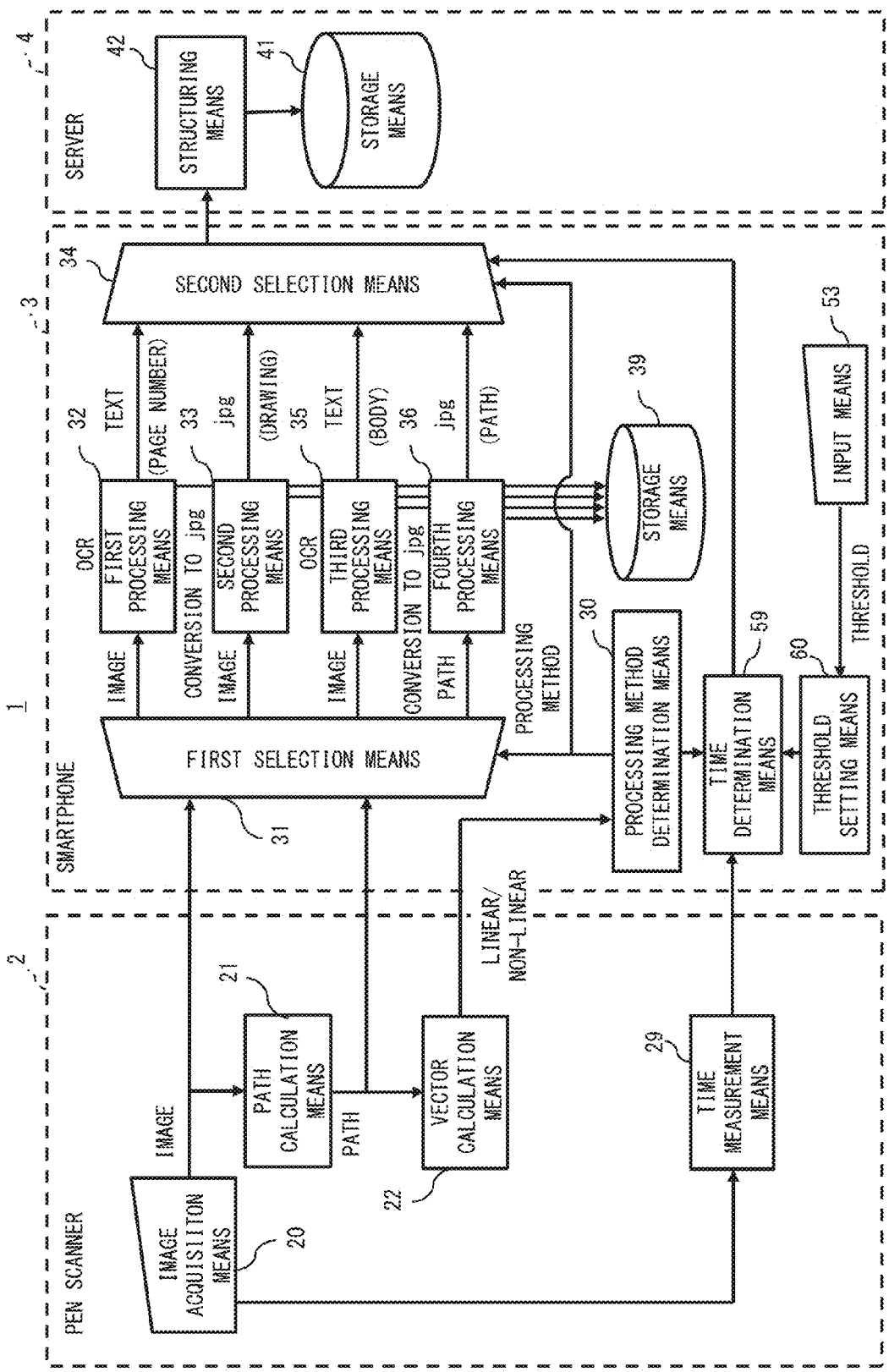
FIG. 33 is a view showing a detailed configuration of the scanning system according to the eighth embodiment.

As shown in FIG. 33, the pen scanner 2 according to the eighth embodiment is different from the pen scanner 2 according to the third embodiment in that it further includes a time measurement means 29.

The time measurement means 29 measures a time from the end of scanning of a medium to the start of next scanning of a medium. Stated differently, the time measurement means 29 measures a time from pen-up of the pen scanner 2 to pen-down of the pen scanner 2. For example, the MCU 13 that includes a timer (not shown) operates as the time measurement means 29. The time measurement means 29 generates time information indicating the measured time and transmits it to the smartphone 3.

As shown in FIG. 33, the smartphone 3 according to the eighth embodiment is different from the smartphone 3 according to the third embodiment in that it further includes an input means 53, a time determination means 59, and a threshold setting means 60.

When the attribute of information scanned last time is "body" and the attribute of information scanned this time is also "body", the processing method determination means 30 according to the eighth embodiment directs the time determination means 59 to determine a time from the end of scanning of a body last time to the start of scanning of a body this time. In other words, when the processing method determination means 30 determines to process a plurality of pieces of image information by the processing method performed by the third processing means 35 both last time and this time, it gives the time determination means 59 an instruction to determine a time from the end of scanning of a body last time to the start of scanning of a body this time.

The time determination means 59 determines whether the time indicated by the time information received from the pen scanner 2 is equal to or less than a threshold or not. When the time determination means 59 determines that the time indicated by the time information is equal to or less than a threshold, it outputs instruction information that gives an instruction to join the bodies to the second selection means 34.

When the instruction information that gives an instruction to join the bodies is output from the time determination means 59, the second selection means 34 generates body information presenting a body where a body presented by body information generated this time and a body presented by body information generated last time and stored in the storage means 39 are joined. Then, when the second selection means 34 transmits the body information to the server 4, it adds, to the body information, instruction information that gives an instruction to replace the body information and then transmits them to the server 4.

When the instruction information is added to the body information received from the smartphone 3, the structuring means 42 according to the eighth embodiment updates the body information stored last time in the storage means 41 to the body information received from the smartphone 3.

The input means 53 is substantially the same as the one described in the fifth to seventh embodiment. Note that, however, the input means 53 according to the eighth embodiment outputs the generated input signal to the threshold setting means 60.

When a user inputs a threshold to the input means 53, the threshold setting means 60 acquires the threshold input by the user and sets the acquired threshold to the time determination means 59 based on an input signal that is input from the input means 53 in response to the input. Specifically, the threshold to be used by the time determination means 59 is updated to the threshold input by a user.

A CPU included in the smartphone 3, for example, executes a program stored in the storage means 39 included in the smartphone 3, and thereby operates as the time determination means 59 and the threshold setting means 60 in the same manner as the above-described means 30 to 36.

Figure 34:
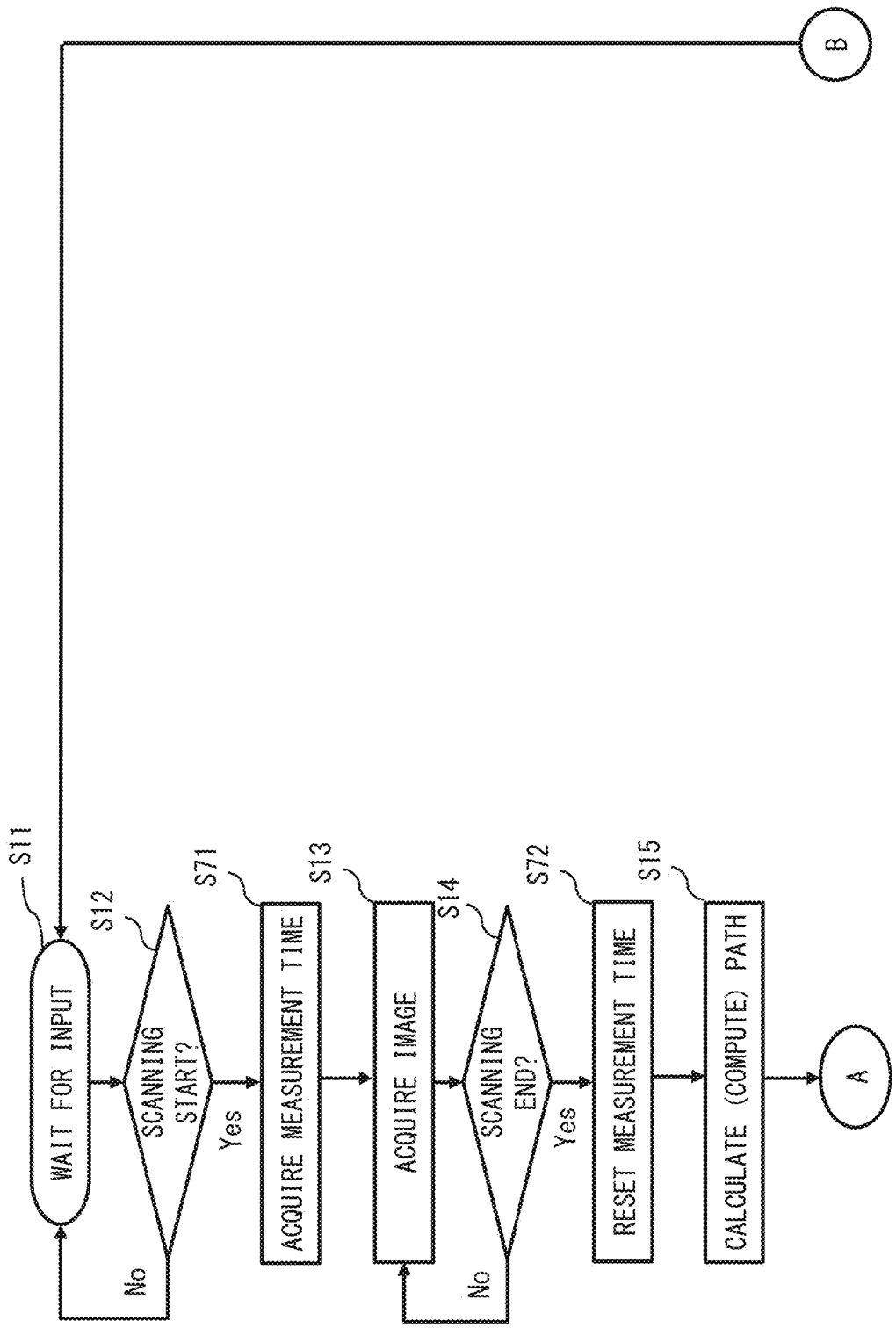
FIG. 34 is a flowchart showing a scanning process in a scan mode according to a first modified example of the eighth embodiment.
Figure 35:
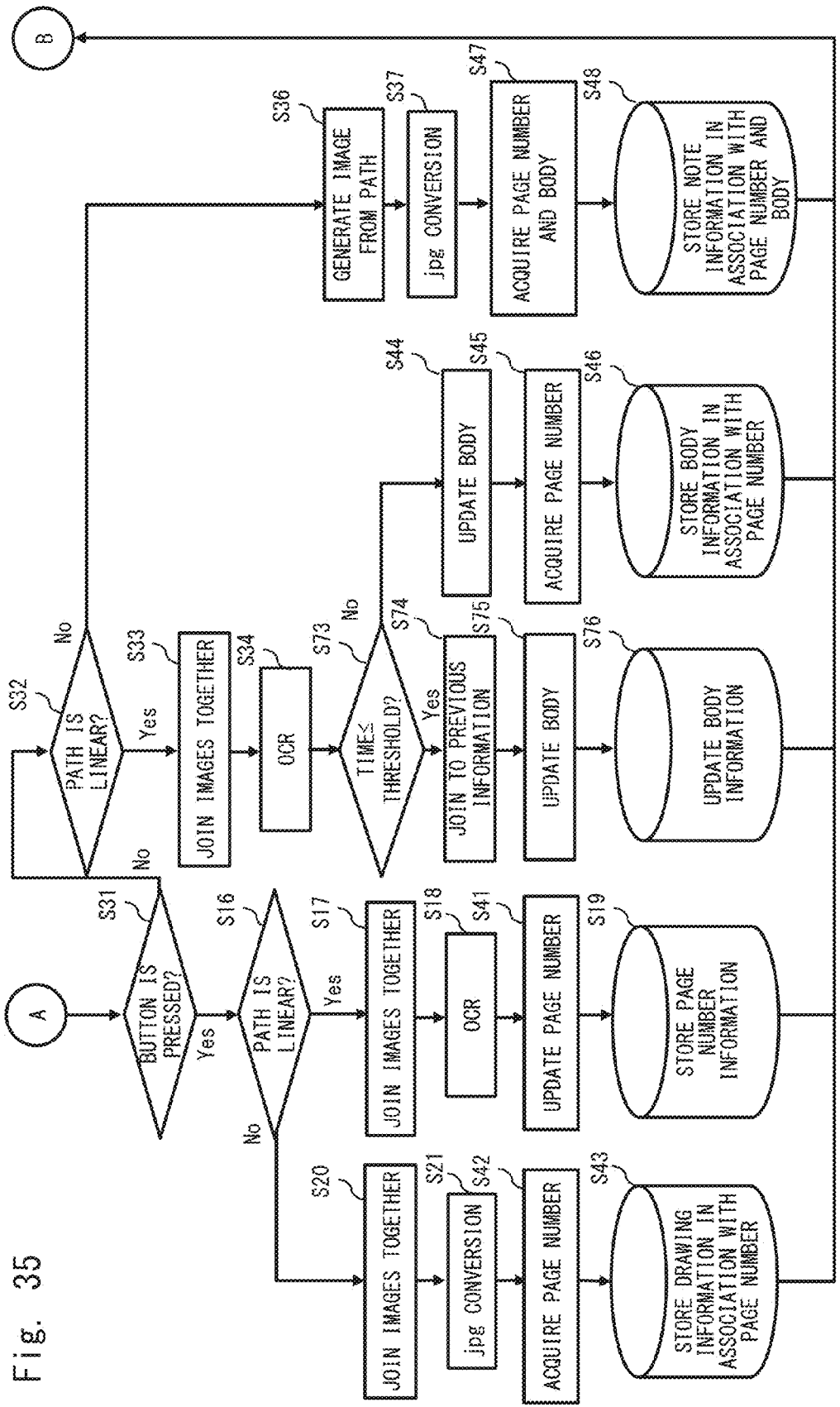
FIG. 35 is a flowchart showing a scanning process in a scan mode according to the first modified example of the eighth embodiment.

A scanning process of the scanning system 1 according to the eighth embodiment is described hereinafter with reference to FIGS. 34 and 35.

The processing steps S11 to S15 are the same as those of the third embodiment. However, in the eighth embodiment, the time measurement means 29 resets a measurement time between the processing step S14 and the processing step S15 (S72), and acquires a measurement time between the processing step S12 and the processing step S13 (S71). The time measurement means 29 thereby acquires a time from the end of scanning last time (Yes in S14) to the start of scanning this time (Yes in S12).

The processing steps S16 to S21, S31-S34, S36, S37 and S41 to S48 are the same as those described in the third embodiment. After the step S34, the time determination means 59 determines whether the time acquired by the time measurement means 29 is equal to or less than a threshold (S73).

When the time acquired by the time measurement means 29 is not equal to or less than a threshold (No in S73), the processing steps S44 to S46 are performed.

On the other hand, when the time acquired by the time measurement means 29 is equal to or less than a threshold (Yes in S73), the second selection means 34 generates body information presenting a body joining a body presented by body information stored in the storage means 39 and a body presented by body information generated by the third processing means 35 (S74). The second selection means 34 stores the generated body information into the storage means 39. In other words, the body that is scanned most recently is updated to the body that is newly scanned (S75). The structuring means 42 updates the body information stored last time in the storage means 41 to the body information generated by the second selection means 34 (S76).

Note that, although an example where body information are joined when a measured time is equal to or less than a threshold, and body information are not joined and stored as separate body information (for example, separate text files) in the storage means 41 when a measured time is not equal to or less than a threshold is described above, it is not limited thereto. For example, when a measured time is equal to or less than a threshold, bodies presented by two body information may be joined into one body information (for example, one text file) without inserting a newline character between them, and when a measured time is not equal to or less than a threshold, bodies presented by two body information may be joined into one body information by inserting a newline character between them.

Note that, although an example where the determination as to whether a time acquired by the time measurement means 29 is equal to or less than a threshold and the setting of a threshold are performed in the smartphone 3 is described above, it is not limited thereto. For example, the determination as to whether a time acquired by the time measurement means 29 is equal to or less than a threshold and the setting of a threshold may be performed in the pen scanner 2. Specifically, the pen scanner 2 may include the input means 53, the time determination means 59 and the threshold setting means 60. In this case, the pen scanner 2 has, as the input means 53, an operation button for inputting a threshold, for example.

Further, although an example where the time measurement means 29, the input means 53, the time determination means 59 and the threshold setting means 60 are applied to the third embodiment is described above, it is not limited thereto. The time measurement means 29, the input means 53, the time determination means 59 and the threshold setting means 60 may be applied to any of the fourth to seventh embodiments.

As described above, in the eighth embodiment, the time measurement means 29 measures a time from the end of scanning of a medium last time to the start of scanning of a medium this time. When the body information is generated both last time and this time, the time determination means 59 determines whether the time measured by the time measurement means 29 is equal to or less than a specified threshold. When it is determined that the time measured by the time measurement means 29 is equal to or less than a specified threshold, the structuring means 42 updates body information generated last time to body information presenting a body joining a body presented by the body information generated last time and a body presented by body information generated this time. When, on the other hand, it is determined that the time measured by the time measurement means 29 is not equal to or less than a specified threshold, the structuring means 42 stores body information generated this time into the storage means 41 without joining it to the body information generated last time.

In this configuration, it is possible to join and store a body that is spread over a plurality of lines without a complicated operation.

The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Although embodiments of the present invention are described specifically in the foregoing, the present invention is not restricted to the above-described embodiments, and various changes and modifications may be made without departing from the scope of the invention.

For example, although the second processing means 33 and the fourth processing means 36 combine a plurality of images presented by a plurality of pieces of image information and compress the image generated by the combining, the present invention is not limited thereto. Image information presenting the image generated by the combining may be transmitted to the server 4 and stored without being compressed.

The first to eighth embodiments described above can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A scanning system comprising:
    a processor configured to execute:
        an image acquisition unit that acquires a plurality of pieces of image information generated by continuously scanning a medium to be scanned by a scanning device;
        a path determination unit that determines a path of the scanning device based on moving vectors, corresponding to a movement of the scanning device across the medium, generated from the plurality of pieces of image information acquired by the image acquisition unit;
        a processing technique determination unit that determines a processing technique for the plurality of pieces of image information in accordance with the path of the scanning device determined by the path determination unit; and
        a processing unit that processes the plurality of pieces of image information according to the processing technique determined by the processing technique determination unit to convert the plurality of pieces of image information into information in a form corresponding to the processing method.

2. The scanning system according to claim 1, wherein the processing technique determination unit determines different processing techniques depending on whether the path of the scanning device is linear or not.

3. The scanning system according to claim 2, further comprising:
    a button to be pressed by a user, wherein
    the processing technique determination unit further determines different processing techniques depending on whether the button is pressed or not during scanning of the medium.

4. The scanning system according to claim 3, wherein
    the processing technique determination unit determines a processing technique for the plurality of pieces of image information from a plurality of processing techniques prepared in advance, and
    the plurality of processing techniques include
    a first processing technique that generates information after conversion of the plurality of pieces of image information as page number information presenting a page number of a paper book scanned as the medium,
    a second processing technique that generates information after conversion of the plurality of pieces of image information as drawing information presenting a drawing of a paper book scanned as the medium,
    a third processing technique that generates information after conversion of the plurality of pieces of image information as body information presenting a body of a paper book scanned as the medium, and
    a fourth processing technique that generates information after conversion of the plurality of pieces of image information as note information presenting, as notes, the path of the scanning device determined based on the plurality of pieces of image information.

5. The scanning system according to claim 4, further comprising:
    a storage unit,
    wherein the processor is further configured to execute:
    a structuring unit that stores, into the storage unit, page number information generated most recently in association with drawing information, body information or note information generated after generation of the page number information.

6. The scanning system according to claim 5, wherein the structuring unit stores, into the storage unit, page number information generated most recently and body information or drawing information generated most recently in association with note information generated after generation of the page number information and the body information.

7. The scanning system according to claim 5, further comprising:
    an input unit that receives an input to specify ISBN (International Standard Book Number) of a paper book to be scanned as the medium, wherein
    the structuring unit stores, into the storage unit, ISBN information indicating ISBN specified most recently and page number information generated most recently in association with drawing information, body information or note information generated after specifying of the ISBN and generation of the page number information.

8. The scanning system according to claim 7, further comprising:
a pen scanner that includes the image acquisition unit, the pen scanner comprising
an ID storage unit to store in advance ID information uniquely identifying the pen scanner, and
an ID transmitting unit that transmits ID information stored in the ID storage unit, wherein
the structuring unit stores, into the storage unit, ID information transmitted from the ID transmitting unit, ISBN information indicating ISBN specified most recently and page number information generated most recently in association with drawing information, body information or note information generated after receiving of the ID information, specifying of the ISBN and generation of the page number information.

9. The scanning system according to claim 8, wherein
the storage unit further stores a plurality of electronic books officially generated from a plurality of paper books, and
the scanning system further comprises a referring unit that, when a body presented by the generated body information partially matches a body on a page with a page number indicated by the page number information generated most recently in an electronic book corresponding to the ISBN specified most recently, corrects the body presented by the generated body information so as to exactly match the body on the page with the page number indicated by the page number information generated most recently.

10. The scanning system according to claim 9, wherein
the storage unit further stores a plurality of sets of the ISBN information, the page number information and the body information generated when other users scan the medium, and
when an electronic book corresponding to the ISBN specified most recently is not stored in the storage unit, and a body presented by the generated body information partially matches at least one of bodies presented by body information of a plurality of other users associated with ISBN information and page number information being the same as the ISBN information indicating the ISBN specified most recently and the page number information generated most recently, the referring unit corrects the body presented by the generated body information so as to exactly match a body with the largest number of matches among the bodies presented by the body information of the plurality of other users.

11. The scanning system according to claim 7, wherein
the storage unit further stores, for each of a plurality of paper books, information input by other people on content of each page of the paper books, and
the scanning system further comprises
a display device,
wherein the processor is further configured to execute:
a referring unit that acquires information input by other people on content of a page with a page number indicated by the generated page number information in a paper book corresponding to the ISBN specified most recently; and
a display control unit that displays information acquired by the referring unit on the display device.

12. The scanning system according to claim 5, further comprising:
a storage unit to store gesture information indicating a gesture being a template of the path of the scanning device,
wherein the processor is further configured to execute:
a referring unit that performs sub-processing that changes an operation mode of the scanning system from normal mode to ISBN scan mode when determining that a path of scanning the medium corresponds to a gesture indicated by the gesture information; and
a processing means that, when the operation mode of the scanning system is ISBN scan mode, converts the plurality of pieces of image information into information in a specified form, and generates information after conversion as ISBN information indicating ISBN of a paper book scanned as the medium, wherein
the structuring unit stores, into the storage unit, ISBN information generated most recently and page number information generated most recently in association with drawing information, body information or note information generated after generation of the ISBN information and the page number information.

13. The scanning system according to claim 5, wherein the processor is further configured to execute:
a time measurement unit that measures a time from end of scanning of the medium last time to start of scanning of the medium this time; and
a time determination unit that determines whether a time measured by the time measurement unit is equal to or less than a specified threshold when body information is generated both last time and this time, wherein
when a time measured by the time measurement unit is determined to be equal to or less than a specified threshold, the structuring unit updates body information generated last time to body information presenting a body joining a body presented by the body information generated last time and a body presented by body information generated this time, and
when a time measured by the time measurement unit is determined to be not equal to or less than a specified threshold, the structuring unit stores body information generated this time into the storage unit without joining it to body information generated last time.

14. The scanning system according to claim 1, wherein
the processing technique determination unit determines a processing technique for the plurality of pieces of image information from a plurality of processing techniques prepared in advance, and
the plurality of processing techniques include
a first processing technique that performs optical character recognition on an image combining a plurality of images presented by the plurality of pieces of image information to convert the plurality of pieces of image information into text information, and
a second processing technique that converts the plurality of pieces of image information into image information presenting an image combining a plurality of images presented by the plurality of pieces of image information.

15. The scanning system according to claim 14, further comprising:
a storage unit to store gesture information indicating a gesture being a template of the path of the scanning device, wherein the processor is further configured to execute:
a referring unit that performs specified sub-processing when determining that a path of scanning the medium corresponds to a gesture indicated by the gesture information.

16. The scanning system according to claim 14, further comprising:
a display device,
wherein the processor is further configured to execute:
a display control unit that displays, on the display device, a notification of a processing technique determined by the processing technique determination unit.

17. A scanned image processing device comprising:
a processor configured to execute:
    a receiving unit that receives, from a pen scanner, a plurality of pieces of image information generated by continuously scanning a medium to be scanned by the pen scanner;
    a processing technique determination unit that determines a processing technique for the plurality of pieces of image information in accordance with a path of the pen scanner determined based on moving vectors, corresponding to a movement of the pen scanner across the medium, generated from the plurality of pieces of image information received by the receiving unit; and
    a processing unit that processes the plurality of pieces of image information by a processing technique determined by the processing technique determination unit to convert the plurality of pieces of image information into information in a form corresponding to the processing technique.

18. A scanning method comprising:

acquiring a plurality of pieces of image information generated by continuously scanning a medium to be scanned by a scanning device;

determining a path of the scanning device based on moving vectors, corresponding to a movement of the scanning device across the medium, generated from the plurality of pieces of image information;

determining a processing technique for the plurality of pieces of image information in accordance with the path of the scanned device; and processing the plurality of pieces of image information by the determined processing technique to convert the plurality of pieces of image information into information in a form corresponding to the processing technique.

* * * * *